(12) United States Patent
Ueshima et al.

(10) Patent No.: US 7,297,864 B2
(45) Date of Patent: Nov. 20, 2007

(54) IMAGE SIGNAL GENERATING APPARATUS, AN IMAGE SIGNAL GENERATING PROGRAM AND AN IMAGE SIGNAL GENERATING METHOD

(75) Inventors: Hiromu Ueshima, Shiga (JP); Akihiro Inaba, Shiga (JP)

(73) Assignee: SSD Company Limited, Shiga (JP)

( * ) Notice: Subject to any disclaimer, the term of this patent is extended or adjusted under 35 U.S.C. 154(b) by 254 days.

(21) Appl. No.: 11/039,080

(22) Filed: Jan. 20, 2005

(65) Prior Publication Data
US 2005/0211080 A1 Sep. 29, 2005

(30) Foreign Application Priority Data
Jan. 20, 2004 (JP) ............ P.2004-012168

(51) Int. Cl.
G10H 3/06 (2006.01)
A63F 9/24 (2006.01)
A63F 13/00 (2006.01)
G06F 17/00 (2006.01)
G06F 19/00 (2006.01)
G06F 3/033 (2006.01)

(52) U.S. Cl. ............ 84/724; 463/31; 345/184
(58) Field of Classification Search ........... 84/724; 463/31, 32, 33, 34; 345/156, 157, 158, 159, 345/160, 161, 162, 184
See application file for complete search history.

(56) References Cited

U.S. PATENT DOCUMENTS 5,012,230 A * 4/1991 Yasuda ............ 345/160
5,488,196 A * 1/1996 Zimmerman et al. ......... 84/612
6,070,205 A 5/2000 Kato et al.
6,353,169 B1 * 3/2002 Juszkiewicz et al. ......... 84/600
2002/0155889 A1 * 10/2002 Miyamoto et al. ............ 463/32

FOREIGN PATENT DOCUMENTS

| JP | 9-212162 | 8/1997 |
| JP | 10078778 A * | 3/1998 |
| JP | 10-307790 | 11/1998 |

\* cited by examiner

*Primary Examiner*—Lincoln Donovan
*Assistant Examiner*—Andrew Millikin
(74) *Attorney, Agent, or Firm*—Osha Liang LLP

(57) ABSTRACT

The automatic musical instrument contains a main body provided with a sliding saddle member and a sliding operation piece. The sliding operation piece is provided with a reflecting pattern consisting of light reflecting regions and light absorbing regions. The sliding saddle member is provided with a infrared emitting diode and two phototransistors inside. When the sliding operation piece is slidably moved in contact with the sliding saddle member, infrared light emitted from the infrared emitting diode is reflected by the reflecting pattern. Then, the phototransistors receive the reflected light and output pulse signals A and B. The high speed processor built in the main body calculates the sliding speed, the sliding direction and the sliding time on the basis of the pulse signals A and B. Also, the high speed processor controls the movement of the character image displayed on the screen on the basis of one of the sliding speed, the sliding direction and the sliding time.

20 Claims, 42 Drawing Sheets

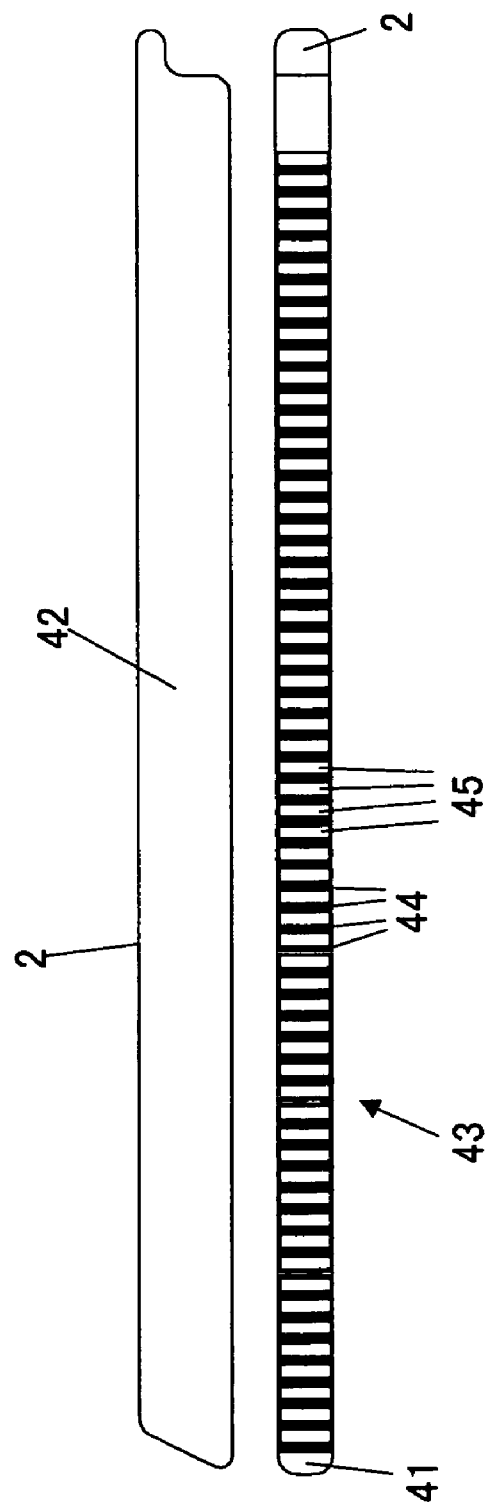

| Sliding Speed \|Va\| | Movement Distance Vv on the Fictive Coordinate |
|---|---|
| Va0 | Vv0 |
| ⋮ | ⋮ |
| Va15 | Vv15 |

Fig. 34

| Sliding Speed Range | Character Number | Duration Information | Next Form Information | Image Storage Location | Character Size | Color Palette | Depth | Sprite Size | Display Coordinate |
|---|---|---|---|---|---|---|---|---|---|
| ThV<\|Val\|≦V1 | 1 | 5 | next | | | | | | |
| V1<\|Val\|≦V2 | 1 | 3 | next | | | | | | |
| V2<\|Val\|≦V3 | 1 | 2 | next | | | | | | |
| V3<\|Val\| | 1 | 1 | next | | | | | | |
| ... | ... | ... | ... | adr0 | a0 Pixels × b0 Pixels | P0 | D0 | A0 Pixels × B0 Pixels | (Xc, Yc) |
| ThV<\|Val\|≦V1 | 10 | 5 | top | | | | | | |
| V1<\|Val\|≦V2 | 10 | 3 | top | | | | | | |
| V2<\|Val\|≦V3 | 10 | 2 | top | | | | | | |
| V3<\|Val\| | 10 | 1 | top | | | | | | |
| \|Val\|≦ThV | 11 | 4 | self | | | | | | |

| Time | Appearance Location |
|------|---------------------|
| t1   | (X1, Y1)            |
| t2   | (X2, Y1)            |
| .    | .                   |
| .    | .                   |
| .    | .                   |

IMAGE SIGNAL GENERATING APPARATUS, AN IMAGE SIGNAL GENERATING PROGRAM AND AN IMAGE SIGNAL GENERATING METHOD

This application claims foreign priority based on Japanese Patent application No. 2004-12168, filed Jan. 20, 2004, the contents of which is incorporated herein by reference in its entirety.

BACKGROUND OF THE INVENTION

1. Field of the Invention

The present invention is related to an image signal generating apparatus operable to generate an image signal on the basis of a pulse signal issued in response to sliding operation performed by an operator.

2. Description of the Related Art

Jpn. unexamined patent publication No. 09-212162 discloses an electric string instrument. The electric string instrument comprises a main body provided with a reflective photo interrupter and a bow having a thin reflective member which reflects light. The bow is formed with a black pattern in the side surface thereof. Rectangular black areas are arranged at an equal interval in order to form this black pattern. Each rectangular black area is a light absorption area. Therefore, when sliding operation is performed with the bow, the black pattern of the bow absorbs light emitted from the photo interrupter, and other part reflects light emitted from the photo interrupter. Consequently, a pulse signal of a cycle corresponding to sliding velocity is input to a microcomputer in the main body from the photo interrupter. The microcomputer performs sound volume control in accordance with the cycle of the pulse signal. As just described, the electric string instrument is an apparatus to play music.

SUMMARY OF INVENTION

It is an object of the present invention to provide an image signal generating apparatus which generates an image signal on the basis of a pulse signal generated in response to sliding operation performed by an operator and the related techniques thereof.

In accordance with the first aspect of the present invention, an image signal generation apparatus comprises a main body provided with a part to be slid, a sliding operation piece that is operated to slidably move in contact with the part to be slid of said main body, a processor operable to generate an image signal corresponding to sliding speed of said sliding operation piece, and wherein said main body includes a measuring unit operable to measure the sliding speed of said sliding operation piece.

In accordance with this configuration, the operator can give changes to a displayed image by changing the sliding speed of the sliding operation piece.

For example, the processor controls movement velocity of a character image displayed on a display device on the basis of the sliding speed of said sliding operation piece.

In accordance with the second aspect of the present invention, an image signal generation apparatus comprises a main body provided with a part to be slid, a sliding operation piece that is operated to slidably move in contact with the part to be slid of said main body, a processor operable to generate an image signal corresponding to sliding time of said sliding operation piece without a change in direction, and wherein said main body includes a measuring unit operable to measure the sliding time of said sliding operation piece.

In accordance with this configuration, the operator can give changes to a displayed image by changing the sliding time of the sliding operation piece.

For example, the processor controls movement distance of a character image displayed on a display device on the basis of the sliding time of said sliding operation piece.

In accordance with the third aspect of the present invention, an image signal generation apparatus comprises a main body provided with a part to be slid, a sliding operation piece that is operated to slidably move in contact with the part to be slid of said main body, a processor operable to generate an image signal corresponding to sliding direction of said sliding operation piece, and wherein said main body includes a measuring unit operable to measure the sliding direction of said sliding operation piece.

In accordance with this configuration, the operator can give changes to a displayed image by changing the sliding direction of the sliding operation piece.

For example, the processor controls movement direction of a character image displayed on a display device on the basis of the sliding direction of said sliding operation piece.

In accordance with the first and second aspects of the present invention, the image signal generation apparatus wherein said measuring unit includes a optical sensor having a light emitting element and light receiving element, wherein said sliding operation piece is formed with first light receiving areas and second light receiving areas which are alternately arranged in longitudinal direction and have different optical characteristic, wherein said light receiving element operable to receive light from said light emitting element via said first light receiving areas of said sliding operation piece and convert it into an electrical signal, and wherein said processor generate the image signal corresponding to the electrical signal output from said light receiving element.

In accordance with this configuration, it is possible to measure the sliding speed and the sliding time of the sliding operation piece with ease.

In accordance with the first to third aspects of the present invention, the image signal generation apparatus wherein said measuring unit comprises a optical sensor having a light emitting element, a first light receiving element and a second light receiving element, wherein said sliding operation piece is formed with first light receiving areas and second light receiving areas which are alternately arranged in longitudinal direction and have different optical characteristic, wherein said first light receiving element operable to receive light from said light emitting element via said first light receiving areas of said sliding operation piece and convert it into a first electrical signal, wherein said second light receiving element operable to receive light from said light emitting element via said first light receiving areas of said sliding operation piece and convert it into a second electrical signal, wherein said first light receiving element and said second light receiving element are arranged at a predetermined distance in the sliding direction, and the predetermined distance is selected in order to create a certain phase difference between the first electrical signal and the second electrical signal, and wherein said processor generates the image signal on the basis of the first electrical signal and the second electrical signal.

In accordance with this configuration, it is possible to measure the sliding speed, the sliding time and the sliding direction of the sliding operation piece with ease.

In accordance with the first to third aspects of the present invention, the processor executes a program stored in a storage medium, and generates the image signal on the basis of image information stored in the storage medium.

In accordance with this configuration, the user can enjoy various applications by changing the storage medium.

In accordance with the first to third aspects of the present invention, the processor generates an audio signal in response to a trigger issued on the basis of sliding operation of said sliding operation piece.

In accordance with this configuration, the operator can control sound outputting as well as the image by operating the sliding operation article.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein:

FIG. 4A is a side view showing the sliding operation piece 2 of FIG. 1.

FIG. 4B is a bottom view showing the sliding operation piece 2 of FIG. 1.

FIG. 34 is a view showing an example of the animation tables.

DESCRIPTION OF THE PREFERRED EMBODIMENTS

In what follows, an embodiment of the present invention will be explained in conjunction with the accompanying drawings. Meanwhile, like references indicate the same or functionally similar elements throughout the respective drawings, and therefore redundant explanation is not repeated.

Figure 1:
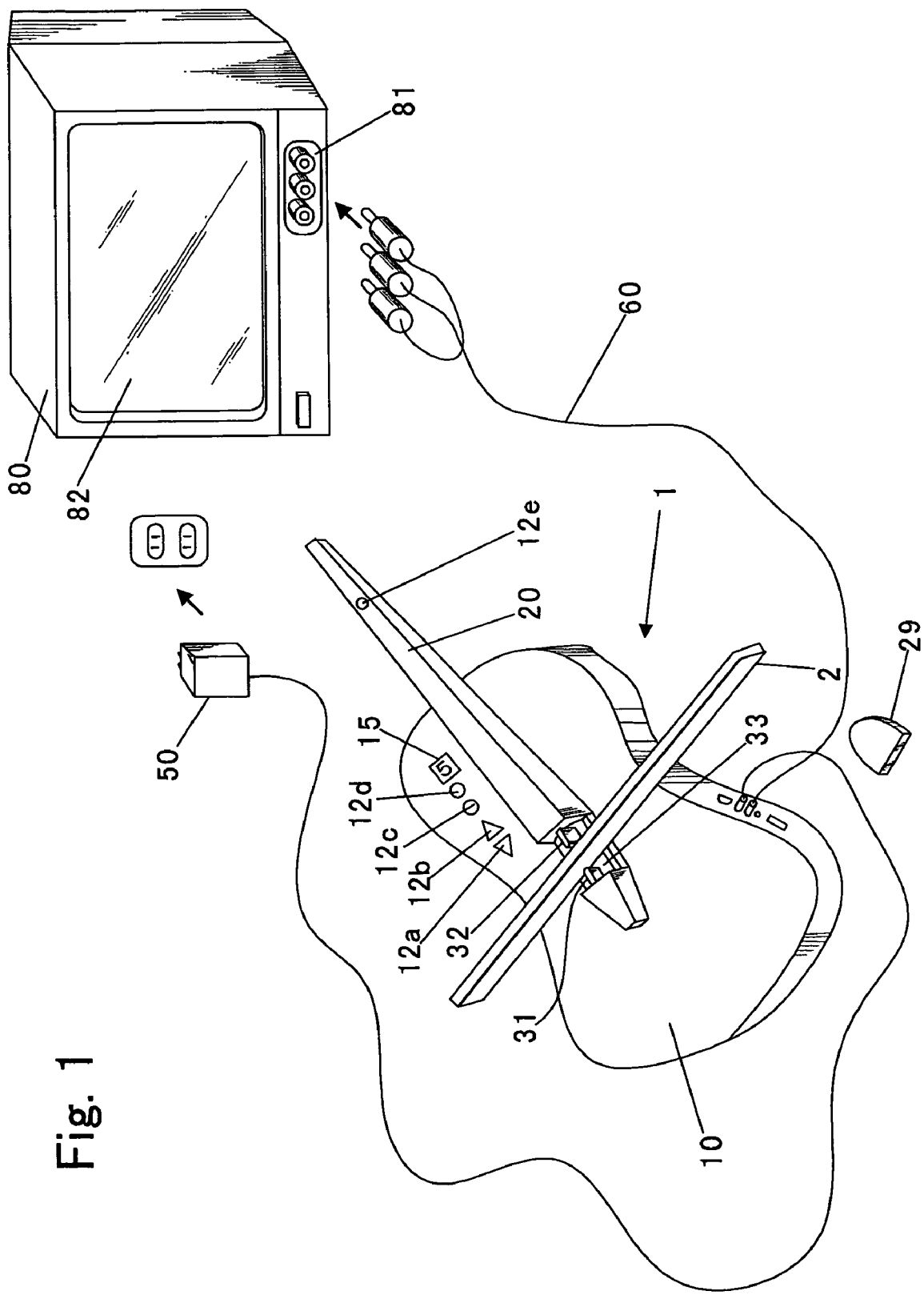
FIG. 1 is a schematic diagram showing the overall configuration of the automatic musical instrument as an image signal generating apparatus in accordance with the embodiment of the present invention.
Figure 2:
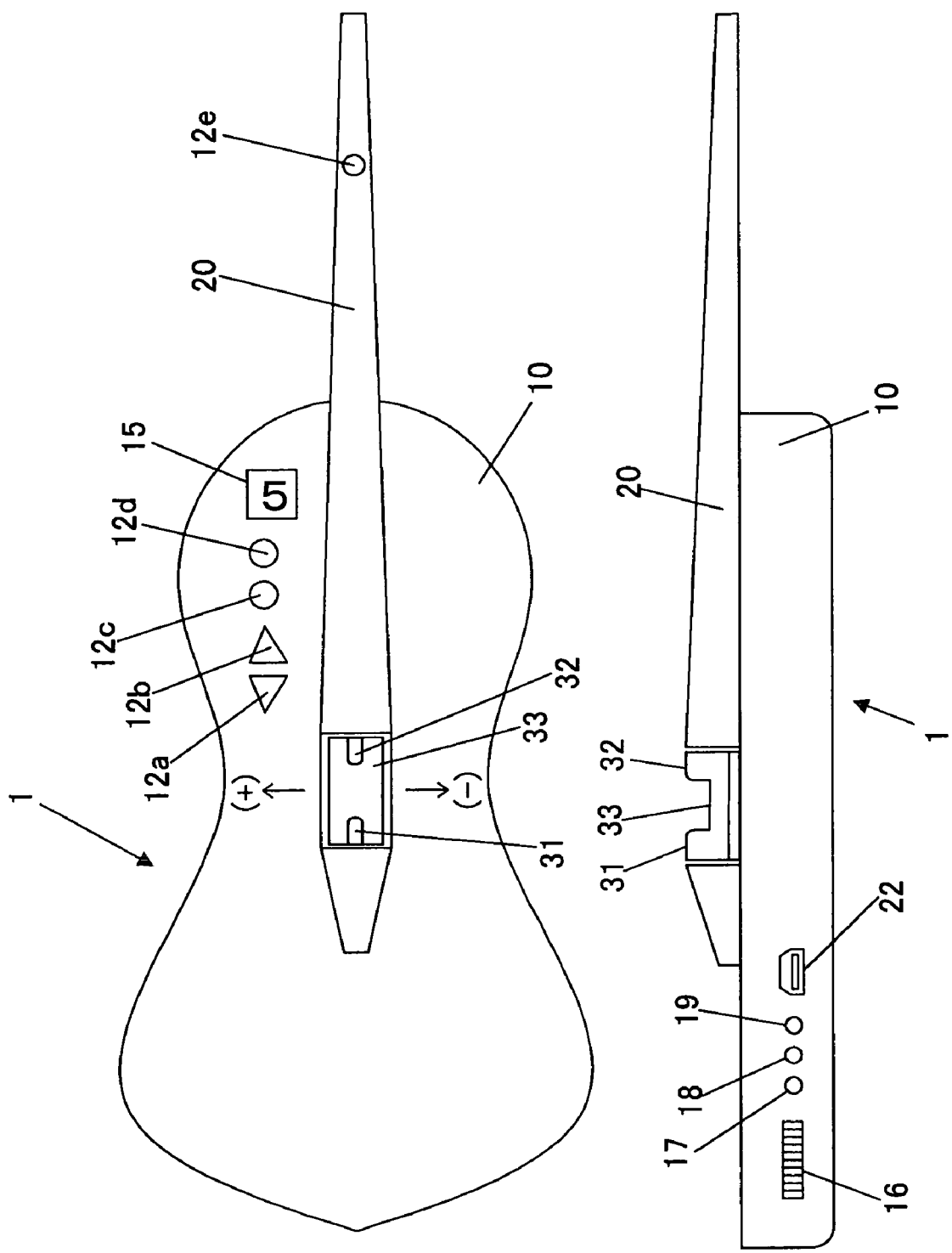
FIG. 2A is a plan view of the automatic musical instrument main body 1 of FIG. 1.
FIG. 2B is a lateral view of the automatic musical instrument main body 1 of FIG. 1.
Figure 3:
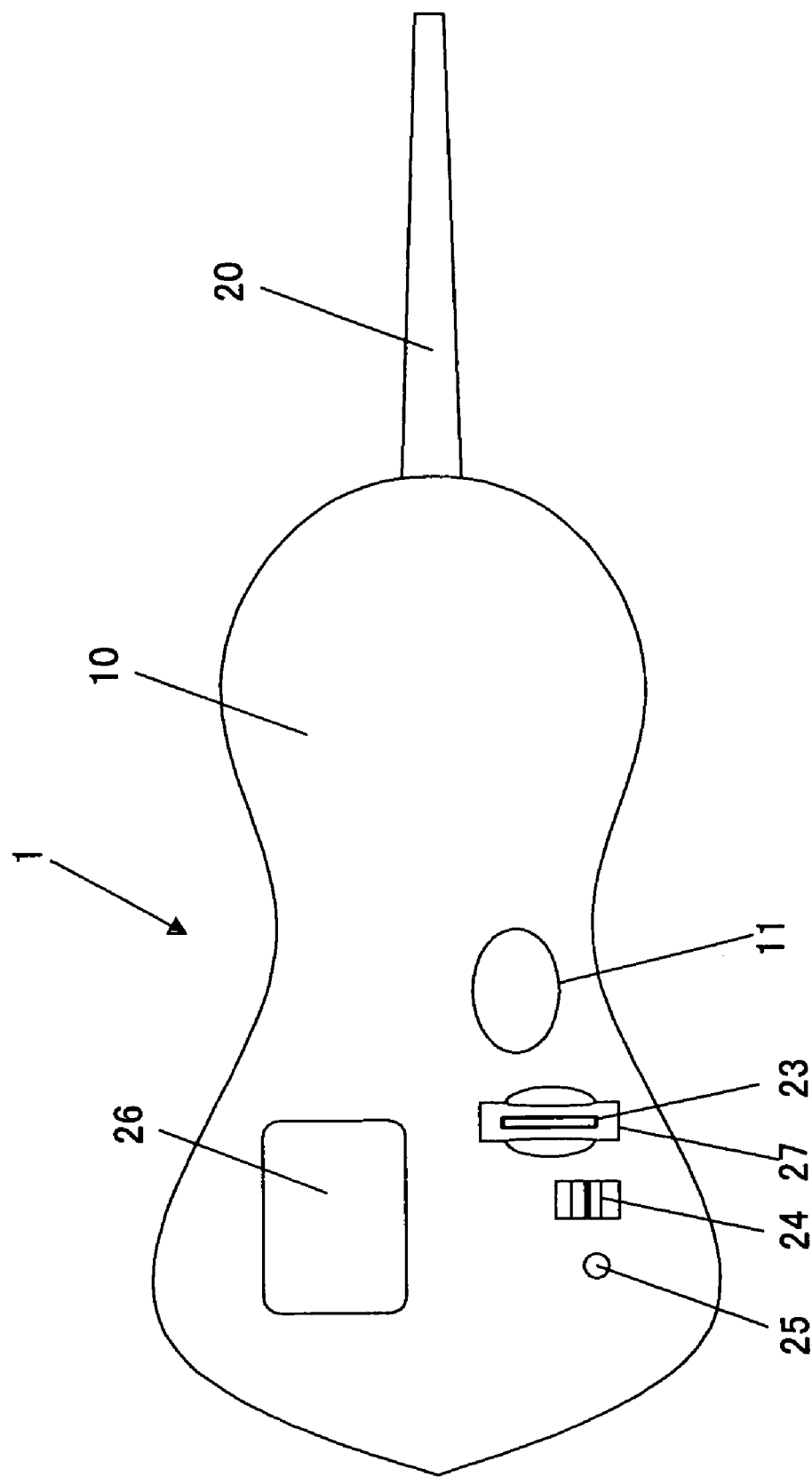
FIG. 3 is a bottom view of the automatic musical instrument main body 1 of FIG. 1.

FIG. 1 is a schematic diagram showing the overall configuration of an automatic musical instrument as an image signal generating apparatus in accordance with the embodiment of the present invention. FIG. 2A is a plan view of a main body 1 of FIG. 1. FIG. 2B is a lateral view of the main body 1 of FIG. 1. FIG. 3 is a bottom view of the main body 1 of FIG. 1.

As illustrated in FIG. 1, the automatic musical instrument includes the main body 1 and a sliding operation piece 2. The main body 1 in accordance with the present embodiment is designed in the form of a violin as an exemplary design thereof. Accordingly, in this case, the sliding operation piece 2 corresponds to a bow.

The main body 1 is provided with a bout portion 10 which has a neck portion 20, a sliding saddle member 33, selection keys 12a and 12b, a cancel key 12c, a decision key 12d, and a display portion 15 on the surface thereof. Incidentally, since the main body 1 includes the sliding saddle member 33, it may be called as a sliding saddle body. The neck portion 20 is provided with a vibrato switch 12e for adding vibrato effects to musical tones on the surface thereof.

As illustrated in FIG. 2B, the bout portion 10 is also provided with a volume dial 16, a headphone terminal 17, an AV terminal 18, a power terminal 19, and a connector 22 on the side surface thereof.

Furthermore, as illustrated in FIG. 3, the bout portion 10 is provided with a reset switch 25 for resetting the hardware, a power switch 24, a speaker portion 11, a battery box 26, and a cartridge insertion slot 27 on the bottom surface thereof. A cartridge socket 23 is provided behind this cartridge insertion slot 27. This power switch 24 is a slide switch having an "off" position at one end, a television mode position at the center, and a speaker mode position at the other end. In the television mode, sound is output from the speaker of the television monitor 80. In the speaker mode, sound is output from the speaker portion 11 of the main body 1. The sound volume of the musical tones as output from the speaker portion 11 can be adjusted by the volume dial 16.

A memory cartridge 29 containing a ROM (read only memory) as illustrated in FIG. 1 is inserted into the cartridge socket 23. Alternatively, the memory cartridge 29 to be inserted may contain an EEPROM (electrically erasable and programmable read only memory) instead. Incidentally, the memory contained in the memory cartridge 29 is not limited thereto.

Returning to FIG. 1, the television monitor 80 includes a screen 82 at the front side and an AV terminal 81 below the screen 82. Then, the main body 1 and the television monitor 80 are connected to each other by an AV cable 60. More specifically speaking, the AV terminal 18 of the main body 1 and the AV terminal 81 of the television monitor 80 are connected to each other by the AV cable 60. On the other hand, a DC power voltage is applied to the main body 1 by an AC adaptor 50 through the power terminal 19. Alternatively, battery cells (not shown in the figure) placed in the battery box 26 can be used to apply the DC power voltage in place of the AC adaptor 50. Also, it is possible to use the main body 1 with a headphone (not shown) connected thereto. The sound volume of the musical tones as output from the headphone can be adjusted by the volume dial 16.

The sliding saddle member 33 will be explained with reference to FIG. 2A and FIG. 2B. As explained later, the sliding saddle member 33 is designed in the form of an arc as viewed in cross section. A guide 31 and a guide 32 are projected from the opposite ends of the sliding saddle member 33 along the peak of this sliding saddle member 33. The opposite side surfaces of the guides 31 and 32 are rounded in a plan view and provided to come into contact with the sliding operation piece 2 during operation. This configuration is selected for the purpose of allowing smooth movement of the sliding operation piece 2 even with the guides 31 and 32 being in contact therewith and preventing the wear of the guides 31 and 32 due to the sliding contact between the sliding operation piece 2 and the guides 31 and 32. The operator can take control of the automatic performance of the automatic musical instrument or the movement of a character displayed on the screen 82 by sliding the sliding operation piece 2 that is located between the guide 31 and the guide 32 of the sliding saddle member 33.

FIG. 4A is a side view showing the sliding operation piece 2 of FIG. 1, and FIG. 4B is a bottom view thereof. As illustrated in FIG. 4B, the sliding operation piece 2 is formed with a reflecting pattern 43 in the bottom surface 41 thereof. This reflecting pattern 43 comprises light reflecting regions 45 and light absorbing regions 44 which are alternately arranged. The light reflecting region 45 reflects incident light while the light absorbing region 44 absorbs incident light.

The operator slides this sliding operation piece 2 in such a manner that the bottom surface 41 of this sliding operation piece 2 keeps in contact with the sliding saddle member 33.

Figure 5A:
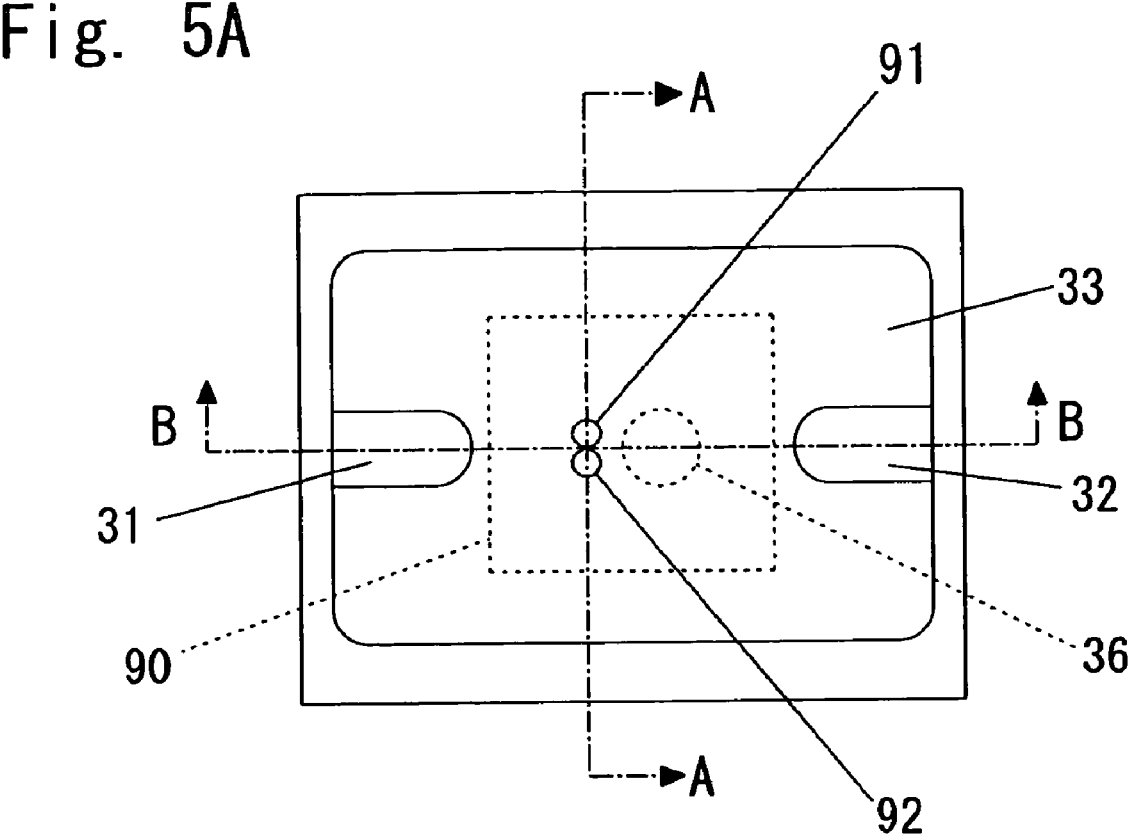
FIG. 5A is an expanded view showing the sliding saddle member 33 as shown in FIG. 2A.
Figure 5B:
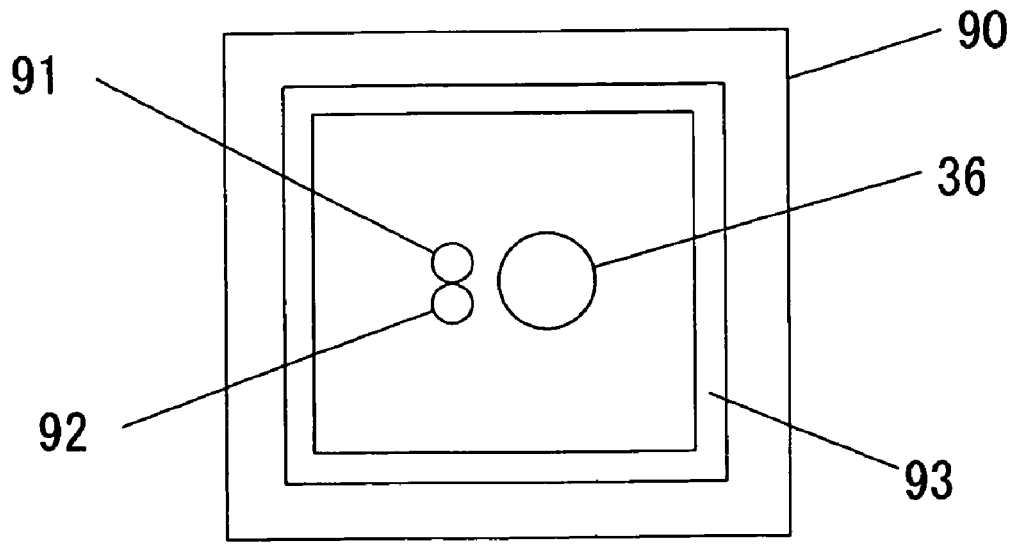
FIG. 5B is a plan view showing the optical sensor unit 90 as shown in FIG. 5A.

FIG. 5A is an expanded view showing the sliding saddle member 33 as shown in FIG. 2A, and FIG. 5B is a plan view showing the optical sensor unit 90 as shown in FIG. 5A. As illustrated in FIG. 5A, the optical sensor unit 90 is located inside the sliding saddle member 33 in such a position that the sliding operation piece 2 is passed thereover. This optical sensor unit 90 includes a light emitting diode 36, optical fibers 91 and 92, and phototransistors 34 and 35 (not shown in FIG. 5). The optical fiber 91 and the optical fiber 92 are arranged along the sliding direction of the sliding operation piece 2. On the other hand, the light emitting diode 36 is located and opposed to the optical fibers 91 and 92. Meanwhile, as illustrated in FIG. 5B, an adhering member 93 is attached to the upper surface of the optical sensor unit 90 along the peripheral edge, i.e., the surface contacting the inner surface of the sliding saddle member 33. This adhering member 93 serves to provide close contact between the optical sensor unit 90 and the sliding saddle member 33.

Figure 6:
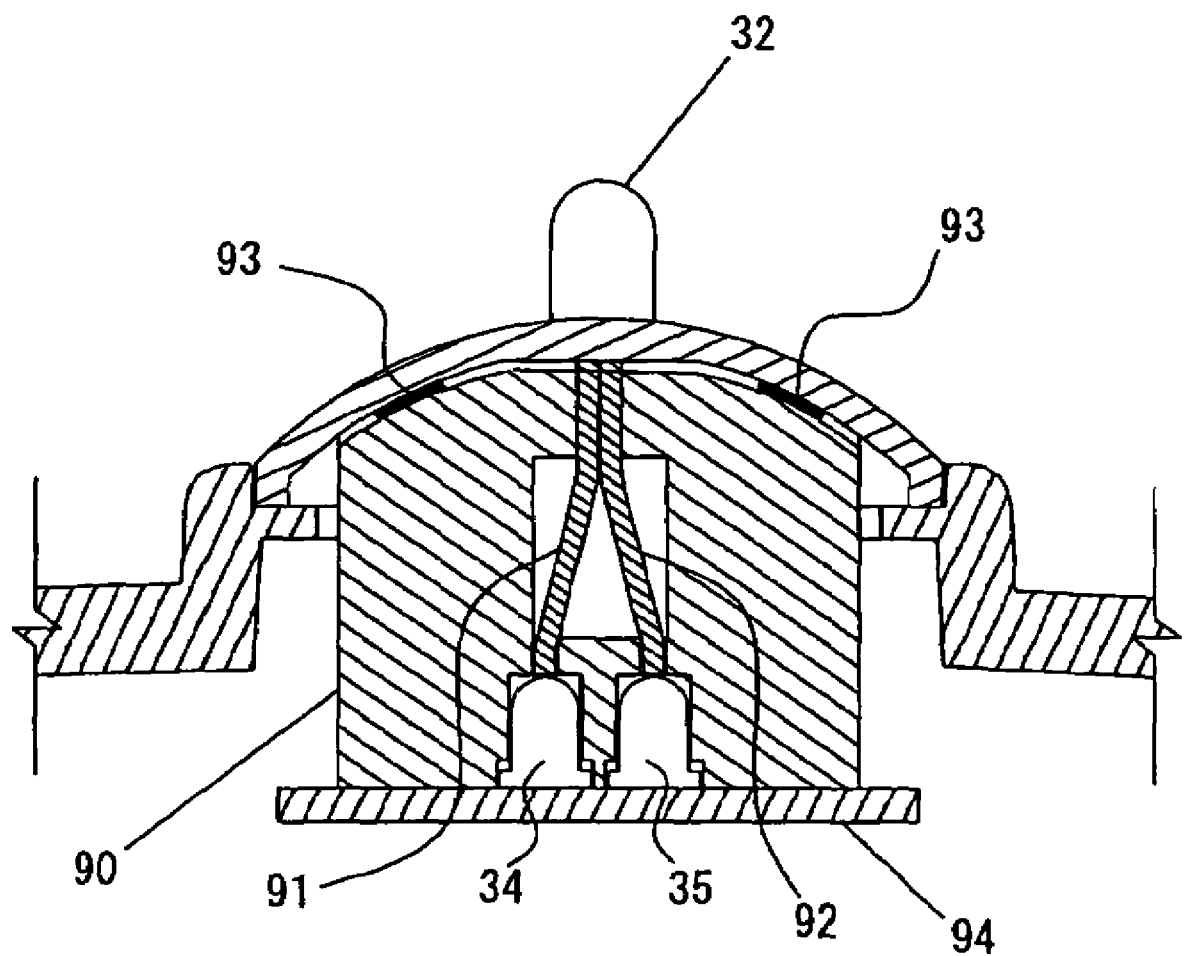
FIG. 6 is a cross sectional view along A-A line of FIG. 5A.
Figure 7:
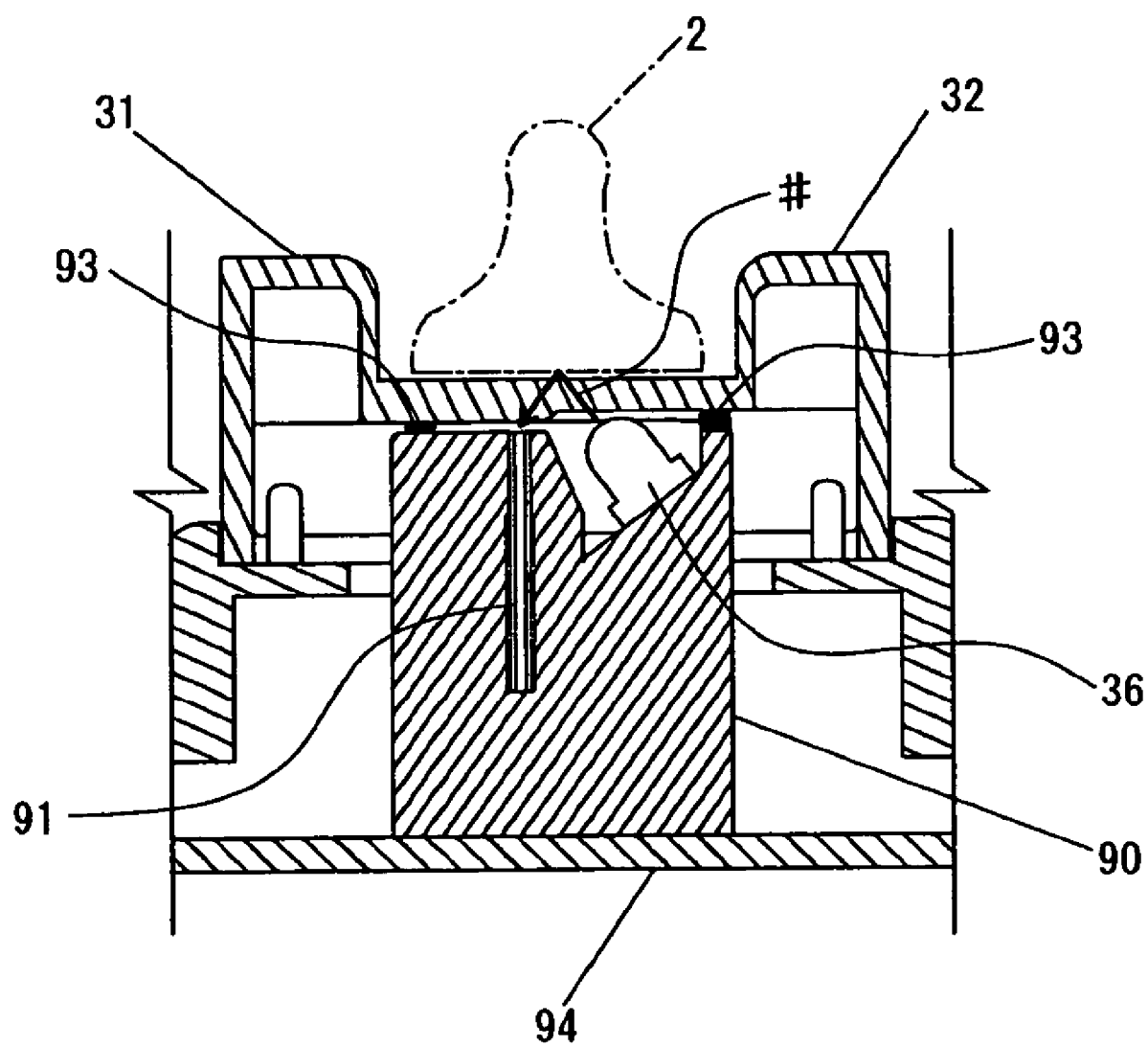
FIG. 7 is a cross sectional view along B-B line of FIG. 5A.

FIG. 6 is a cross sectional view along A-A line of FIG. 5A. FIG. 7 is a cross sectional view along B-B line of FIG. 5A. As illustrated in FIG. 6, the optical sensor unit 90 is closely attached to the inner surface of the sliding saddle member 33. One ends of the optical fibers 91 and 92 are exposed to the upper surface of the optical sensor unit 90 (from the surface portion located opposed to the sliding saddle member 33). The optical fiber 91 and the optical fiber 92 are arranged at a predetermined distance in the sliding direction. The predetermined distance is selected in order to create a certain phase difference between the pulse signal A of the phototransistor 34 and the pulse signal B of the phototransistor 35. This point will be explained later in detail.

On the other hand, the other ends of the optical fibers 91 and 92 are fixed respectively in the vicinity of the heads of the phototransistors 34 and 35. By this configuration, the light rays output from the light emitting diode 36 and reflected by the sliding operation piece 2 are led respectively to the phototransistors 34 and 35 by the optical fibers 91 and 92. The optical sensor unit 90 and the phototransistors 34 and 35 are mounted on a substrate 94. Furthermore, the phototransistors 34 and 35 are inserted respectively into the two holes which are opened in the bottom surface of the optical sensor unit 90. By this configuration, the phototransistors 34 and 35 are arranged in order to receive the light rays output from the optical fibers 91 and 92 but not to receive other light rays.

On the other hand, as illustrated in FIG. 7, the light emitting diode 36 is mounted on an inclined surface formed in the upper portion of the optical sensor unit 90. By this configuration, it is therefore possible to increase the amount of the incident light as illustrated with an arrow # output from the light emitting diode 36, reflected by the sliding operation piece 2 and then received by the optical fibers 91 and 92. Incidentally, the light emitting diode 36 serves to output infrared light. The sliding saddle member 33 serves as an infrared filter having the functionality of passing only the infrared light output from the light emitting diode 36 in order to let the phototransistors 34 and 35 detect only the infrared light.

Next, the automatic performance of the automatic musical instrument as shown in FIG. 1 will be explained. The operator connects the main body 1 with the television monitor 80 by the AV cable 60. Then, the power switch 24 (refer to FIG. 3) is turned on (in the television mode). The operation style selection screen (not shown) is displayed on the screen 82 of the television monitor 80, from which the operator selects the automatic performance mode by the selection keys 12a and 12b, and then presses the decision key 12d. Then, the music title selection screen (not shown) is displayed from which the operator selects a music title by the selection keys 12a and 12b, followed by pressing the decision key 12d. On the other hand, the number of the music title as selected is displayed on the display portion 15. When the operator selects and decides a music title, the performance can be started.

Figure 8:
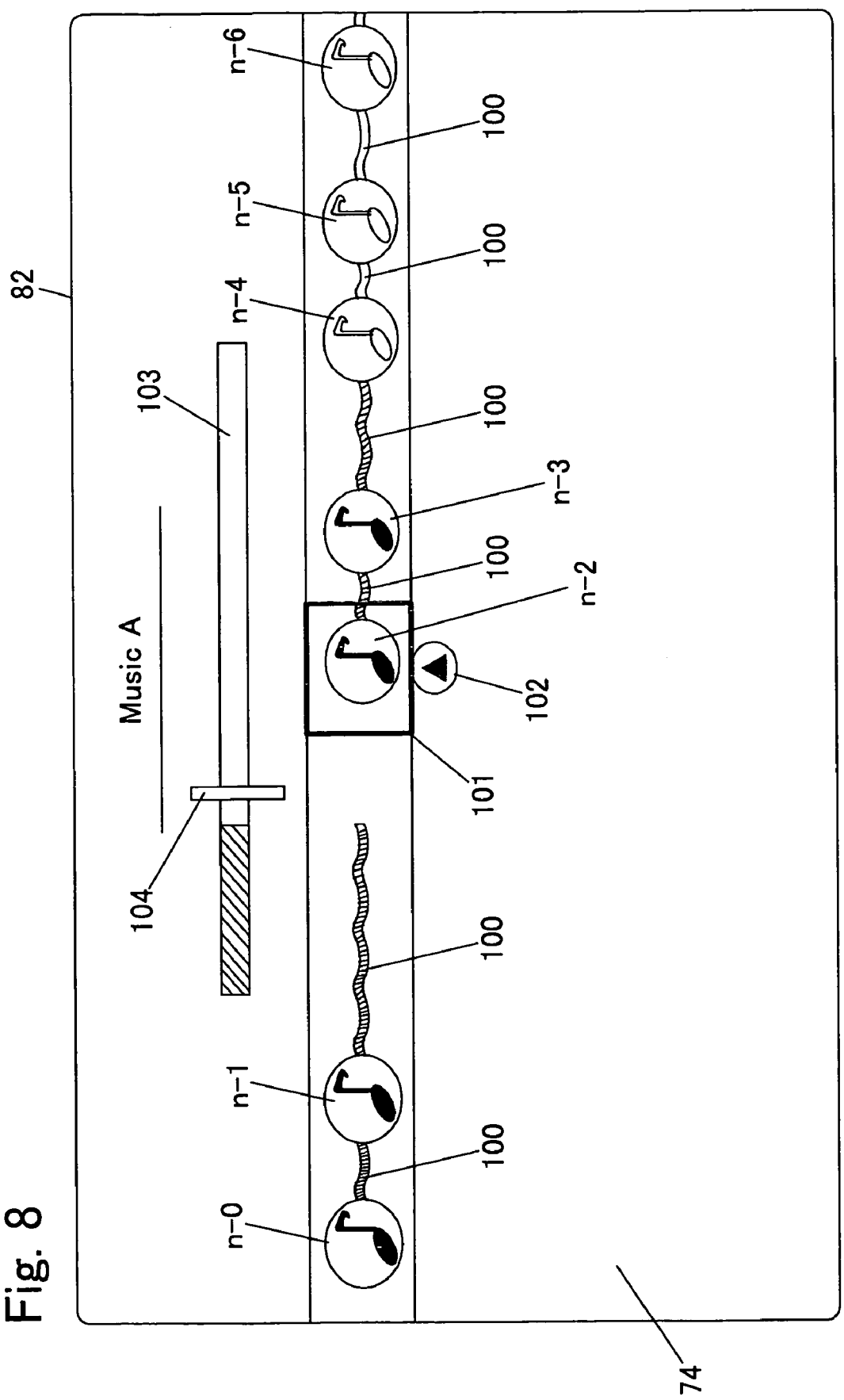
FIG. 8 is a view showing an example of an operation guide screen as displayed on the screen 82 of FIG. 1.

FIG. 8 is a view showing an example of an operation guide screen as displayed on the screen 82 of FIG. 1. When the operator selects and decides a music title, the operation guide screen (refer to FIG. 8) is displayed on the screen 82. The music title as selected by the operator is displayed in the vicinity of the upper location of this operation guide screen. In this case, music A is displayed as a music title. An indicator 103 is displayed below the music title. This indicator 103 indicates the progress of the BGM (background music). Namely, the entire length of the strip-shaped rectangle of the indicator 103 represents the entire time length of the music A. The left portion of the indicator 103 is shaded with a certain color and gradually extended with the progress of the BGM in order to indicate the current time position of the BGM as being currently played back. For this reason, as the playback of the BGM advances, the area of the indicator 103 shaded with the certain color increases and completely fills the entirety of the indicator 103 when the music A ends.

Furthermore, the indicator 103 is overlaid with a vertical bar 104 for indicating the current operation position by the operator. Accordingly, the operator can see how much the current operation position is displaced from the appropriate operation position. Namely, since the appropriate current operation position corresponds to the leading edge (right end) of the left portion of the indicator 103 which is shaded with the certain color, the operator can see how much the current operation position is displaced from the appropriate operation position by comparing the position of this leading edge (right end) with the position of the vertical bar 104 indicating the current operation position of the operator. The term "operation position" stands for the position in the time domain relating to the entirety of the music.

Also, musical notation marks n-0, . . . , n-6, . . . , are displayed below the indicator 103 as an operation guide. In the following description, the term "musical notation mark n" is used to generally represent the musical notation marks n-0, . . . , n-6, . . . .

This musical notation mark "n" appears from the right end of the screen 82, then moves to the left in synchronism with the tempo of the BGM, and finally disappears at the left end of the screen 82. If the operator generates a trigger by operation of the sliding operation piece 2 at the right moment when this musical notation mark "n" enters a correct timing indication square 101 or passes directly above a correct timing mark 102, then the automatic musical instrument outputs musical tones keeping pace with the tempo of the BGM.

Also, the distance between adjacent ones of this musical notation mark "n" represents the timely distance between the corresponding notes written in the musical score of the music A as selected. Accordingly, the operator can intuitively recognize the correct timing of operating the sliding operation piece 2 by taking a look at this distance. In this situation, the timing of operating the sliding operation piece 2 means the timing of generating the trigger.

Furthermore, a note length indication bar 100 associated with the musical notation mark "n" represents a period for which the output of a musical tone is continued. Accordingly, the operator can intuitively recognize the period of maintaining the output of the musical tone by taking a look at this note length indication bar 100. Incidentally, the note length indication bar 100 associated with the musical notation mark n-1 does not reach to the next musical notation mark n-2. This means that a rest notation exists at the end (right end) of this note length indication bar 100.

Furthermore, when the operator operates the sliding operation piece 2 to have the automatic musical instrument output a musical tone, the color of the musical notation mark "n" corresponding to the output musical tone and the color of the note length indication bar 100 associated with the musical notation mark "n" are changed. Therefore, the operator can intuitively recognize which musical notation mark "n" corresponding to the musical tone the automatic musical instrument is currently outputting in response to the trigger, by looking at the color change.

Next, the trigger will be explained. As mentioned above, the operator generates the trigger by operating the sliding operation piece 2. Musical tones are thereby output one by one in response to the generation of each trigger. The trigger is generated when the sliding direction of the sliding operation piece 2 is changed while the speed of the sliding operation piece 2 relative to the main body 1 (sliding speed) exceeds a predetermined threshold. Also, the sound volume of musical tones can be controlled in accordance with the sliding speed of the sliding operation piece 2.

Next, a game process performed by the automatic musical instrument of FIG. 1 on the basis of the sliding speed of the sliding operation piece 2 will be explained. In this embodiment, a running game is explained as an example of a game on the basis of the sliding speed of the sliding operation piece 2. When the operator selects a game mode in the mode selection screen (not shown), a game selection screen is displayed. The operator selects the running game by the selection keys 12a and 12b, and presses the decision key 12d. Then, the running game will be started.

Figure 9:
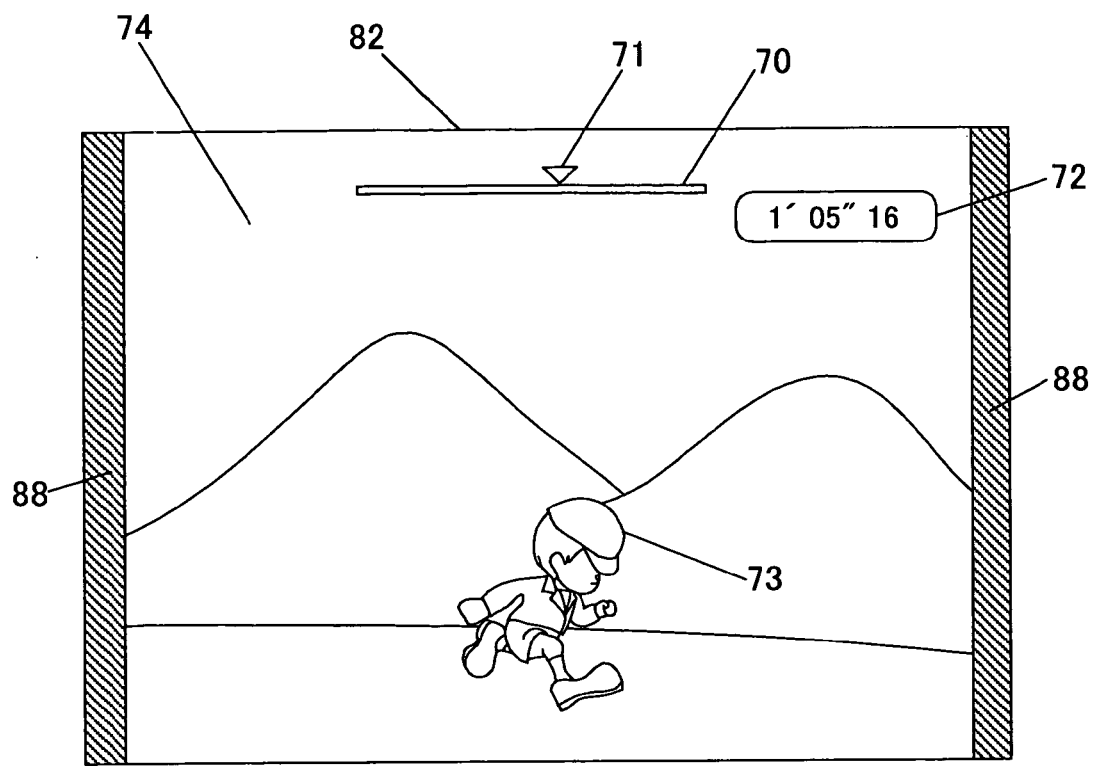
FIG. 9 is a view showing an example of the running game screen performed by the automatic musical instrument of FIG. 1.

FIG. 9 is a view showing an example of the running game screen performed by the automatic musical instrument of FIG. 1. As illustrated in FIG. 9, the running game screen displayed on the screen 82 includes a character 73, a background 74, a time indicating portion 72, a current position indicating object 71, masks 88, and a total distance indicating bar 70. Moving speed of the character 73 (the speed relative to the background 74) is different depending on the sliding speed of the sliding operation piece member 2 operated by the operator. In other words, if the sliding speed is faster, the character 73 proceeds faster (the speed relative to the background 74 becomes faster) and the animation of the character 73 is performed faster. On the other hand, the sliding speed is slower, the character 73 proceeds slower (the speed relative to the background 74 becomes slower) and also the animation of the character 73 is performed slowly.

In addition to this, musical tones constituting music are output one by one every time a trigger is generated by the sliding operation piece 2. Therefore, if sliding operation of the sliding operation piece 2 performed by the operator is faster, the more up-tempo music is output. On the other hand, if sliding operation is slower, the more slow-tempo music is output. When music tones corresponding to all musical notes constituting the music are output, the game is over. In other words, if triggers are generated at a fast tempo, the game ends early and a time score from start to goal is short. On the other hand, if triggers are generated at a slow tempo, the game ends late and the time score is longer.

The total distance indicating bar 70 represents a total distance which the character 73 runs in the game. The current position indicating object 71 shows a location where the character 73 currently exists and it is displayed above the total distance indicating bar 70. More specifically, the length of the total distance indicating bar 70 is commensurate with the number of the musical notes constituting the music. The current position indicating object 71 proceeds by one each time a musical tone corresponding to one musical note is output. In addition, an elapsed time from start to current is displayed in the time indicating portion 72.

Next, a game process performed on the basis of the sliding time of the sliding operation piece 2 by the automatic musical instrument of FIG. 1 will be explained. In this embodiment, a flying game will be explained as an example of the game played on the basis of the sliding time of the sliding operation piece 2. The operator selects the flying game by the selection key 12a and 12b, and presses the decision key 12d. In this way, the flying game will be started.

Figure 10:
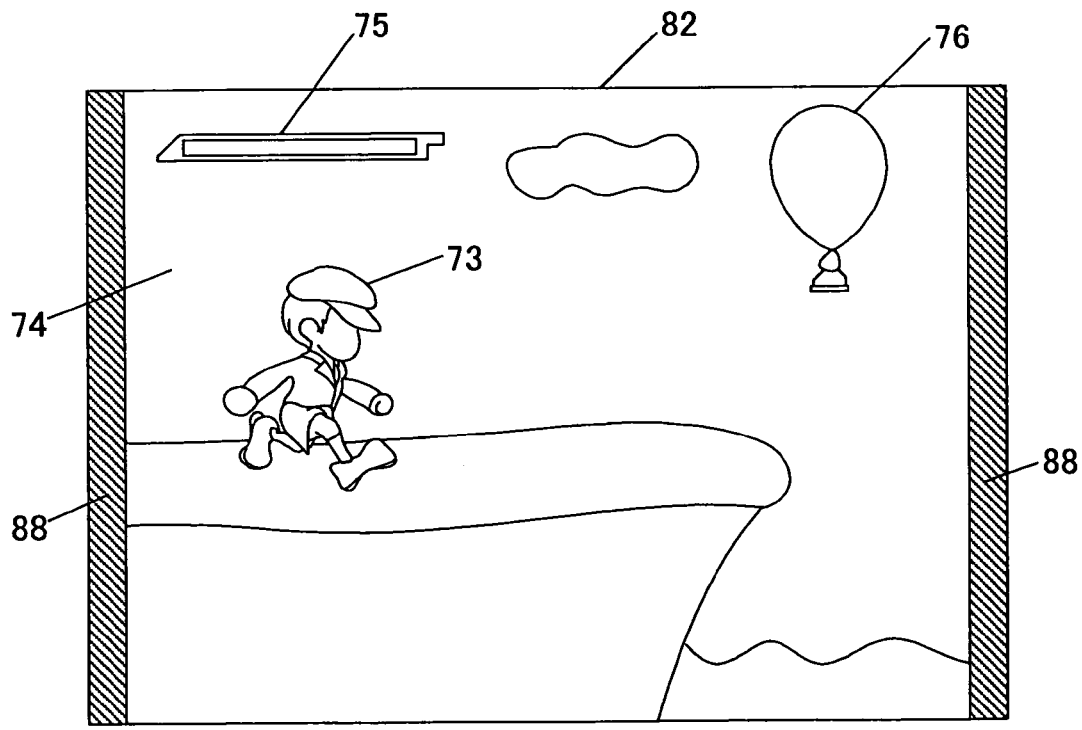
FIG. 10 is a view showing an example of a start screen of the flying game performed by the automatic musical instrument of FIG. 1.
Figure 11:
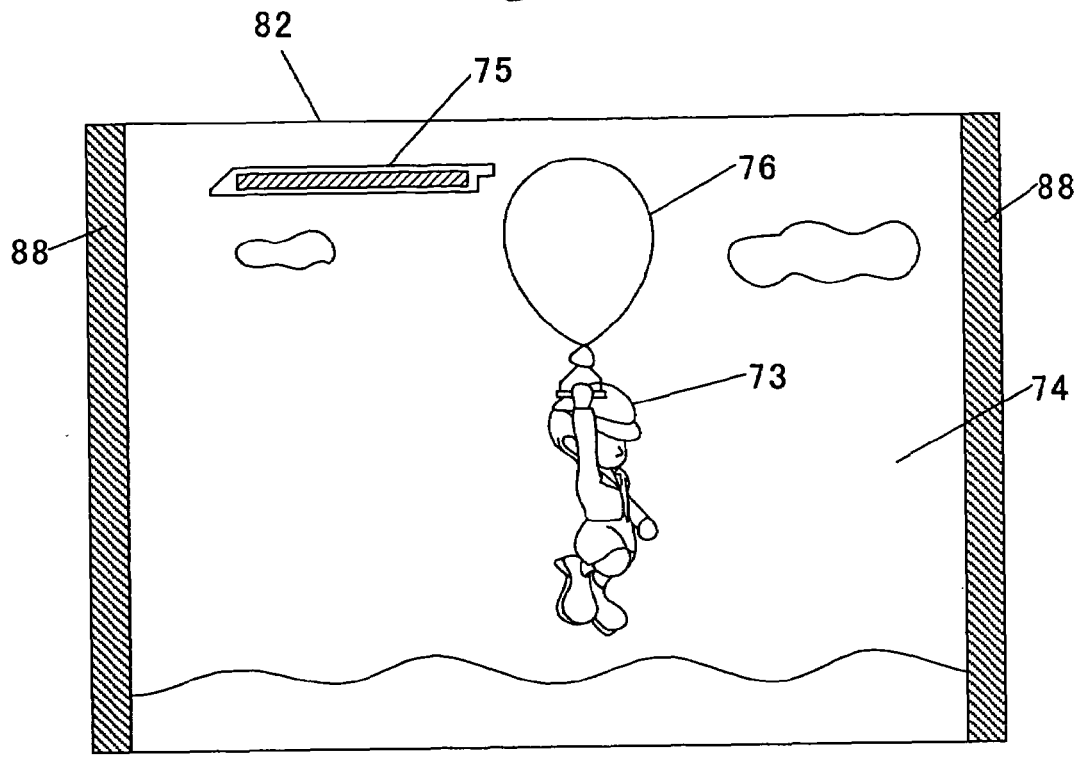
FIG. 11 is a view showing an example of a screen after the flying game starts.

FIG. 10 is a view showing an example of a start screen of the flying game performed by the automatic musical instrument of FIG. 1. FIG. 11 is a view showing an example of a screen after the game starts. As illustrated in FIG. 10, the start screen of the flying game displayed on the screen 82 includes the character 73, the background 74, an input indication bar 75, the masks 88 and a balloon object 76. As the game starts, the character 73 starts running. Then when the character 73 reaches a predetermined position, the character 73 jumps and grabs the balloon object 76. At the same time, the operator starts sliding the sliding operation piece 2. The color of the input indication bar 75 starts changing with the start (drawn by hatching in FIG. 11).

As long as the operator keeps sliding the sliding operation piece 2 continuously without changing the sliding direction, the character 73 keeps flying with hanging from the balloon object 76 as illustrated in FIG. 11. If the sliding speed of the sliding operation piece 2 falls below a certain value, it is considered as an end of the sliding operation. Consequently, the color of the input indicating bar 75 returns to the original color, and the character 73 which is hanging from the balloon object 76 starts descending with holding the balloon object 76. When the character 73 lands, the flying distance is displayed. If the operator keeps sliding for longer time without changing the sliding direction, the flying distance becomes longer. On the other hand, if the operator keeps sliding for shorter time without changing the sliding direction, the flying distance becomes shorter.

Next, a game process performed by the automatic musical instrument of FIG. 1 on the basis of the sliding direction of the sliding operation piece 2 will be explained. In this embodiment, a catch game will be explained as an example of a game performed on the basis of the sliding direction. The operator selects the catch game in the game selection screen by the selection key 12a and 12b, and presses the decision key 12d. In this way, the catch game will be started.

Figure 12:
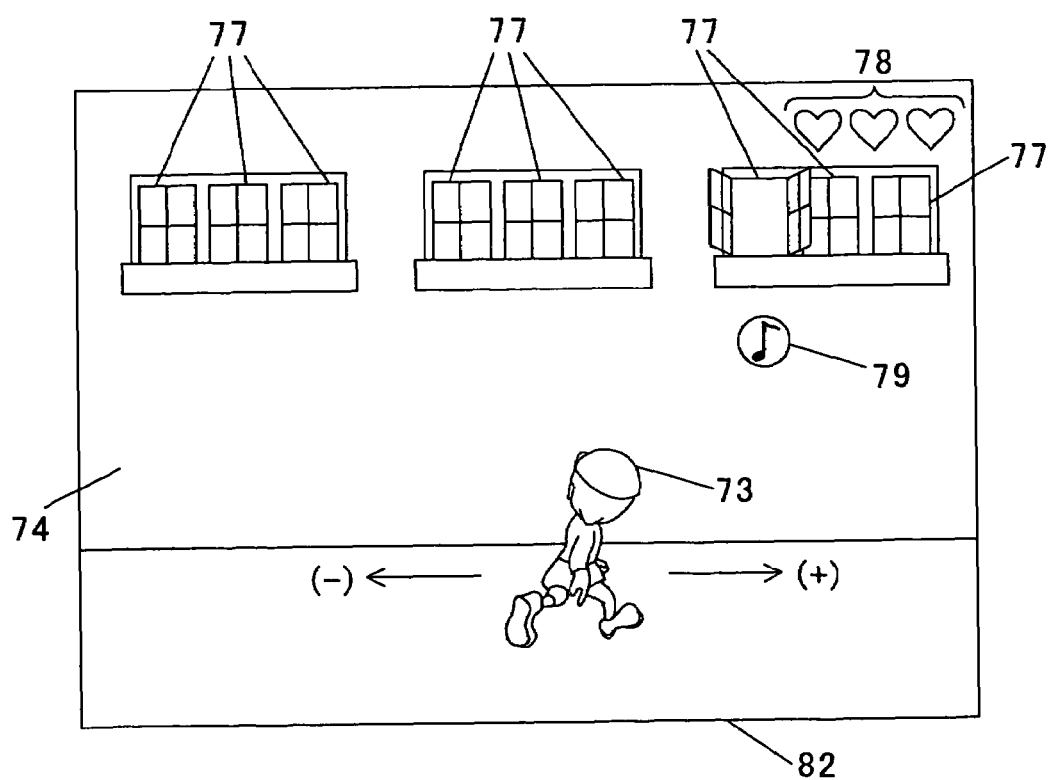
FIG. 12 is a view showing an example of a catch game screen performed by the automatic musical instrument of FIG. 1.

FIG. 12 is a view showing an example of a catch game screen performed by the automatic musical instrument of FIG. 1. As illustrated in FIG. 12, the catch game screen displayed on the screen 82 includes the character 73, the background 74, a falling object 79, window objects 77 and life objects 78. As the game starts, the window objects 77 open one after another and the falling objects 79 come down one after another from the window objects 77. When the operator slides the sliding operation piece 2 to the (+) direction of FIG. 2A, the character 73 moves in the (+) direction of FIG. 12. On the other hand, when the operator slides the sliding operation piece 2 to the (−) direction of FIG. 2A, the character 73 moves in the (−) direction of FIG. 12. The operator tries to catch the falling objects 79 before they clash into the ground by changing the moving direction of the character 73 by operating the sliding operation piece 2. If the falling object 79 clashes into the ground, one of the life objects 78 disappears. When all life objects 78 disappear, the game is over.

Figure 13:
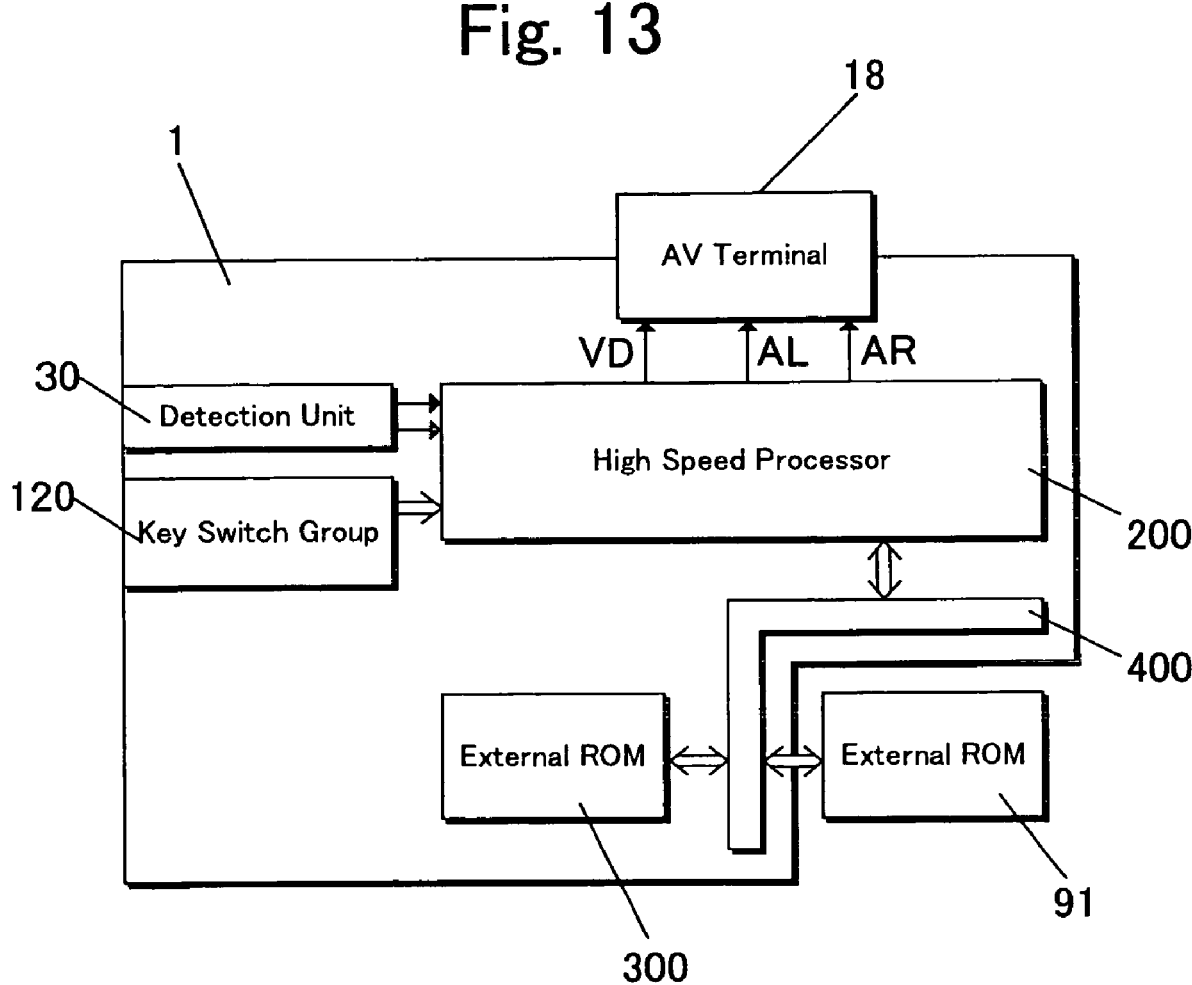
FIG. 13 is a view showing the electrical construction of the automatic musical instrument main body 1 as illustrated in FIG. 1.
Figure 15:
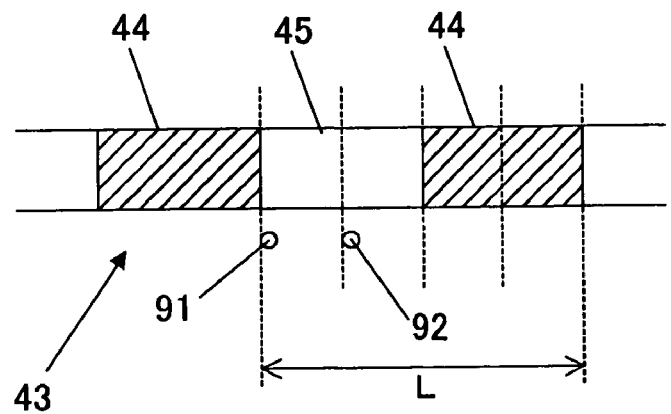
FIG. 15 is a schematic diagram showing the relationship between the reflecting pattern 43 of the sliding operation piece 2 and the locations of the optical fibers 91 and 92 of the optical sensor unit 90 of FIG. 5A.

Next, the electrical construction of the main body 1 will be explained. FIG. 13 is a view showing the electrical construction of the main body 1 as illustrated in FIG. 1. As illustrated in FIG. 15, the main body 1 includes a detection unit 30, a key switch group 120, the AV terminal 18, a high speed processor 200, an external ROM (read only memory) 300 and an external bus 400. The key switch group 120 includes the decision key 12d, the cancel key 12c, the selection keys 12a and 12b, and the vibrato switch 12e as described above. The detection unit 30 includes the optical sensor unit 90.

The high speed processor 200 is connected to the external bus 400. Furthermore, the external ROM 300 is connected to the external bus 400. Accordingly, the high speed processor 200 can access the external ROM 300 through the external bus 400 to read and execute the control program 301 as stored in the external ROM 300, and read and process the image data 30 and the music data 307 as stored in the external ROM 300.

Also, the high speed processor 200 can access the external ROM 91 contained in the memory cartridge 29 as inserted to the cartridge socket 23 through the external bus 400 to read and execute the control program 301 as stored in the external ROM 91, and read and process the image data 30 and the music data 307 as stored in the external ROM 91.

Furthermore, The high speed processor 200 serves to calculate the sliding direction, the sliding speed and the sliding time of the sliding operation piece 2 on the basis of the pulse signals A and B output from the phototransistors 34 and 35 of the detection unit 30 (refer to FIG. 6). Furthermore, the high speed processor 200 executes the process as indicated by on/off signals from the respective keys 12a to 12e of the key switch group 120.

Figure 14:
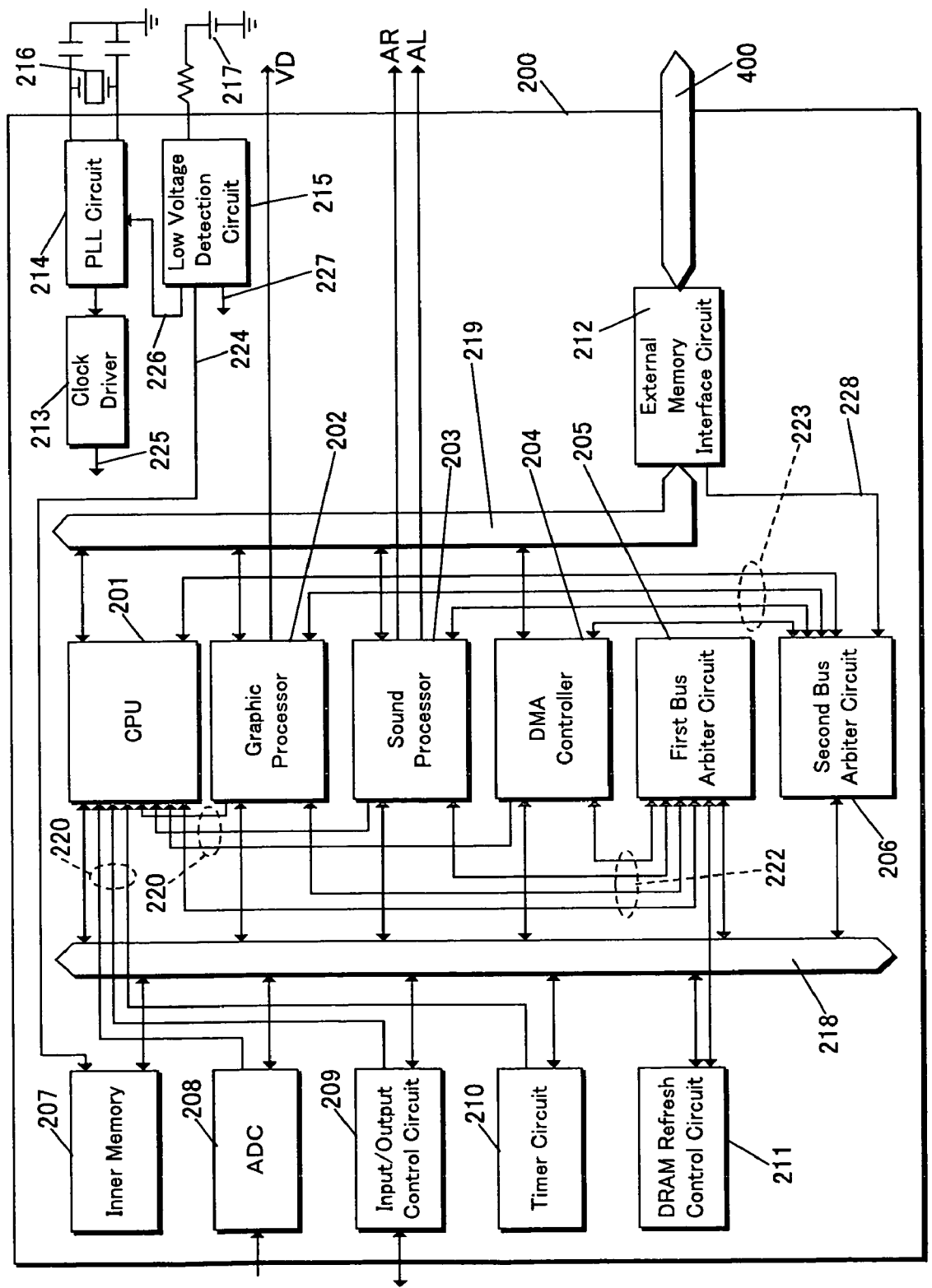
FIG. 14 is a block diagram of the high speed processor 200 of FIG. 13.

FIG. 14 is a block diagram of the high speed processor 200 of FIG. 13. As illustrated in FIG. 14, this high speed processor 200 includes a central processing unit (CPU) 201, a graphic processor 202, a sound processor 203, a DMA (direct memory access) controller 204, a first bus arbiter circuit 205, a second bus arbiter circuit 206, an inner memory 207, an A/D converter (ADC: analog to digital converter) 208, an input/output control circuit 209, a timer circuit 210, a DRAM (dynamic random access memory) refresh control circuit 211, an external memory interface circuit 212, a clock driver 213, a PLL (phase-locked loop) circuit 214, a low voltage detection circuit 215, a first bus 218, and a second bus 219.

The CPU 201 takes control of the entire system and performs various types of arithmetic operations in accordance with the program stored in the memory (the inner memory 207, the external ROM 300, or the external ROM 91). The CPU 201 is a bus master of the first bus 218 and the second bus 219, and can access the resources connected to the respective buses.

The graphic processor 202 is also a bus master of the first bus 218 and the second bus 219, and generates an image signal VD on the basis of the data as stored in the memory (the inner memory 207, the external ROM 300 or the external ROM 91), and output the image signal VD through the AV terminal 18. The graphic processor 202 is controlled by the CPU 201 through the first bus 218. Also, the graphic processor 202 has the functionality of outputting an interrupt request signal 220 to the CPU 201.

The sound processor 203 is also a bus master of the first bus 218 and the second bus 219, and generates audio signals AR and AL on the basis of the data as stored in the memory (the inner memory 207, the ROM 300 or the ROM 91), and output the audio signals AR and AL through the AV terminal 18. The sound processor 203 is controlled by the CPU 201 through the first bus 218. Also, the sound processor 203 has the functionality of outputting an interrupt request signal 220 to the CPU 201.

The DMA controller 204 serves to transfer data from the external ROM 300 or the external ROM 91 to the inner memory 207. Also, the DMA controller 204 has the functionality of outputting, to the CPU 201, an interrupt request signal 220 indicative of the completion of the data transfer. The DMA controller 204 is also a bus master of the first bus 218 and the second bus 219. The DMA controller 204 is controlled by the CPU 201 through the first bus 218.

The inner memory 207 may be implemented with one or any necessary combination of a mask ROM, an SRAM (static random access memory) and a DRAM in accordance with the system requirements. A battery 217 is provided if an SRAM has to be powered by the battery for maintaining the data contained therein. In the case where a DRAM is used, the so called refresh cycle is periodically performed to maintain the data contained therein.

The first bus arbiter circuit 205 accepts a first bus use request signal from the respective bus masters of the first bus 218, performs bus arbitration among the requests for the first bus 218, and issue a first bus use permission signal to one of the respective bus masters. Each bus master is permitted to access the first bus 218 after receiving the first bus use permission signal. In FIG. 14, the first bus use request signal and the first bus use permission signal are illustrated as first bus arbitration signals 222.

The second bus arbiter circuit 206 accepts a second bus use request signal from the respective bus masters of the second bus 219, performs bus arbitration among the requests for the second bus 219, and issue a second bus use permission signal to one of the respective bus masters. Each bus master is permitted to access the second bus 219 after receiving the second bus use permission signal. In FIG. 14, the second bus use request signal and the second bus use permission signal are illustrated as second bus arbitration signals 223.

The input/output control circuit 209 serves to perform input and output operations of input/output signals to enable the communication with external input/output device(s) and/or external semiconductor device(s). The read and write operations of input/output signals are performed by the CPU 201 through the first bus 218. Also, the input/output control circuit 209 has the functionality of outputting an interrupt request signal 220 to the CPU 201.

The pulse signals A and B from the above detection unit 30 and the on/off signals from the respective keys 12a to 12e of the key switch group 120 are input to the input/output control circuit 209.

The timer circuit 210 has the functionality of periodically outputting an interrupt request signal 220 to the CPU 201 with a time interval as preset. The setting of the timer circuit 210 such as the time interval is performed by the CPU 201 through the first bus 218.

The ADC 208 converts analog input signals into digital signals. The digital signals are read by the CPU 201 through the first bus 218. Also, the ADC 208 has the functionality of outputting an interrupt request signal 220 to the CPU 201.

The PLL circuit 214 generates a high frequency clock signal by multiplication of the sinusoidal signal as obtained from a crystal oscillator 216.

The clock driver 213 amplifies the high frequency clock signal as received from the PLL circuit 214 to a sufficient signal level to supply the respective blocks with the clock signal 225.

The low voltage detection circuit 215 monitors the power potential Vcc and issues the reset signal 226 of the PLL circuit 214 and the reset signal 227 to the other circuit elements of the entire system when the power potential Vcc falls below a certain voltage. Also, in the case where the inner memory 207 is implemented with an SRAM requiring the power supply from the battery 217 for maintaining data, the low voltage detection circuit 215 serves to issue a battery backup control signal 224 when the power potential Vcc falls below the certain voltage.

The external memory interface circuit 212 has the functionality of connecting the second bus 219 to the external bus 400 and issuing a bus cycle completion signal 228 of the second bus 219 to control the length of the bus cycle of the second bus.

The DRAM refresh cycle control circuit 211 periodically and unconditionally gets the ownership of the first bus 218 to perform the refresh cycle of the DRAM at a certain interval. Needless to say, the DRAM refresh cycle control circuit 211 is provided in the case where the inner memory 207 includes a DRAM.

In what follows, a method to obtain the sliding speed and the sliding direction of the sliding operation piece 2 will be discussed in detail.

FIG. 15 is a schematic diagram showing the relationship between the reflecting pattern 43 of the sliding operation piece 2 and the locations of the optical fibers 91 and 92 of the optical sensor unit 90 of FIG. 5A. As illustrated in FIG. 15, with reference to the reflecting pattern 43 of the sliding operation piece 2, "L" is the sum of the width of the light reflecting region 45 and the width of the light absorbing region 44. In this case, the exposed end of the optical fiber 91 is located "L/4" apart from the exposed end of the optical fiber 92. Here, the exposed end is the tip end of the optical fiber 91 or 92 and exposed to the inner surface of the sliding saddle member 33.

The phototransistors 34 and 35 receive, through the optical fibers 91 and 92, the infrared light output from the light emitting diode 36 and reflected by the reflecting pattern 43. Since the reflecting pattern 43 comprises the light reflecting regions 45 and the light absorbing regions 44 alternately arranged, the phototransistors 34 and 35 intermittently receive the infrared light when the sliding operation piece 2 is moved. Accordingly, when the sliding operation piece 2 is operated, the phototransistors 34 and 35 output the pulse signals A and B having a frequency in proportion to the sliding speed of the sliding operation piece 2. Namely, as the sliding speed of the sliding operation piece 2 increases, the frequency of the pulse signals A and B output from the phototransistors 34 and 35 increases. Conversely, as the sliding speed of the sliding operation piece 2 decreases, the frequency of the pulse signals output from the phototransistors 34 and 35 decreases.

Since the optical fiber 91 for directing infrared light to the phototransistor 34 is located "L/4" apart from the optical fiber 92 for directing infrared light to the phototransistor 35, the phase difference between the pulse signal A output from the phototransistor 34 and the pulse signal B output from the phototransistor 35 is (90 degrees) or (−90 degrees) depending upon the sliding direction of the sliding operation piece 2. This will be explained in detail.

Figure 16A:
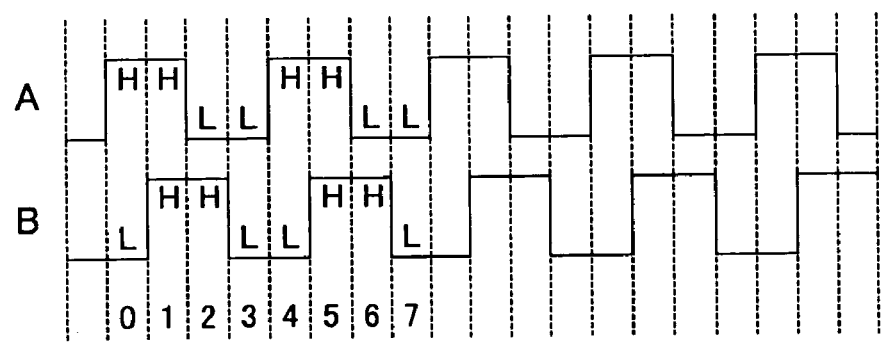
FIG. 16A is a view showing pulse signals A and B output from the phototransistors 34 and 35 when the sliding operation piece 2 is slid in (+) direction of FIG. 2A.
Figure 16B:
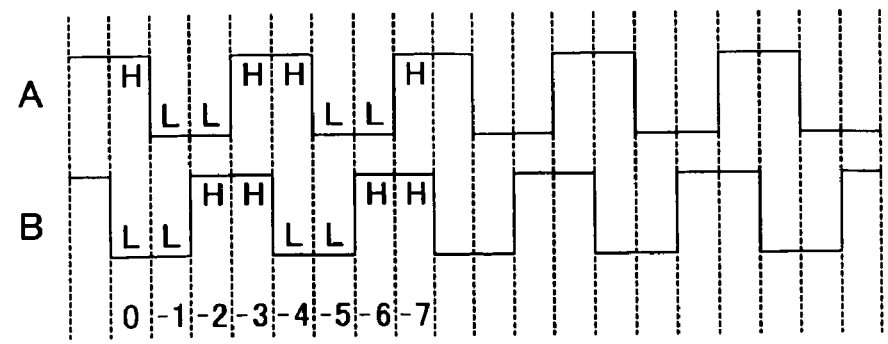
FIG. 16B is a view showing pulse signals A and B output from the phototransistors 34 and 35 when the sliding operation piece 2 is slid in (-) direction of FIG. 2A.

FIG. 16A is a view showing pulse signals A and B output from the phototransistor 34 and 35 when the sliding operation piece 2 is slid in (+) direction of FIG. 2A. FIG. 16B is a view showing pulse signals A and B output from the phototransistor 34 and 35 when the sliding operation piece 2 is slid in (−) direction of FIG. 2A. Incidentally, for the sake of clarity in explanation, FIG. 16A and FIG. 16B are illustrated on the assumption that the sliding speed of the sliding operation piece 2 is constant.

As illustrated in FIG. 16A and FIG. 16B, the phase difference between the pulse signal A as output from the phototransistor 34 and the pulse signal B as output from the phototransistor 35 is (90 degrees) or (−90 degrees). The state transition of the waveforms of the pulse signals A and B in combination is different between the case where the sliding operation piece 2 is moved in (+) direction and the case where the sliding operation piece 2 is moved in (−) direction. This point will be explained in detail.

Figure 17:
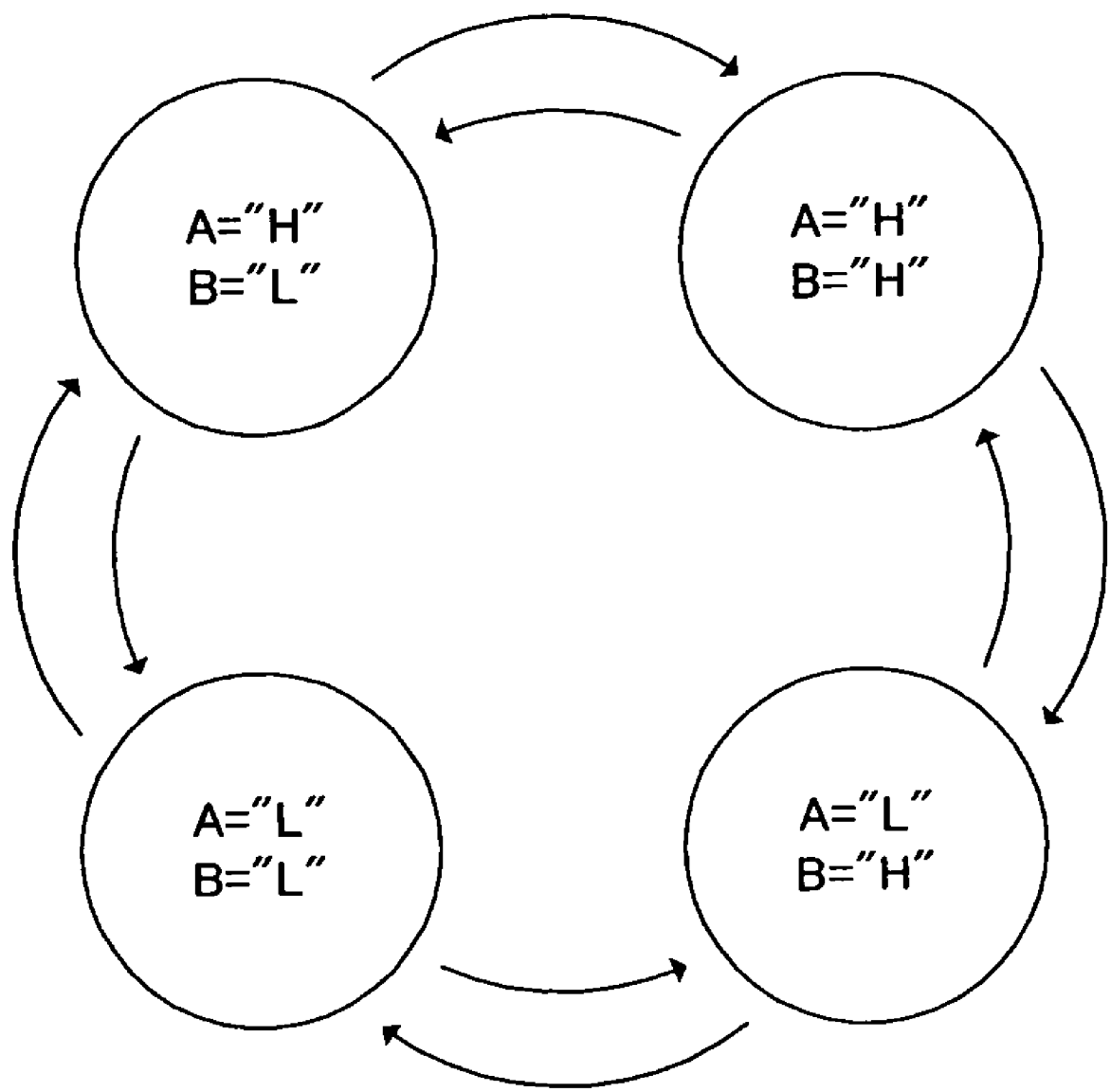
FIG. 17 is a schematic diagram showing the state transition of the pulse signals A and B as output from the phototransistors 34 and 35.

FIG. 17 is a schematic diagram showing the state transition of the pulse signals A and B as output from the phototransistors 34 and 35. When the sliding operation piece 2 is moved in (+) direction of FIG. 2A (corresponding to FIG. 16A), the state transition of the pulse signals A and B turns in the clockwise direction (the (+) transition direction) as illustrated in FIG. 17. Conversely, when the sliding operation piece 2 is moved in (−) direction of FIG. 2A (corresponding to FIG. 16B), the state transition of the pulse signals A and B turns in the counter clockwise direction (the (−) transition direction) as illustrated in FIG. 17.

It is possible to determine the sliding direction of the sliding operation piece 2 by detecting such a state transition. Namely, the state transition of the pulse signals A and B turning in the clockwise direction means that the sliding operation piece 2 is moved in (+) direction of FIG. 2A, while the state transition of the pulse signals A and B turning in the counter clockwise direction means that the sliding operation piece 2 is moved in (−) direction of FIG. 2A. While it is possible to perform the transition detection by hardware, this embodiment of the present invention makes use of software instead. This will be described later.

Figure 18:
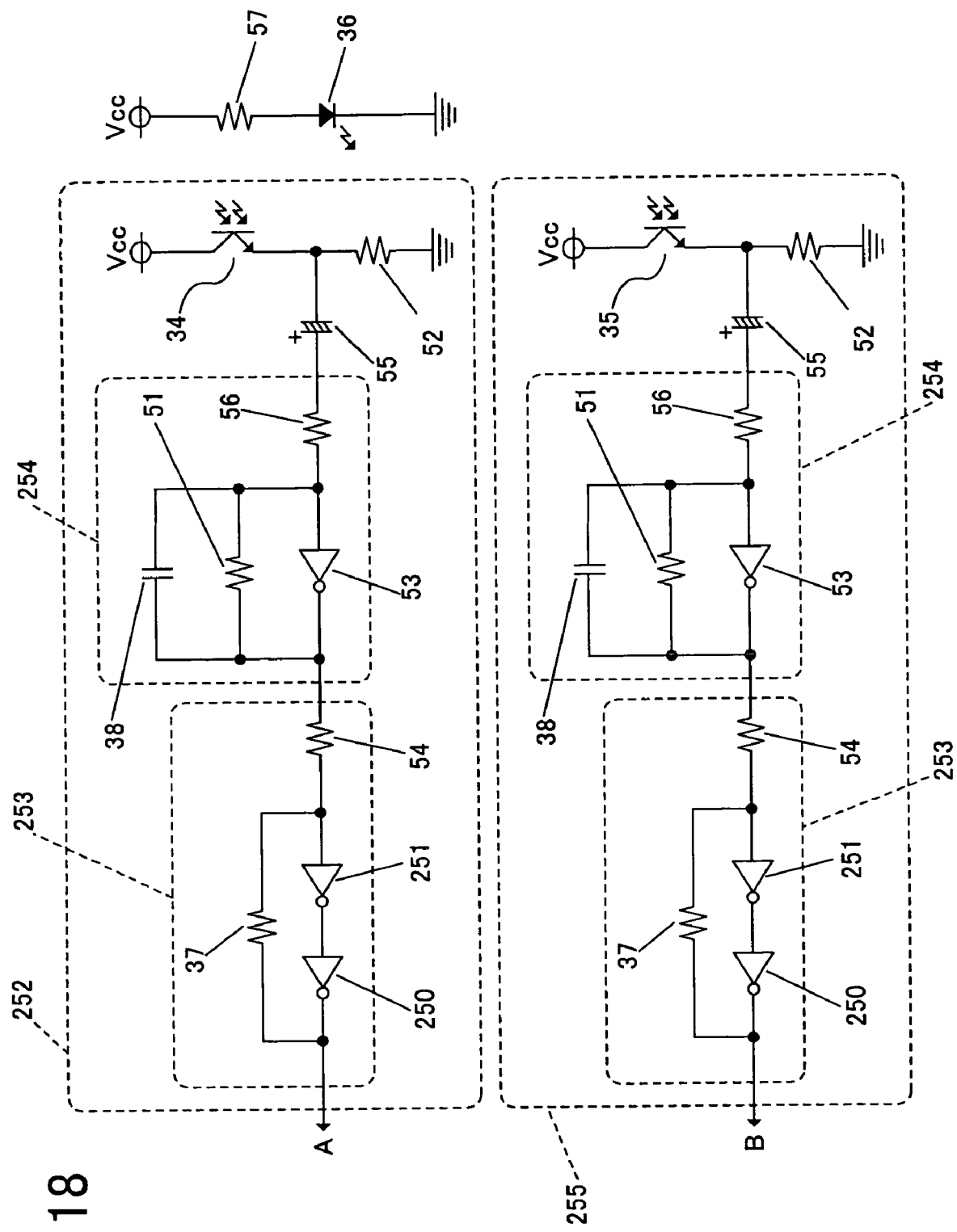
FIG. 18 is a circuit diagram showing the detection unit 30 provided in the automatic musical instrument main body 1.

FIG. 18 is a circuit diagram showing the detection unit 30 provided in the main body 1. As illustrated in FIG. 18, this detection unit 30 includes the light emitting diode 36, a resistance element 57 and sensor circuits 252 and 255. The sensor circuit 252 includes the above phototransistor 34, an electrolytic capacitor 55, an amplifier 254 and a hysteresis circuit 253. The sensor circuit 255 includes the above phototransistor 35, an electrolytic capacitor 55, an amplifier 254 and a hysteresis circuit 253. The amplifier 254 includes resistor elements 51 and 56, a capacitor 38, and an inverter 53. The hysteresis circuit 253 includes resistor elements 37 and 54, and inverters 250 and 251.

The resistor element 57 and the light emitting diode 36 are connected between an electric power supply Vcc and a ground GND in series. The phototransistor 34 and the resistor element 52 are connected between the electric power supply Vcc and the ground GND in series. The resistor element 56 and the electrolytic capacitor 55 are connected in series between the input terminal of the inverter 53 and the connecting point between the phototransistor 34 and the resistor element 52. The capacitor 38 and the resistor element 51 are connected in parallel between the input terminal and the output terminal of the inverter 53. The resistor element 54 is connected to the output terminal of the inverter 53 at one terminal and connected to the input terminal of the inverter 251 at the other terminal. The inverter 251 is connected to the input terminal of the inverter 250 at the output terminal. The resistor element 37 is connected between the input terminal of the inverter 251 and the output terminal of the inverter 250. The sensor circuit 255 has the same configuration as the sensor circuit 252, and therefore no redundant description is repeated.

The amplifier 254 is a negative feedback amplifier which amplifies the electrical signal of the phototransistor 34. Also, this amplifier 254 serves also as a lowpass filter which remove high frequency components. The hysteresis circuit 253 is a positive feedback circuit which forms a dead band defined by the ratio between the resistor element 37 and the resistor element 54 while preventing the output from being inverted within a certain voltage range. Meanwhile, the operations of the amplifier 254 and the hysteresis circuit 253 of the sensor circuit 255 are same as those of the sensor circuit 252, and therefore no redundant description is repeated.

Figure 19:
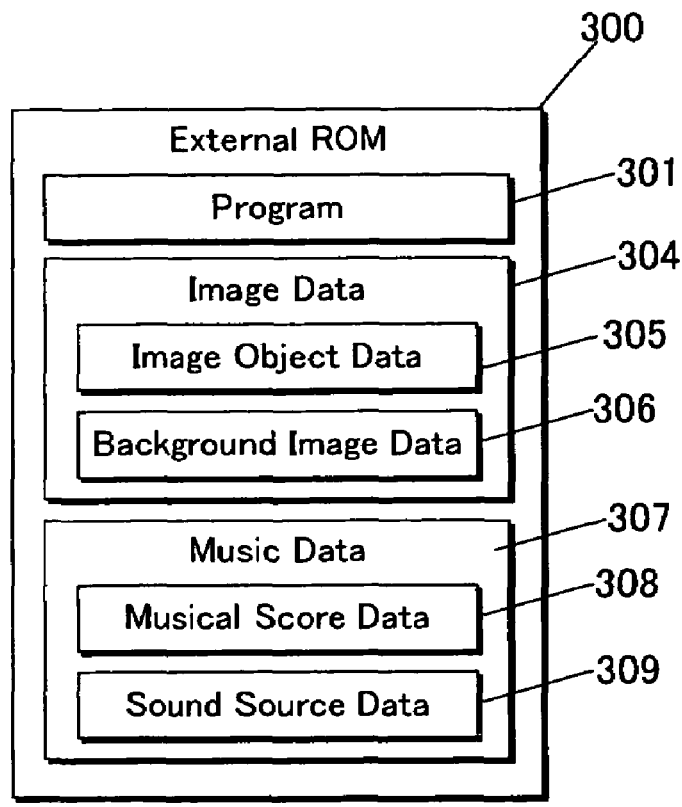
FIG. 19 is a schematic representation of a program and data stored in the external ROM 300 of FIG. 13.

FIG. 19 is a schematic representation of a program and data stored in the external ROM 300 of FIG. 13. As illustrated in FIG. 19, the external ROM 300 is used to store a program 301, image data 304, and music data 307. The image data 304 includes image object data 305 and background image data 306. The music data 307 includes musical score data 308 and sound source data 309.

Incidentally, it is also possible to store the program 301, the image data 304 and the music data 307 in the external ROM 91 of the memory cartridge 29 instead of the external ROM 300, and make use of the program 301 and data 304 and 307 by inserting this memory cartridge 29 into the socket 23.

The high speed processor 200 can read and execute the program 301 as stored in the external ROM 300 or the external ROM 91, and generate an image signal "VD" on the basis of the image data 304 and audio signals "AL" and "AR" on the basis of the music data 307.

As a result, the background image 74 and the image objects such as the musical notes "n" and the character 73 are displayed on the screen 82 by the high speed processor 200 as illustrated in FIG. 8 to FIG. 12. For example, the screen 82 consists of 256 (width)×224 (height) pixels. An image object consists of one or more sprites. One sprite is a rectangular pixel set. For example, a sprite consists of 8 (width)×8 (height) pixels or 16 (width)×16 (height) pixels. Incidentally, a sprite can be arranged in an arbitrary position of the screen 82.

Figure 20:
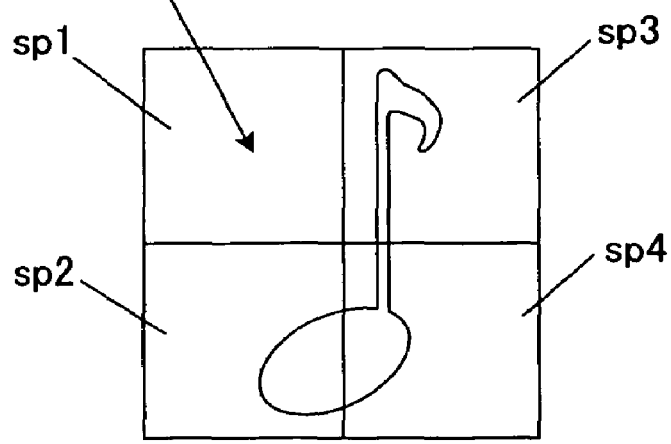
FIG. 20 is a view for explaining sprites constituting an image object displayed on the screen 82 of FIG. 1.

FIG. 20 is a view for explaining sprites constituting an image object.

For example, as shown in FIG. 20, it is assumed that a certain image object is composed of four sprites sp1 to sp4. The display position of the image object can be designated by designating the horizontal coordinate x and the vertical coordinate y of the center of the upper left sprite sp1. Since the size of the sprites sp1 to sp4 is known, it is possible to calculate the display positions of the respective sprites sp2 to sp4 with ease.

The image object data 305 as stored in the ROM 300 contains the size and the pixel pattern data of each of the sprites constituting each object, and the size, the depth value, the color palette information, the vertical coordinate x and the vertical coordinate y of each object.

The depth value indicates the depth position of the pixels, and if a plurality of pixels overlap each other only the pixel having the largest depth value is displayed. The pixel pattern data designates the color of each pixel constituting a sprite. The color palette information designates a color palette. A color palette consists of a plurality of color information entries. For example, if the color palette as designated by the color palette information contains 16 colors, the color used for displaying each pixel is designated from among the 16 colors in accordance with the pixel pattern data.

Figure 21:
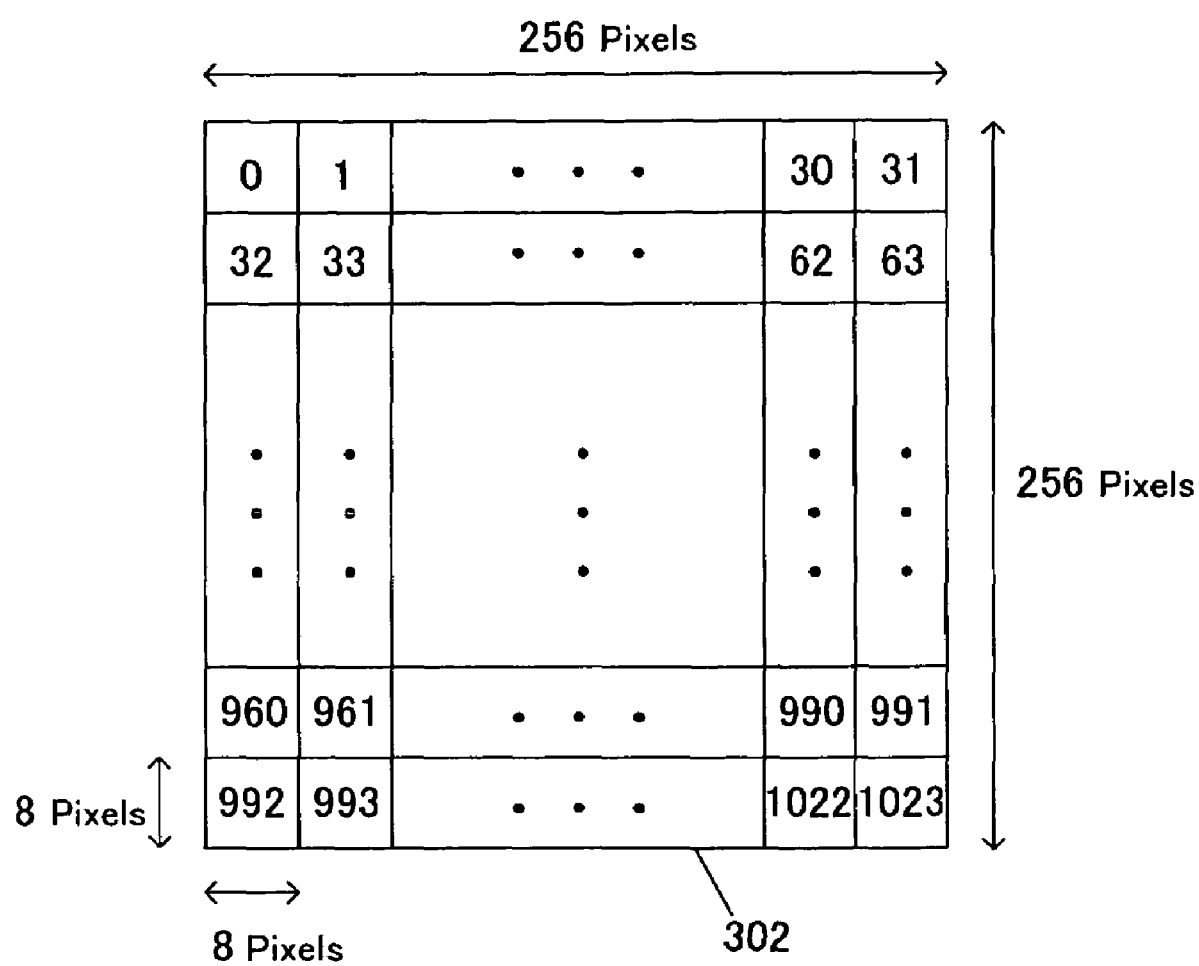
FIG. 21 is a view for explaining the background screen 302 displayed on the screen 82 of the television monitor 80 of FIG. 1.

Next, the scrolling the background 74 will be explained. First, a background screen will be explained. FIG. 21 is a view for explaining the background screen 302 displayed on the screen 82 of the television monitor 80 of FIG. 1. As illustrated in FIG. 21, the background screen 320 is formed by 32×32 blocks "0" to "1023". For example, each block "0" to "1023" is a square element consisting of 8×8 pixels. An array PA[0] to PA[1023] and an array CA[0] to CA [1023] corresponding to the blocks "0" to "1023" are provided. The blocks "0" to "1023" are sometimes collectively called "block(s)", the array PA[0] to PA[1023] are sometimes collectively called "array PA", and the array CA[0] to CA [1023] are sometimes collectively called "array CA".

Storage location information of pixel pattern data of each block is assigned to corresponding array PA. Incidentally, color palette information and a depth value of each block are assigned to corresponding array CA. The meanings of the pixel pattern data, the color palette information and the depth value are same as the ones for the sprite.

Figure 22A:
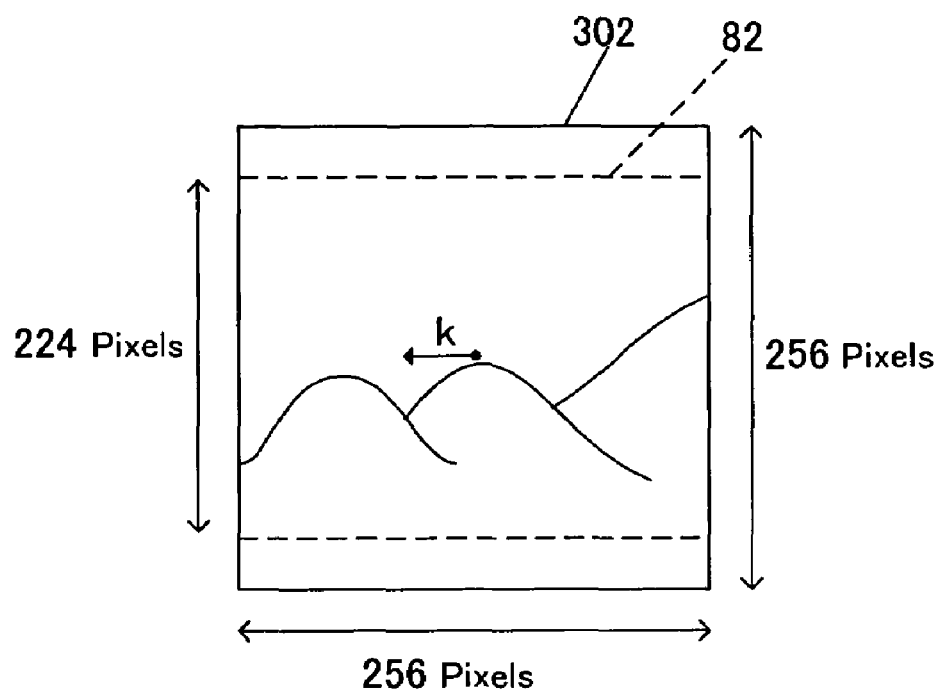
FIG. 22A is a view for explaining the background screen 302 before scrolled.
Figure 22B:
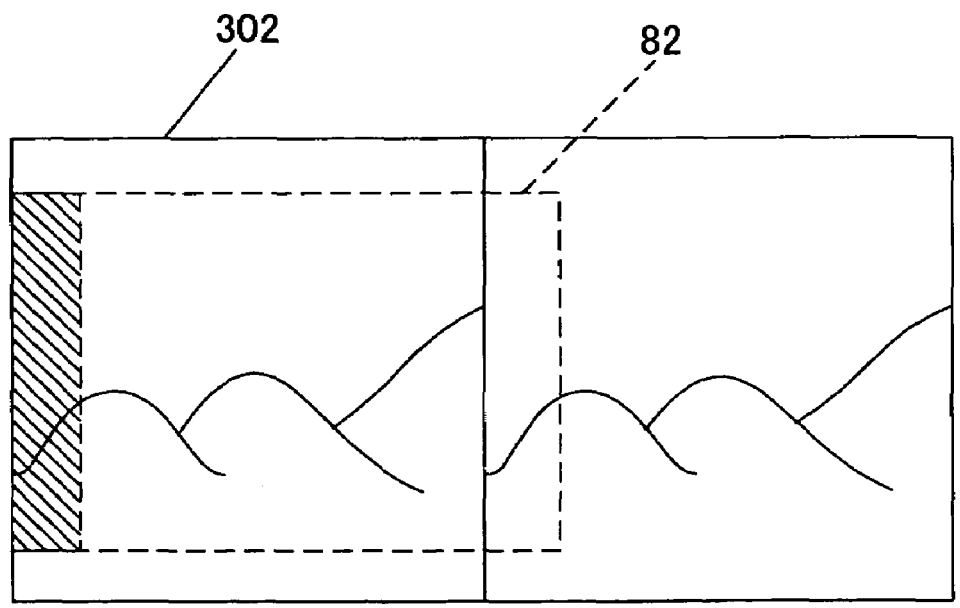
FIG. 22B is a view for explaining the background screen 302 after scrolled.

FIG. 22A is a view for explaining the background screen 302 before scrolled. FIG. 22B is a view for explaining the background screen 302 after scrolled. As illustrated in FIG. 22A, since the size of the screen 82 is 256 pixels(width)×224 pixels(height), the area of 256 pixels×224 pixels of the background screen 302 is displayed on the screen 82. It is assumed that the background screen 302 is scrolled leftwards so as to move the center of the background screen 302 for "k" pixels on the screen 82. As a result, since the width of the background screen 302 is same as the width of the screen 82, a region (a shaded area) of the background screen 302 which has moved outside of the screen 82 is displayed on the right side of the screen 82 as shown in FIG. 22B. In other words, in case where the background screen 302 is scrolled horizontally, it is considered conceptually that the plurality of same background screens 302 are lined up sideways.

For example, it is assumed that the region (the shaded area) of the background screen 302 which has moved outside of the screen 82 consists of the blocks "64", "96", . . . , "896", "928". The image designated by the array PA[64], . . . , PA[928] and CA[64], . . . , CA[928] corresponding to those blocks is displayed on the right side of the screen 82. Therefore, in order that the background successively appears by scrolling the background screen 302 to the left, data assigned to the arrays PA and CA corresponding to the blocks in the region (shaded area) of the background screen 302 which has moved outside of the screen 82 needs to be updated. As a result, the image indicated by the updated arrays PA and CA is displayed on the right side of the screen 82.

In order to display the background 74 successively and smoothly, data stored in relevant arrays PA and CA needs to be updated before the region corresponding to the relevant arrays PA and CA is displayed on the right side of the screen 82. Therefore, since the data stored in the relevant arrays PA and CA needs to be updated while the region corresponding to the relevant arrays PA and CA is still being displayed on the left side of the screen 82, display becomes discontinuous on the left side of the screen 82. However, as shown in FIG. 9 to FIG. 11, this shortcoming can be avoided by adding the mask 88 on the left side of the screen 82. Incidentally, in this embodiment, the background screen 302 is not scrolled to the right. However, the mask 88 is also provided on the right side for balance.

In this way, the background 74 is scrolled by scrolling the background screen 302. Incidentally, the background image data 306 to display the background 74 is stored in the external ROM 300 or the external ROM 91. More specifically, the background image data 306 includes pixel pattern data of each block constituting the background screen 302 and other necessary information to generate background 74.

Figure 23:
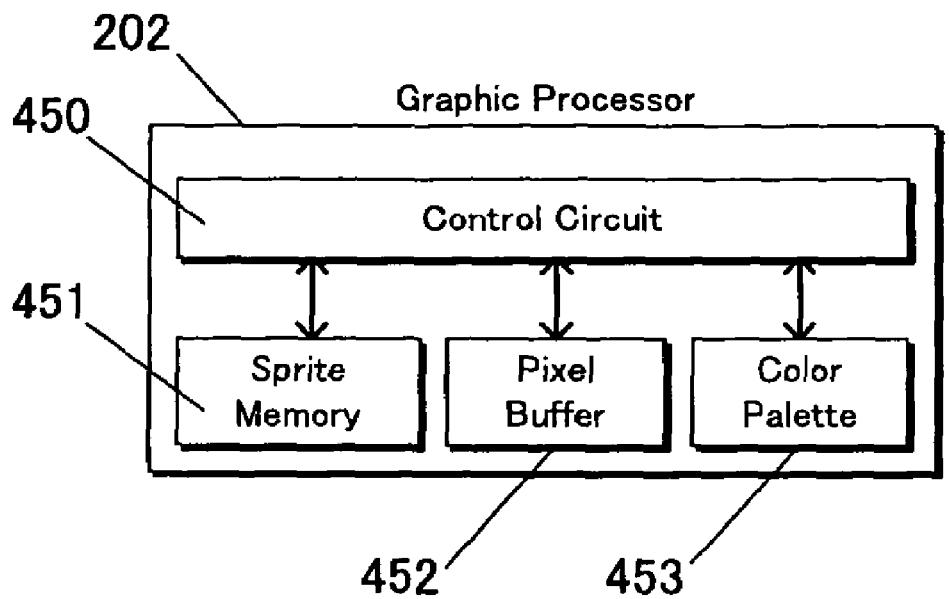
FIG. 23 is a block diagram of the graphic processor 202 of FIG. 14.

Next, the process (the generating process of an image signal "VD") performed by the graphic processor 202 will be explained in detail. FIG. 23 is a block diagram of the graphic processor 202 of FIG. 14. As illustrated in FIG. 23, the graphic processor 202 includes a control circuit 450, a sprite memory 451, a pixel buffer 452 and a color palette 453.

For example, the color palette 453 consists of sixteen color palettes, and each color palettes contains sixteen color information items (sixteen colors). The CPU 201 writes the horizontal coordinate, the vertical coordinate, the depth value, the size, the color palette information and the storage location information of the pixel pattern data of the sprite to be displayed to the sprite memory 451 of the graphic processor 202 during the vertical blanking period.

Then, the control circuit 450 writes the pixel pattern data and the depth value of the sprite to the pixel buffer 452 in accordance with the information stored in the sprite memory 451. For this purpose, the pixel pattern data is read out from the external ROM 300 or the external ROM 91 by the control circuit 450 with reference to the storage location information of the pixel pattern data stored in the sprite memory 451.

The control circuit 450 accesses the inner memory 207. Then, the control circuit 450 reads the pixel pattern data of the respective blocks constituting the background screen 302 from the external ROM 300 or the external ROM 91 with reference to the array PA while reading information assigned to the array CA. Then, the control circuit 450 writes the pixel pattern data and the depth value of the background screen 302 to the pixel buffer 452.

However, if a plurality of pixels overlap each other, the control circuit 450 writes only the pixel pattern data and the depth value of the sprite or the background screen 302 having the largest depth value to the pixel buffer 452.

In this case, the pixel buffer 452 is composed of a plurality of pixel buffer elements in a number smaller than 256 which is the number of the pixels constituting one line of the image (256×224 pixels) displayed on the screen 82. This pixel buffer element stores the depth value and the pixel pattern data of one pixel. Meanwhile, the depth value and the pixel pattern data of one pixel are generally referred to as pixel information as a whole.

More specifically speaking, the control circuit 450 sequentially stores the pixel information for each pixel in the pixel buffer 452 functioning as an FIFO ring buffer with indexing that wraps around to the beginning of the buffer so that the oldest data is overwritten by the latest data. In other words, when the scanning point is shifted, the control circuit 450 treats the tail of the storage location as the head of the storage location by virtually circulating the pixel buffer 452 as a ring buffer.

The control circuit 450 reads the pixel information from the pixel buffer 452 (by scanning the buffer), acquires the color information (the hue information, the saturation information and the brightness information) from the color palette 453 with reference to the pixel pattern data of the pixel information as read, and generates composite signal which are then output as the image signal "VD".

Figure 24:
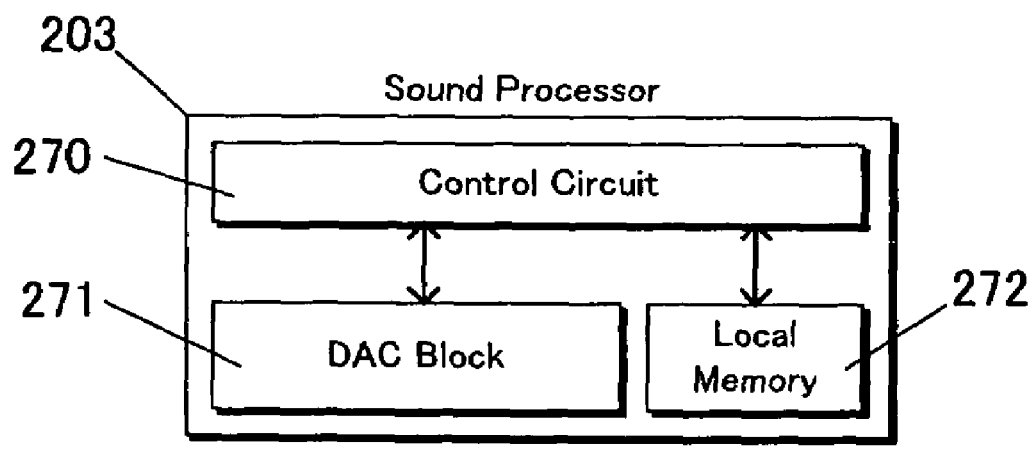
FIG. 24 is a block diagram showing the sound processor 203 of FIG. 14.

Next, the process (generating process of audio signals AL and AR) performed by the sound processor 203 will be explained. FIG. 24 is a block diagram showing the sound processor 203 of FIG. 14. As illustrated in FIG. 24, the sound processor 203 includes a control circuit 270, a DAC block 271 and a local memory 272.

Figure 25:
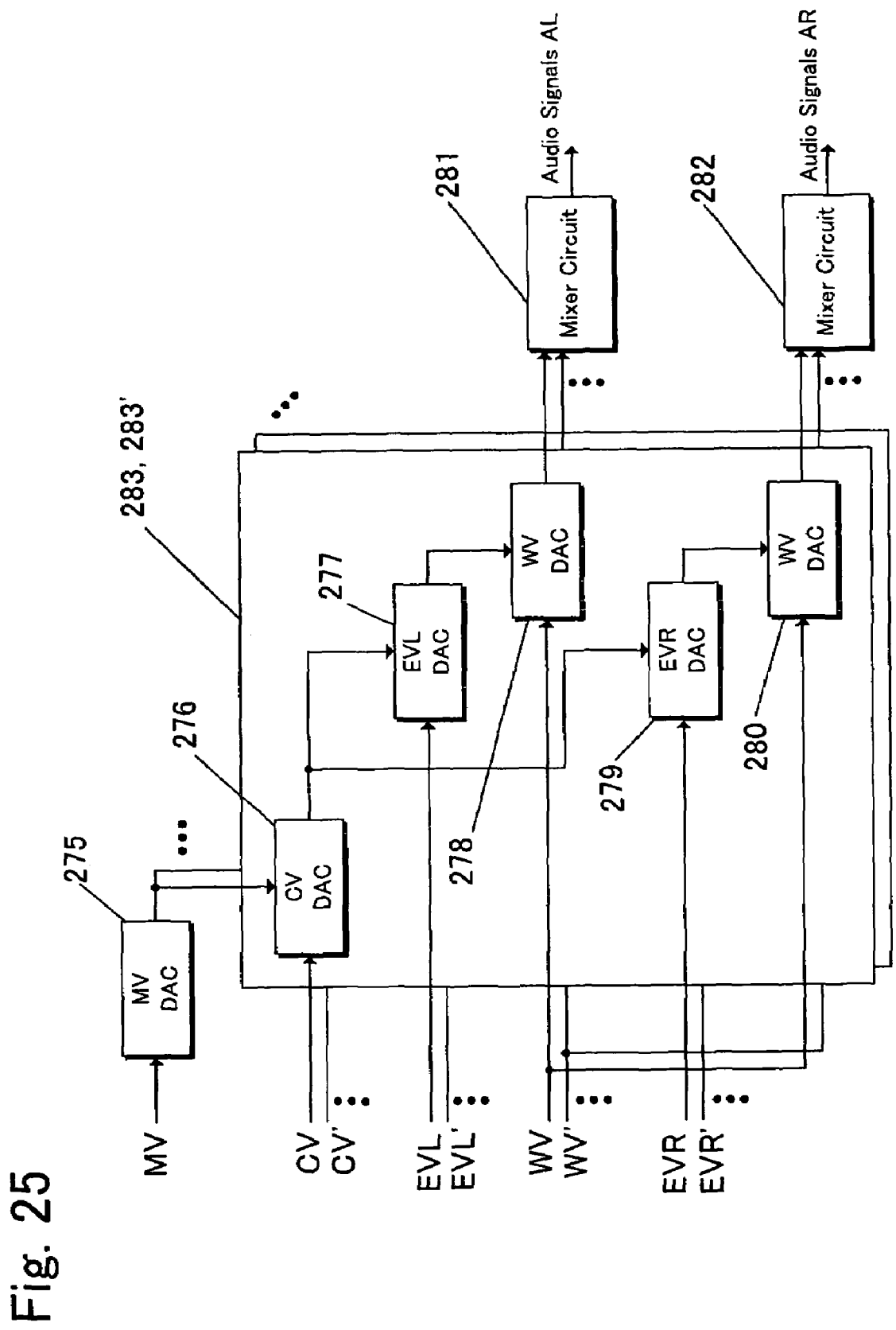
FIG. 25 is a block diagram showing the DAC block 271 of FIG. 24.

FIG. 25 is a block diagram showing the DAC block 271 of FIG. 24. As illustrated in FIG. 25, the DAC block 271 includes a main volume DAC (MV DAC) 275, M channel blocks (M is a positive integer) 283, 283', . . . , and mixer circuits 281 and 282. In this case, if each of the channel blocks 283, 283', . . . is capable of processing signals of N channels (N is two or more integer), the DAC block 271 of FIG. 43 can handle M×N channels. For example, if M=4 and N=4, it is possible to handle 16 channels. Each of the channel blocks 283, 283', . . . , includes a channel volume DAC (CV DAC) 276, an envelope (L) DAC (EVL DAC) 277, an envelope (R) DAC (EVR DAC) 279, a waveform DAC (WV DAC) 278, and a waveform DAC (WV DAC) 280. In the following description, the term "channel blocks 2830" is used to generally represent the channel blocks 283, 283', . . . .

The MV DAC 275 receives main volume data MV from the control circuit 203 for controlling the master volume of audio signals. The MV DAC 275 converts the input main volume data MV into an analog signal, which is then output to the CV DACs 276.

The CV DACs 276 of the channel blocks 283, 283', . . . receive channel volume data CV, CV', . . . , from the control circuit 270. Meanwhile, each of the channel volume data CV, CV', . . . , is prepared by time division multiplexing channel volume data in N channels (N is two or more integer). The channel volume data is the data used to control the volume of the corresponding channel. In the following description, the term "channel volume data CV0" is used to generally represent the channel volume data CV, CV', . . . . Incidentally, the channel volume data CV0 is a digital signal. The CV DAC 276 multiplies the channel volume data CV0 by the conversion signal (an analog signal) input from the MV DAC 275, and outputs the result of the multiplication (an analog signal) to the EVL DAC 277 and the EVR DAC 279. Incidentally, the channel volume data is the data which is read from the inner memory 207 and stored in the local memory 272 by the control circuit 270.

The EVL DACs 277 of the channel blocks 283, 283', . . . receives envelope data EVL, EVL', . . . , from the control circuit 270. Each of the envelope data EVL, EVL', . . . , is prepared by time division multiplexing envelope data in N channels. The envelope data is the data used to control the envelope of the left channel of the corresponding channel. In the following description, the term "envelope data EVL0" is used to generally represent the envelope data EVL, EVL', . . . . Incidentally, the envelope data EVL0 is a digital signal. The EVL DAC 277 multiplies the envelope data EVL0 by the conversion signal (an analog signal) input from the CV DAC 276, and outputs the result of the multiplication (an analog signal) to the WV DAC 278.

Incidentally, the envelope data is the data which is read from the inner memory 207 and stored in the local memory 272 by the control circuit 270. Accordingly, the control circuit 270 sequentially reads the envelope data from the local memory 272 while incrementing the address pointer on the basis of the envelope pitch control information, then multiplexes the envelope data and outputs the multiplexed data to the DAC block 271. Meanwhile, the sound source data 309 includes the envelope data.

The WV DACs 278 of the channel blocks 283, 283', . . . receives the waveform data WV, WV', . . . from the control circuit 270. Each of the waveform data WV, WV', . . . , is prepared by time division multiplexing waveform data in N channels. In the following description, the term "waveform data WV0" is used to generally represent the waveform data WV, WV', . . . . Incidentally, the waveform data WV0 is a digital signal. The WV DAC 278 multiplies the waveform data WV0 by the conversion signal (an analog signal) input from the EVL DAC 277, and outputs the result of the multiplication (an analog signal) to the mixer circuit 281. The result of the multiplication is an analog audio signal.

Incidentally, the waveform data is the data read from the external ROM 300 or the external ROM 91 by the control circuit 270. In other words, the control circuit 270 reads the waveform data from the ROM 300 or ROM 91 with reference to the initial address of the waveform data stored in the local memory 272, and stores the waveform data in the local memory 272.

Then, the control circuit 270 sequentially reads the waveform data from the local memory 272 while incrementing the address pointer on the basis of the waveform pitch control information, then multiplexes the waveform data and outputs the multiplexed data to the WV DAC 278. Meanwhile, the sound source data 309 includes the waveform data.

The mixer circuit 281 mixes the analog audio signals output respectively from the channel blocks 283, 283', . . . , and outputs the mixed signals to the left channel as the audio signal AL.

In the same manner as the left channel audio signal AL is generated, a right channel audio signal AR is generated by the EVR DAC 279, the WV DAC 280 and the mixer circuit 282.

At this time, the pitch control information will be explained. The pitch control information is used to perform the pitch conversion by changing the frequency of reading the waveform data and the envelope data. Namely, the sound processor 203 periodically reads the pitch control information for waveform data at a certain interval and accumulates the pitch control information for waveform data. Also, the sound processor 203 periodically reads the pitch control information for envelope data at a certain interval and accumulates the pitch control information for envelope data. The sound processor 203 processes the accumulation results, and then makes use of the result of processing as the address pointer to waveform data and the address pointer to envelope data respectively. Accordingly, if a large value is set as pitch control information, the address pointer is quickly incremented by the large value to increase the frequency. Conversely, if a small value is set as pitch control information, the address pointer is slowly incremented by the small value to decrease the frequency. In this way, the sound processor 203 performs the pitch conversion of waveform data and envelope data.

Next, the entire operation of the automatic musical instrument of FIG. 1 will be explained with reference to the flowchart. A game process performed on the basis of the sliding speed of the sliding operation piece 2 (the running game of FIG. 9) will be explained.

Figure 26:
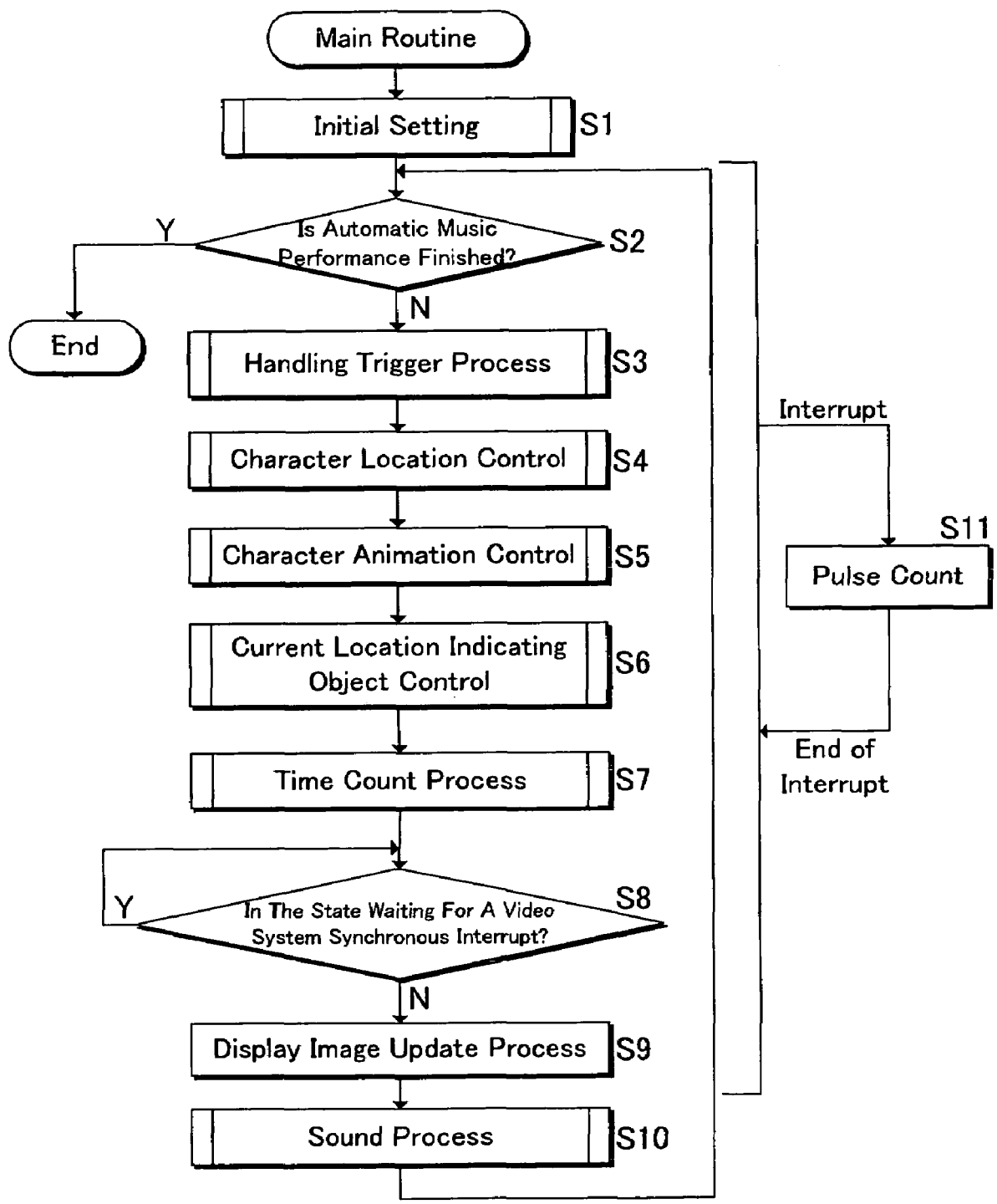
FIG. 26 is a flowchart showing the running game process performed by the automatic musical instrument of FIG. 1.

FIG. 26 is a flowchart showing the running game process performed by the automatic musical instrument of FIG. 1. As illustrated in FIG. 26, the CPU 201 initializes the system in step S1. In step S2, the CPU 201 checks whether or not music is finished. If the music is finished, the CPU finishes the process, otherwise proceeds to step S3.

In step S3, the CPU 201 judges whether or not the sliding operation performed by the operator satisfies the trigger generating requirement. In step S4, the CPU 201 controls location of the character 73 on the basis of the sliding speed of the sliding operation piece 2. In step S5, the CPU 201 controls animation of the character 73 on the basis of the sliding speed of the sliding operation piece 2. In step S6, the CPU 201 controls location of the current position indicating object 71 on the basis of the trigger in response to the sliding operation of the sliding operation piece 2. In step S7, the CPU 201 calculates current elapsed time for the character 73.

In step S8, the CPU 201 determines whether or not the CPU 201 waits for the video system synchronous interrupt. If the CPU 201 waits for the video system synchronous interrupt (there is no interrupt responsive to the video system synchronous signal), the CPU 201 repeats the same step S8. Conversely, if the CPU 201 gets out of the state of waiting for the video system synchronous interrupt (there is interrupt responsive to the video system synchronous signal), the process proceeds to step S9. In step S9, the graphic processor 202 updates the displayed image on the television monitor 80 as instructed by the CPU 201. In step S10, the CPU 201 sets necessary information for the sound processor 203 to generate the audio signals AL and AR to the inner memory 207. The sound processor 203 generates the audio signals AL and AR on the basis of the information set to the inner memory 207. As has been discussed above, the displayed image updating process in step S9 and the audio process in step S10 are executed in synchronization with the video system synchronous signal. A video system synchronous interrupt is generated each frame.

The pulse count process in step S11 is performed by the CPU 201 every time the timer circuit 210 issues an interrupt request signal. The pulse count process is a process of counting the state transition of the pulse signals A and B as output from the phototransistors 34 and 35 (refer to FIG. 18).

Figure 27:
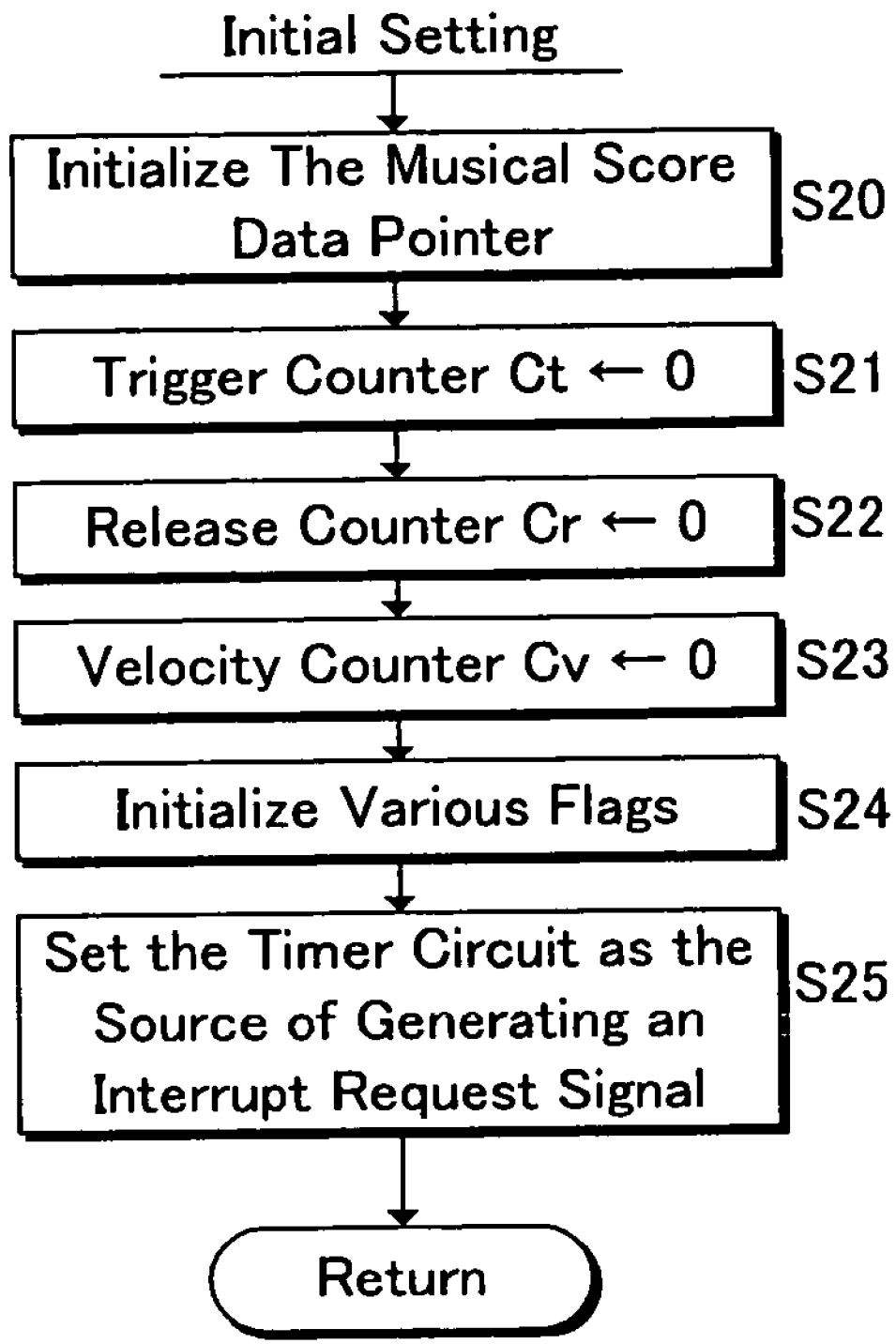
FIG. 27 is a flowchart showing the process flow of the initial setting process in step S1 of FIG. 26.

FIG. 27 is a flowchart showing the process flow of the initial setting process in step S1 of FIG. 26. As illustrated in FIG. 27, the CPU 201 initializes a musical score data pointer in step S20. The musical score data pointer is a pointer pointing the location to be accessed for reading the musical score data 308. In step S21, the CPU 201 sets a trigger counter "Ct" to "0". The trigger counter "Ct" counts a number of times generating triggers. In step S22, the CPU 201 sets a release counter "Cr" to "0". The release counter "Cr" counts a number of times the sliding speed successively becomes "0". In step S23, the CPU 201 sets a velocity counter "Cv" to "0". The velocity counter "Cv" counts a number of times the state of the pulse signal A and B output from the phototransistor 34 and 35 transits. In step S24, the CPU 201 initializes various flags. In step S25, the CPU 201 sets the timer circuit 210 as the source of generating the interrupt request signal for executing the pulse count process in step S11. In this case, the timer circuit 210 is set in order that the interrupt request signal is issued with a time interval which is no longer than the shortest envisioned high level period or the shortest envisioned low level period of the pulse signal A of the phototransistor 34 or the pulse signal B of the phototransistor 35.

Figure 28:
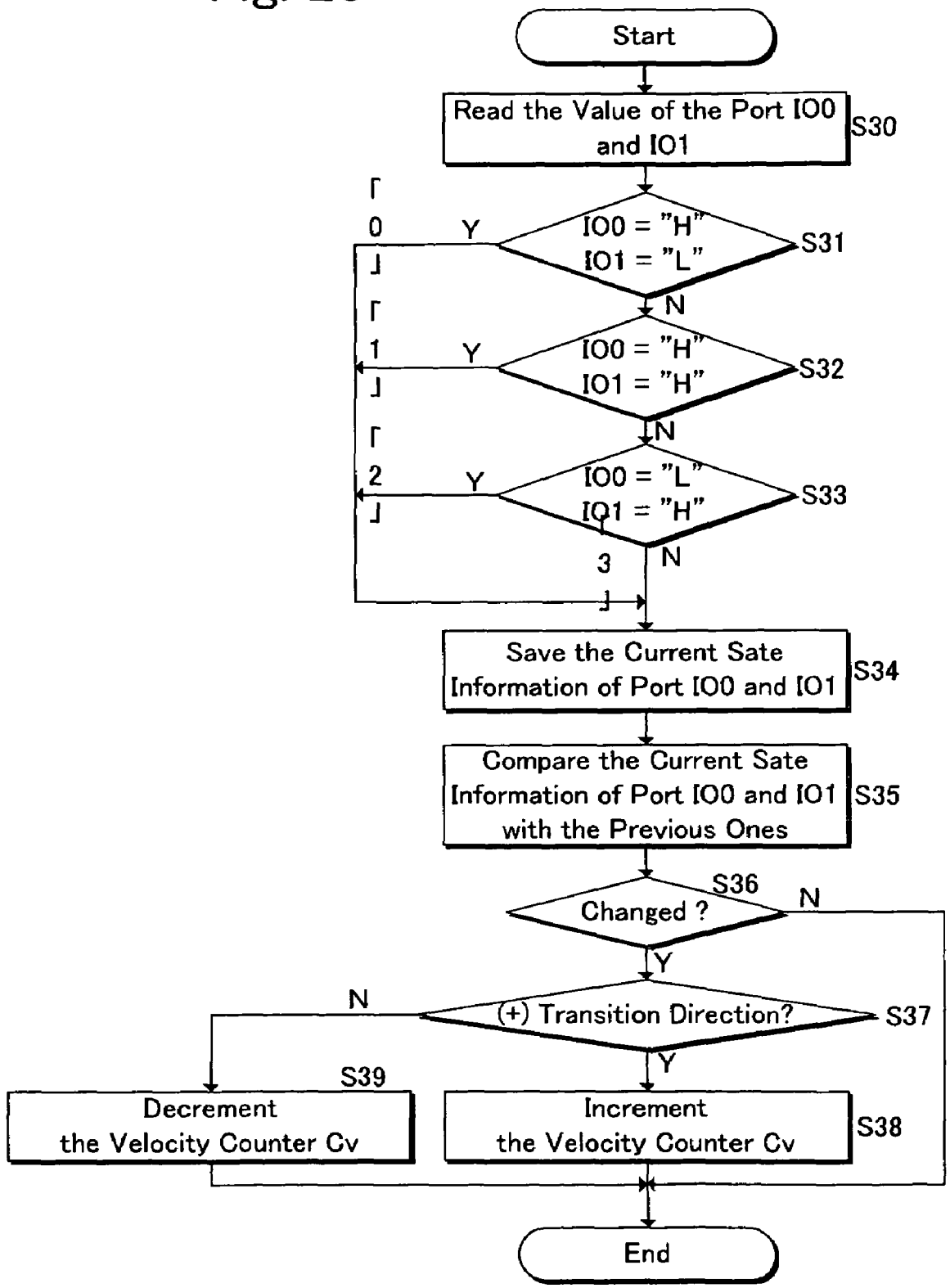
FIG. 28 is a flowchart showing the process flow of the pulse count process in step S11 of FIG. 26.

FIG. 28 is a flowchart showing the process flow of the pulse count process in step S11 of FIG. 26. As illustrated in FIG. 28, the CPU 201 reads the values of the input/output ports IO0 and IO1 through the input/output control circuit 209 in step S30. The pulse signal A from the phototransistor 34 is input to the input/output port IO0. The pulse signal B from the phototransistor 35 is input to the input/output port IO1.

In step S31, if the value of the input/output port IO0 is high level and at the same time the value of the input/output port IO1 is low level, the CPU 201 determines the state information of the input/output ports IO0 and IO1 as "0" and proceeds to step S34. Otherwise, the CPU 201 proceeds to step S32. In step S32, if the value of the input/output port IO0 is high level and at the same time the value of the input/output port IO1 is high level, the CPU 201 determines the state information of the input/output ports IO0 and IO1 as "1" and proceeds to step S34. Otherwise, the CPU 201 proceeds to step S33. In step S33, if the value of the input/output port IO0 is low level and at the same time the value of the input/output port IO1 is high level, the CPU 201 determines the state information of the input/output ports IO0 and IO1 as "2" and proceeds to step S34. Otherwise, since the value of the input/output port IO0 is low level and at the same time the value of the input/output port IO1 is low level, the CPU 201 determines the state information of the input/output ports IO0 and IO1 as "3" and proceeds to step S34.

In step S34, the CPU 201 saves the current state information of the input/output ports IO0 and IO1 in the inner memory 207. In step S35, the CPU 201 compares the current state information with the previous state information of the input/output ports IO0 and IO1. In step S36, if the current state information of the input/output ports IO0 and IO1 is changed, the CPU 201 proceeds to step S37. In step S557, the CPU 201 determines the transition direction of the state information of the input/output ports IO0 and IO1 (refer to FIG. 17). If the transition direction of the state information is changed in agreement with the (+) transition direction (refer to FIG. 16A), the CPU 201 increments the velocity counter "Cv" by one in step S38. On the other hand, if the transition direction of the state information is changed in agreement with the (−) transition direction (refer to FIG. 16B), the CPU 201 proceeds to step S39 in which the velocity counter "Cv" is decremented by one. In this manner, the state transition of the pulse signals A and B from the phototransistors 34 and 35 is counted.

Figure 29:
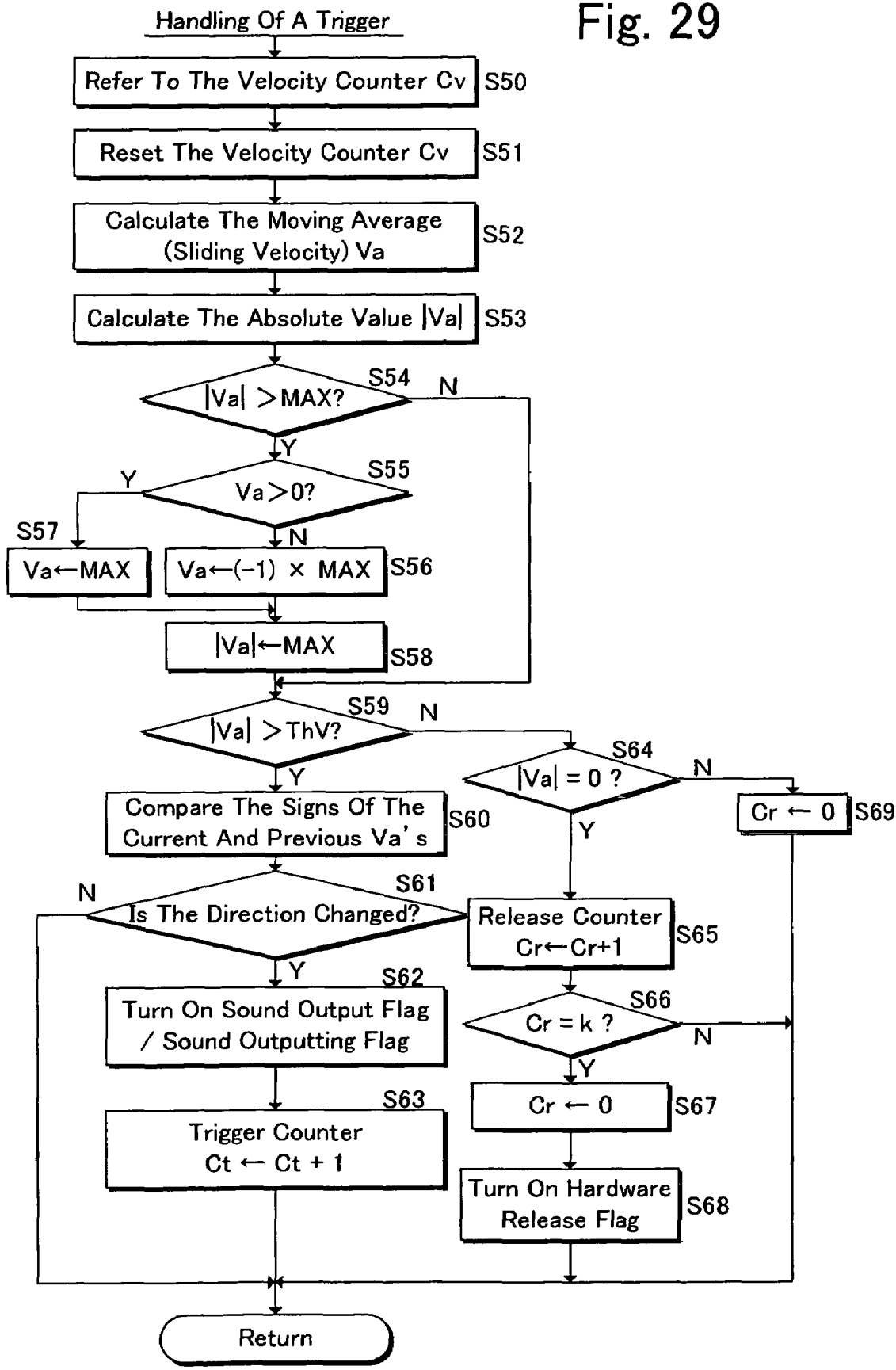
FIG. 29 is a flowchart showing the process flow of the trigger processing in step S3 of FIG. 26.

FIG. 29 is a flow chart showing an example of the procedure for handling a trigger in step S3 of FIG. 26. As illustrated in FIG. 29, in step S50, the CPU 201 acquires the counter value of the velocity counter Cv. The counter value as acquired is the counter value per frame and indicative of the current sliding velocity of the sliding operation piece 2. In step S51, the CPU 201 resets the velocity counter Cv.

In step S52, the CPU 201 calculates the moving average of the sliding velocity of the sliding operation piece 2 (the counter value of the velocity counter Cv). For example, the moving average is calculated over ten frames by the use of the current sliding velocity of the sliding operation piece 2 and the sliding velocities of the previous 9 frames. The moving average of the sliding velocity of the sliding operation piece 2 is referred here to as the sliding velocity Va.

In step S53, the CPU 201 calculates the absolute value |Va| of the sliding velocity Va, i.e., the sliding speed |Va|. In step S54, the CPU 201 determines whether or not the sliding speed |Va| of the sliding operation piece 40 exceeds a predetermined maximum value MAX. If the sliding speed |Va| of the sliding operation piece 40 exceeds the predetermined maximum value MAX, the process proceeds to step S55, otherwise proceeds to step S59.

In step S55, the CPU 201 refers to the sign of the sliding velocity Va and, if the sign is positive, the maximum value MAX is assigned to the sliding velocity Va in step S57. Conversely, if the sign is negative, (−1)×MAX is assigned to the sliding velocity Va in step S56. In step S58, the CPU 201 assigns the maximum value MAX to the sliding speed |Va| and proceeds to step S59.

In step S59, the CPU 201 determines whether or not the sliding speed |Va| of the sliding operation piece 40 exceeds a predetermined threshold value ThV. If the sliding speed |Va| exceeds the predetermined threshold value ThV, the process proceeds to step S60, otherwise proceeds to step S64.

In step S60, the CPU 201 compares the sign of the current sliding velocity Va with the sign of the previous sliding velocity Va of the sliding operation piece 2. If the sign of the sliding velocity Va is not changed, the CPU 201 judges that the sliding direction of the sliding operation piece 2 is not changed and returns to the main routine (step S61). Conversely, if the sign of the sliding velocity Va is changed, the CPU 201 judges that the sliding direction of the sliding operation piece 2 is changed, and proceeds to step S62 (step S61). Then, in step S62, the CPU 201 turns on the sound output flag and the sound outputting flag. The sound output flag as turned on means the generation of a trigger. The sound outputting flag is turned off when sound is not outputting, and turned on when sound is outputting.

In step S63, the CPU 201 increments the trigger counter Ct and returns to the main routine.

As described above, the trigger is generated when the sliding direction of the sliding operation piece 2 is changed (refer to step S61) while the sliding speed |Va| of the sliding operation piece 2 exceeds the predetermined threshold ThV (refer to step S59).

On the other hand, in step S64, the CPU 201 determines whether or not the sliding speed |Va| is "0". If the sliding speed |Va| is not "0", the CPU 201 proceeds to step S69, in which the release counter Cr is reset, and then returns to the main routine. Conversely, if the sliding speed |Va| is "0", the CPU 201 proceeds to step S65.

In step S65, the CPU 201 increments the release counter Cr by one. In step S66, the CPU 201 determines whether or not the release counter Cr reaches a constant value k. If the release counter Cr does not reach the constant value k, the CPU 201 returns to the main routine. Conversely, if the release counter Cr reaches the constant value k, the CPU 201 proceeds to step S67. In step S67, the CPU 201 resets the release counter Cr. In step S68, the CPU 201 turns on the hardware release flag, and returns to the main routine.

The process of steps S64 to S68 is a process of invoking the hardware release process after the sliding speed |Va| is successively detected to be "0" for k times (for example, k=7).

Figure 30:
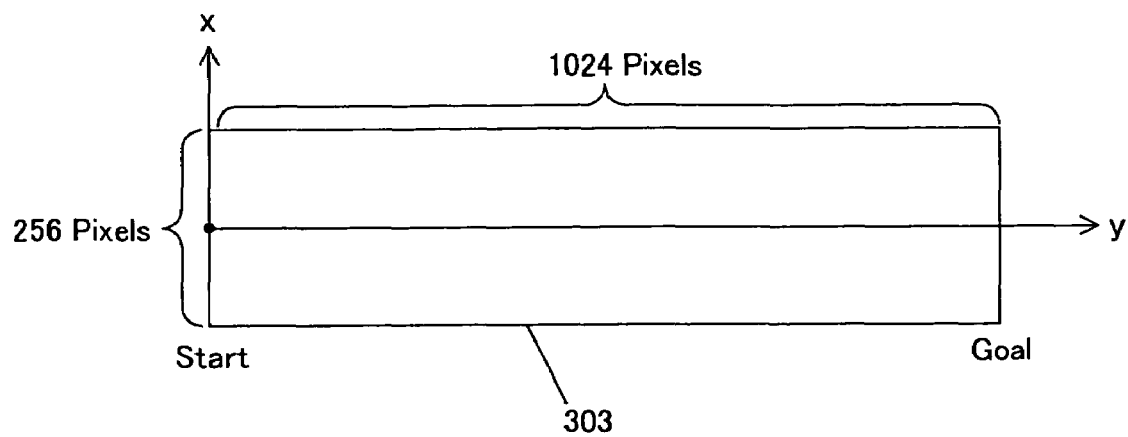
FIG. 30 is a view for explaining the fictive coordinate.

A fictive coordinate and a velocity conversion table which appear in step S4 will be explained before beginning to explain a character location control process in step S4 of FIG. 26. FIG. 30 is a view for explaining the fictive coordinate. As illustrated in FIG. 30, a background image 303 consisting of 1024 (width)×256 (height) pixels is provided to the external ROM 300 or the external ROM 91. The background image 303 is an image from start to goal of the game which the character 73 moves corresponding to the sliding speed |Va|. A coordinate on the background image 303 is defined as a fictive coordinate. The origin of the fictive coordinate is in the middle of the extreme left height of the background image 303. The CPU 201 calculates the location of the character 73 on the fictive coordinate on the basis of the sliding speed |Va| of the sliding operation piece 2.

Figure 31:
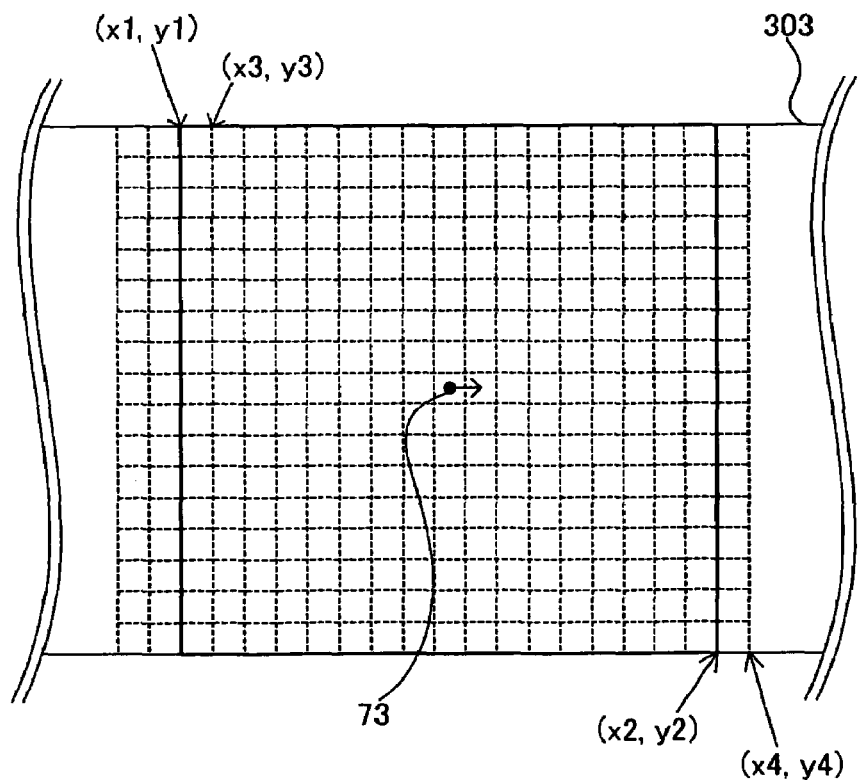
FIG. 31 is an enlarged view of a part of the background image 303 of FIG. 30.

FIG. 31 is an enlarged view of a part of the background image 303 of FIG. 30. As illustrated in FIG. 31, the background image 303 is divided into blocks (described as rectangular elements with broken lines in FIG. 31) corresponding to the blocks of the background screen 302. For example, the block consists of 8×8 pixels. The range displayed on the background screen 302 is a rectangular area including the character 73 as its center (the upper left corner (x1, y1), the right lower corner (x2, y2)). In other words, storage location information of pixel pattern data, color palette information and depth value indicating the rectangular area of the background image 303 around the character 73 are assigned to the array PA[0] to the array PA[1023] and the array CA[0] to the array CA[1023] constituting the background screen 302

Then, if the location of the character 73 on the fictive coordinate moves to other block on the background image 303 as indicated by an arrow in FIG. 31, the CPU 201 displays a rectangular area (the upper left corner (x3, y3), the lower right corner (x4, y4)) including the character 73 after moved as its center on the background screen 302. In other word, the CPU 201 rewrites the elements of the array PA[0] to PA[1023] and the array CA[0] to CA[1023] to the those of the storage location information of the pixel pattern data, the color palette information and the depth value designating the rectangular area including the character 73 after moved as its center.

In this way, the CPU 201 can express movement of the character 73 by changing the background image 303 while fixing the position of the character 73 on the screen 82 (center of the screen 82) by rewriting elements of the arrays PA and CA as the character 73 moves on the fictive coordinate.

The fictive coordinate is described as (x, y), the coordinate on the screen 82 of the television monitor 80 is described as (X, Y). The center of the screen 82 is defined as an origin of coordinates on the screen 82. The upper direction of a vertical axis is defined as positive direction of X-axis, and the right direction of a horizontal axis is defined as positive direction of Y-axis.

When the character 73 moves on the fictive coordinate within one block, the CPU 201 expresses movement of the character 73 in the following way. For example, it is assumed the character 73 moves for distance "Vv" in x direction. The center of the background screen 302 is moved by the CPU 201 for the distance (−Vv) in X-direction on the screen 82. In other words, in this case, the movement of the character 73 is expressed by scrolling the background screen 302. Incidentally, the position of the character 73 on the screen 82 is being fixed (the center of the screen82). As mentioned above, the CPU 201 updates the elements of the arrays PA and CA constituting the background screen 302 and moves the center of the background screen 302 in accordance with the moving distance "Vv" in x-direction on the fictive coordinate of the character 73 (in this example, the y-coordinate of the character 73 is fixed). The movement distance "Vv" is determined with reference to the velocity conversion table on the basis of the sliding speed |val of the sliding operation piece 2.

Figures 32, 33:
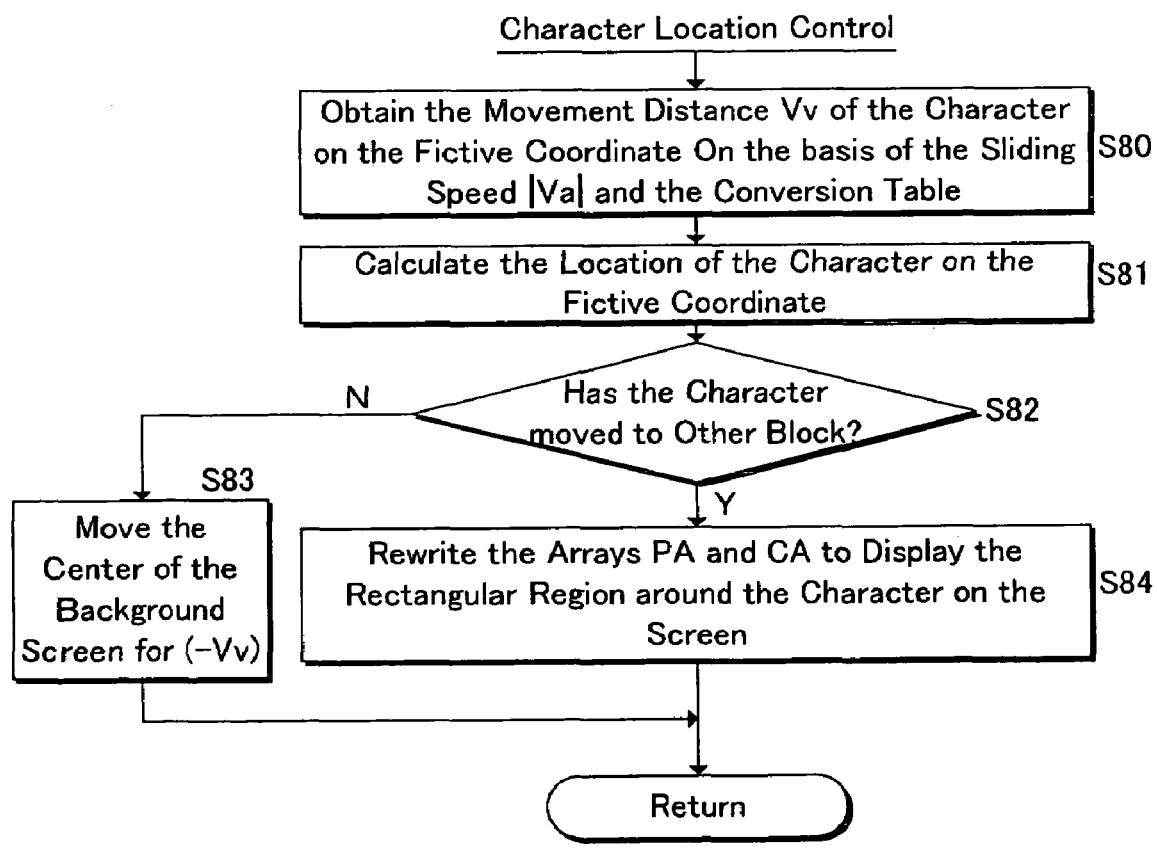
FIG. 32 is a view showing an example of the velocity conversion table.
FIG. 33 is a flowchart showing the process flow of the character location control process in step S4 of FIG. 26.

FIG. 32 is a view showing an example of the velocity conversion table. As illustrated in FIG. 32, the velocity conversion table shows relation between the sliding speed |Val of the sliding operation piece 2 and the movement distance "Vv" on the fictive coordinate. For example, if the sliding speed |Val is "Va0", the movement distance "Vv" is "Vv0". In this table, if the sliding speed |Val becomes larger, the movement distance "Vv" becomes larger. Conversely, if the sliding speed |Val becomes smaller, the movement distance "Vv" becomes smaller.

FIG. 33 is a flowchart showing the process flow of the character location control process in step S4 of FIG. 26. As illustrated in FIG. 33, in step S80, the CPU 201 obtains the movement distance "Vv" of the character 73 on the fictive coordinate corresponding to the sliding speed |Val of the sliding operation piece 2 with reference to the velocity conversion table of FIG. 33. In step S81, the CPU 201 calculates position of the character 73 on the fictive coordinate on the basis of the movement distance "Vv".

In step S82, the CPU 201 determines whether or not the character 73 moves to other block (refer to FIG. 31). If the character 73 does not move to other block yet, the process proceeds to step S83, otherwise proceeds to step S84. In step S83, the CPU 201 change the coordinate (Xf, Yf) of the center of the background screen 302 on the screen 82 to (Xf−Vv, Yf). Then, the CPU 201 returns to the main routine.

In step S84, the CPU 201 rewrites the arrays PA and CA constituting the background screen 302 and then returns to the main routine in order to display the rectangular area around the position of the character 73 on the fictive coordinate as a background image.

The coordinate information of the center of the background screen 302 on the screen 82 and the arrays PA and CA are stored in the predetermined area of the inner memory 207.

Next, an animation table which appears in step S5 will be described before explaining a character animation control process in step S5 of FIG. 26. FIG. 34 is a view showing an example of the animation tables. As illustrated in FIG. 34, each animation table is a table wherein a sliding speed range, a character number, duration information, next form information, storage location information of animation image data, character size information, color palette information, depth value, sprite size information, and display coordinate information of the character 73 on the screen 82 are associated each other.

The sliding speed |Val of the sliding operation piece 2 is divided into five stages. The sliding speed range is provided to change animation speed corresponding to respective five stages. The character number is given to each different form of character 73. The duration information designates a number of frames the specified form of the character 73 by the character number should be successively displayed. The next form information designates the character number which specifies the form of the character 73 to be displayed after the specified form of the character 73 is displayed in accordance with the duration information. For example, the next form information "next" indicates to display specified form of the character 73 by the character number "2" belonging to the same sliding speed range as previous one after displaying specified form of the character 73 by the character number "1" during one frame (the duration information). The next form information "top" indicates to display the specified form of the character 73 by the initial character number "1" belonging to the same sliding speed range as previous one after displaying the specified form of the character 73 by the character number "10" during one frame (the duration information). The next form information "self" indicates to display the specified form of the character 73 by the same character number "11" again after displaying the specified form of the character 73 by the character number "11" during four frames (the duration information).

The animation image data is time series data of the different forms of character 73 to be animated. The storage location information of the animation image data indicates a start address of the animation image data. The animation image data is pixel pattern data. The character size information indicates size of the character 73. The color palette information, depth value and sprite size are as explained above.

Since the storage location information of the animation image data is the storage location information of the pixel pattern data of the character 73 of the character number "1", the storage location information of the pixel pattern data of the character 73 from the second on can be derived using the character size information. The storage location information of pixel pattern information for each sprite constituting the character 73 is derived from the storage location information of the pixel pattern data for the character 73 and the sprite size information. In addition, a display coordinate of each sprite constituting a character 73 is derived from the display coordinate of the character 73 and the sprite size information.

By the way, in case where the sliding speed |Val is smaller than the threshold value "ThV" (refer to step S59 of FIG. 29), the character number is "11" and the next form information is "self". In this way, the static (not animated) character 73 is displayed on the screen 82.

Figure 35:
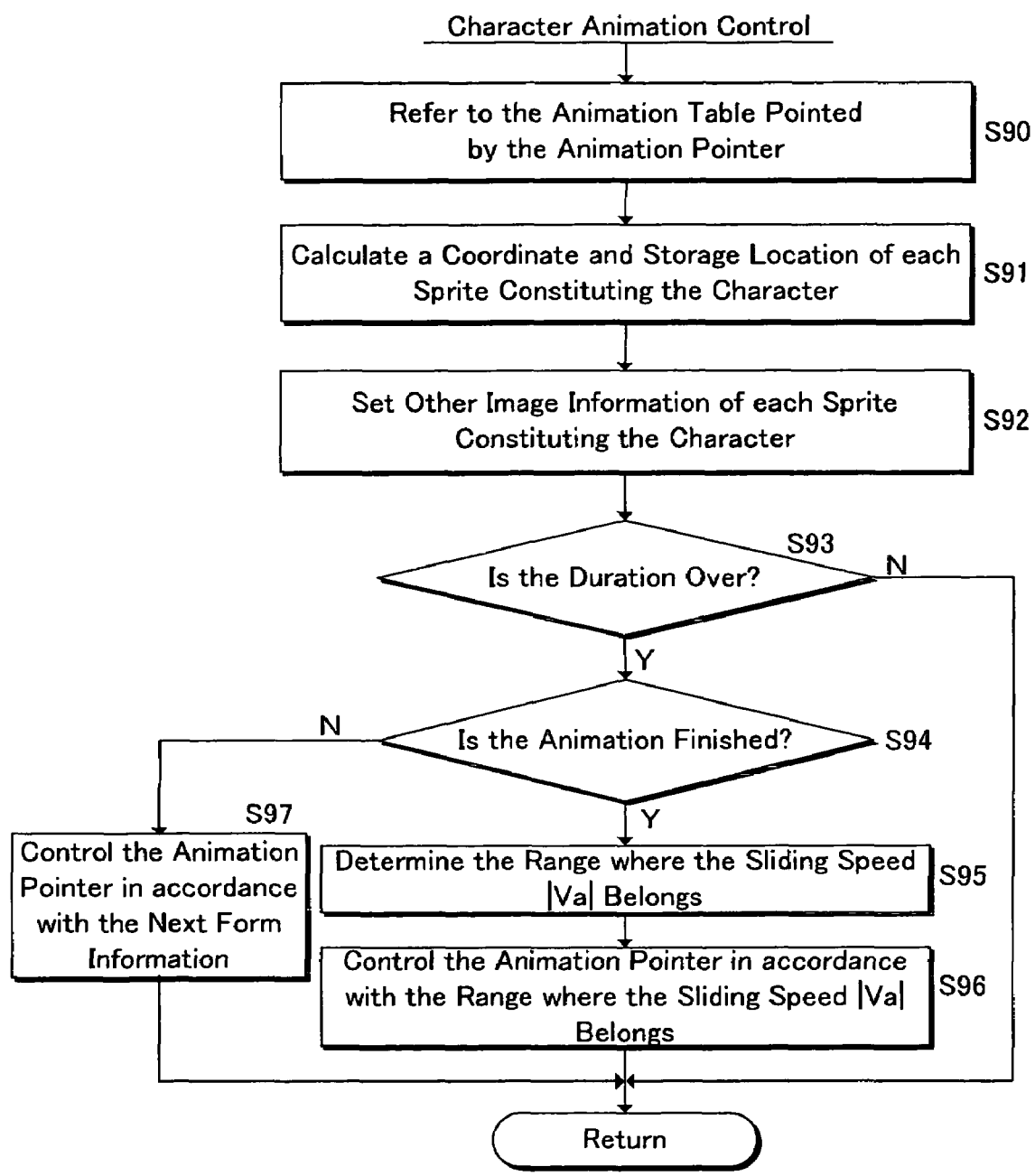
FIG. 35 is a flowchart showing the process flow of the character animation process in step S5 of FIG. 26.

FIG. 35 is a flowchart showing the process flow of the character animation process in step S5 of FIG. 26. As illustrated in FIG. 35, the CPU 201 refers to the animation table pointed by an animation pointer in step S90. The animation pointer is a pointer which points current animation table. In step S91, the CPU 201 derives the display coordinate and the storage location information of pixel pattern of each sprite constituting the character 73 on the basis of the information in the animation table, and stores them in certain area of the inner memory 207. In step S92, the CPU 201 obtains other image information (such as size, color palette information and depth value) of each sprite constituting the character 73, and stores them in certain area of the inner memory 207.

In step S93, the CPU 201 determines whether or not duration designated by the duration information is over. If it is not over yet, the CPU 201 returns to the main routine, otherwise proceeds to step S94. In step S94, the CPU 201 determines whether or not the animation is ended. If it is not ended yet, the process proceeds to step S97, otherwise proceeds to step S95. Meanwhile, the end of animation means the end of display of all character 73 of character number "1" to "10" belonging to same sliding speed range.

In step S95, the CPU 201 judge the sliding speed range where the sliding speed |Val of the sliding operation piece 2 belongs. In step S96, the CPU 201 proceeds the animation pointer to the animation table of the character number "1" corresponding to the sliding speed range where the sliding speed 51 Val belongs, then returns to the main routine. In step S97, the CPU 201 controls the animation pointer in accordance with the next form information from the animation table, then returns to the main routine.

For example, if the animation pointer points the animation table of the character number "1" corresponding to the sliding speed range "ThV<|Val|≦V1", the CPU 201 proceeds the animation pointer to animation table of the next character number "2" corresponding to the same sliding speed range "ThV<|Val|≦V1."

As can be expected from FIG. 34, if the sliding speed |Val is larger, animation speed becomes faster (the duration information becomes smaller). On the other hand, if the sliding speed |Val is smaller, animation speed becomes slower (the duration information becomes larger).

Figure 36:
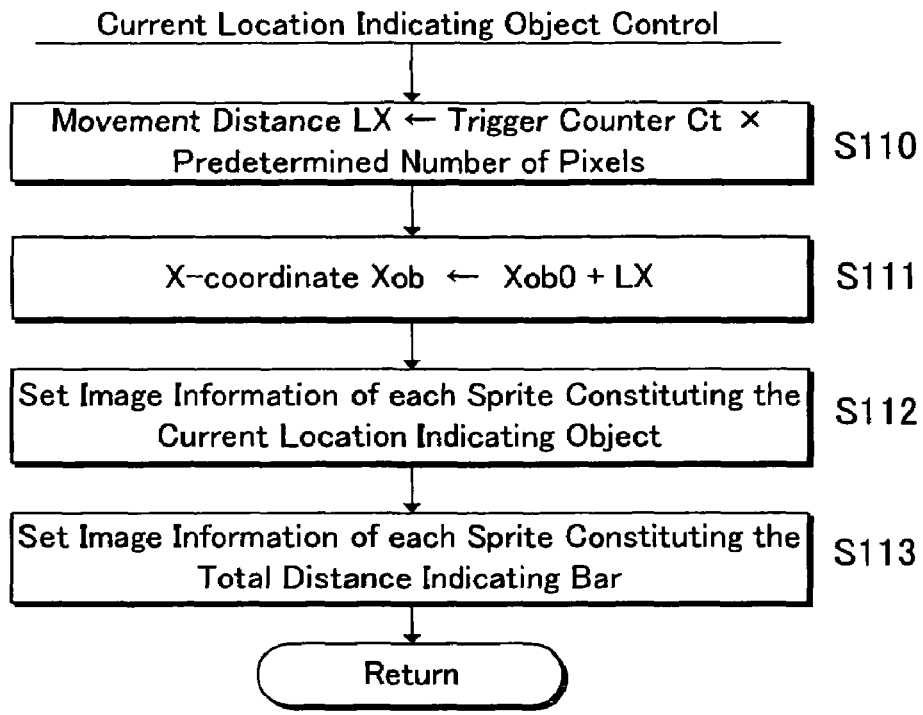
FIG. 36 is a flowchart showing the process flow of the current position indicating object control process in step S6 of FIG. 26.

FIG. 36 is a flowchart showing the process flow of the current position indicating object control process in step S6 of FIG. 26. As illustrated in FIG. 36, in step S110, the CPU 201 multiplies the count value of the trigger counter "Ct" by a predetermined number of pixels, then makes use of the result as a movement distance "LX" of the current position indicating object 71. In step S111, the CPU 201 adds an initial coordinate "Xob0" to the movement distance "LX", and makes use of it as an X-coordinate "Xob" of the current position indicating object 71. A Y-coordinate "Yob" is fixed. In step S112, the CPU 201 sets the image information (such as the storage location information of pixel pattern data, the display coordinate, size, the color palette information and depth value) of a sprite constituting the current position indicating object 71 to a prescribed area of the inner memory 207. The current position indicating object 71 is assumed to consist of the single sprite. In step S113, the CPU 201 sets the image information (such as the storage location information of pixel pattern data, the display coordinate, size, the color palette information and depth value) of sprites constituting the total distance indicating bar 70 to a prescribed area of the inner memory 207.

Incidentally, the length of the total distance indicating bar 70 is commensurate with a number of musical notes in the musical score data 308. In this way, the current position indicating object 71 moves for a distance corresponding to one musical note (the prescribed number of pixels in step S110) every time a trigger is generated.

Figure 37:
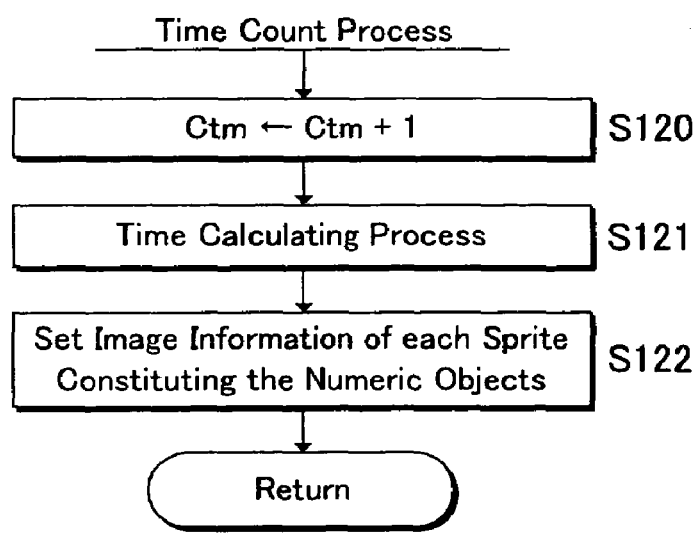
FIG. 37 is a flowchart showing the process flow of the time count process in step S7 of FIG. 26.

FIG. 37 is a flowchart showing the process flow of the time count process in step S7 of FIG. 26. As illustrated in FIG. 37, the CPU 201 increments a counter "Ctm" in step S120. In step S121, the CPU 201 calculates elapsed time from start on the basis of a count value of the counter "Ctm". Incidentally, it is assumed that the video synchronous interrupt signal is issued every 60th second. Since the counter "Ctm" is incremented every time a display image (a frame) is updated, it is possible to calculate the elapsed time with ease. In step S122, the CPU 201 sets the image information (such as the storage location information of pixel pattern data, the display coordinate, size, the color palette information and depth value) of sprites constituting each numeric object for displaying the elapsed time to a prescribed area of the inner memory 207 in order to display the elapsed time from the start of running. Each numeric object consists of a single sprite.

Figure 38:
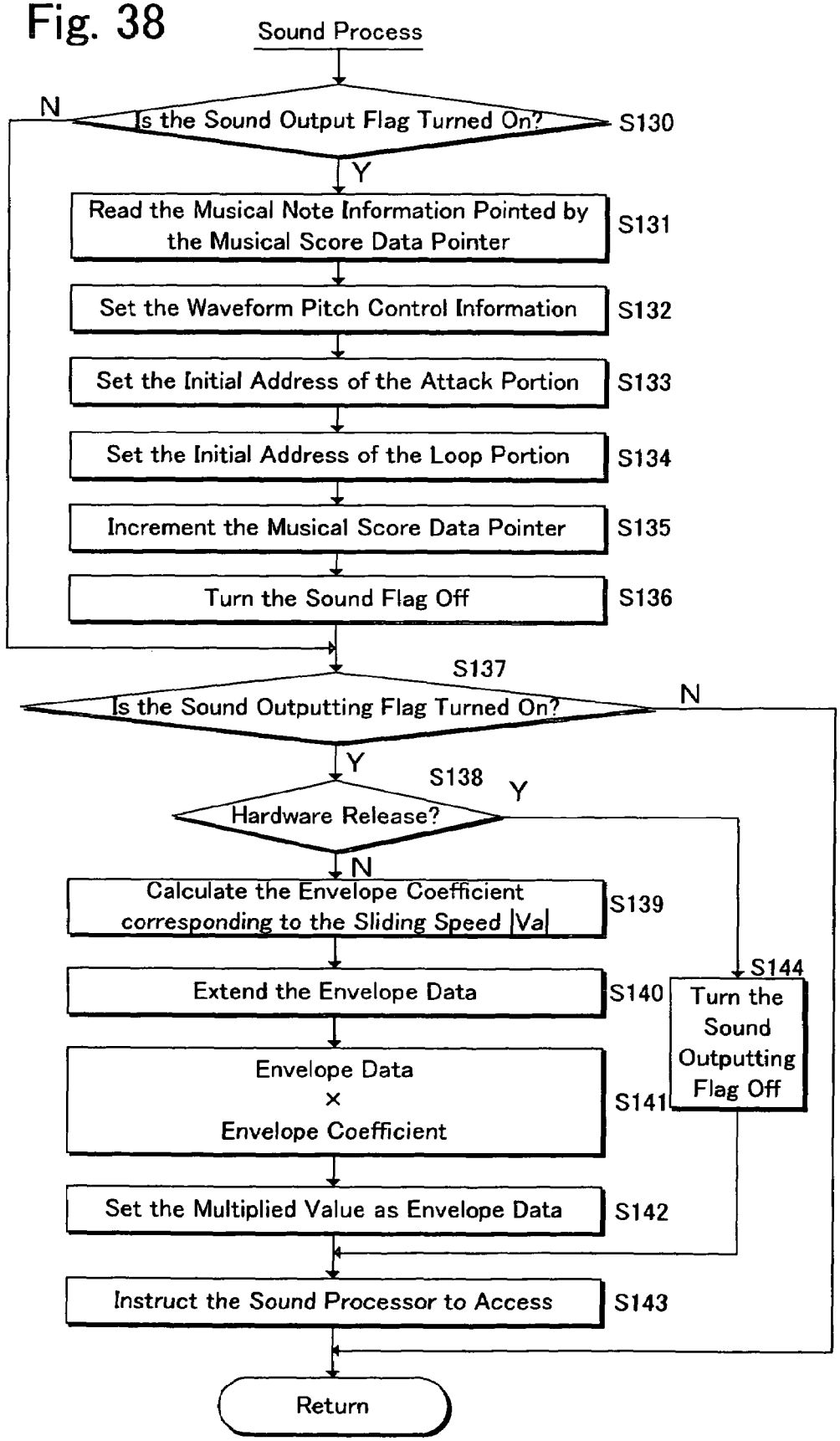
FIG. 38 is a flowchart showing the process flow of the sound process in step S10 of FIG. 26.

Returning to FIG. 26, in step S9, the CPU 201 sends the image information of each sprite to the graphic processor 202 during the vertical blanking period. In addition, the graphic processor 202 reads information of the array PA and CA stored in the inner memory 207 during the vertical blanking period. Then, the graphic processor 202 generates an image signal "VD" on the basis of these information to update a display image. FIG. 38 is a flowchart showing the process flow of the audio process in step S10 of FIG. 26. In step S130, in accordance with the on/off state of the sound output flag (whether or not a trigger is generated), the CPU 201 proceeds to step S137 if the sound output flag is turned off and proceeds to step S131 if the sound output flag is turned on (a trigger is generated). In step S131, the CPU 201 reads musical note information (i.e. pitch information) from the musical score data 308 stored in the external ROM 300 or the external ROM 91 with reference to the musical score data pointer. In step S132, the CPU 201 stores, in the inner memory 207, the waveform pitch control information corresponding to the musical note information as read.

In step S133, the CPU 201 stores, in the inner memory 207, the initial address of the attack portion of the waveform data corresponding to the musical note information as read. In step S134, the CPU 201 stores, in the inner memory 207, the initial address of the loop portion of the waveform data corresponding to the musical note information as read. In step S135, the CPU 201 increments the musical score data pointer. The musical score data 308 is data containing the musical note information (the pitch information) arranged in a time series. In step S136, the CPU 201 turns the sound output flag off.

In step S137, in accordance with the on/off state of the sound outputting flag, the CPU 201 returns to the main routine if the sound outputting flag is turned off and proceeds to step S138 if the sound outputting flag is turned on. In step S138, the CPU 201 checks the state of the hardware release flag. If it is turned on, the CPU 201 proceeds to step S144, then turns the outputting flag off and proceeds to step S143. Conversely, if the hardware release flag is turned off, the CPU 201 proceeds to step S139. In step S139, the CPU 201 calculates an envelope coefficient in proportion to the sliding speed |Va|. For example, if the velocity counter "Cv" is an 8 bit counter, the envelope coefficient is calculated as 8×|Va|× (1/255) while it is clipped to "1" if the envelope coefficient as calculated exceeds "1". In step S140, the CPU 201 reads the envelope data compressed and stored in the external ROM 300 or the external ROM 91, and extended in the inner memory 207. In step S140, the CPU 201 reads the envelope data corresponding to the waveform data in accordance with the musical note information as read in step S131.

In step S141, the CPU 201 multiplies the extended envelope data by the envelope coefficient obtained in step S139. In step S142, the CPU 201 sets the result of multiplication of step S141 again as a new envelope data to the inner memory 207. In this way, sound volume is controlled by controlling envelope data in accordance with the sliding speed |Va|. In step S143, the CPU 201 instructs the sound processor 203 to access the inner memory 207. In response to this, the sound processor 203 reads the initial addresses of the attack portion, the initial addresses of the loop portion and the envelope data as stored in the inner memory 207 in the appropriate timing, and generates the audio signals "AL" and "AR". If the hardware release flag is turned on, the sound processor 203 performs the deadening of sound. Therefore, once the sound output flag is turned on, the audio signals "AL" and "AR" corresponding to relevant musical note information are continuously generated until the hardware release flag is turned on.

Incidentally, the similar process (the trigger process, sound process) as FIG. 26 is executed when automatically performing music is performed with using the sliding operation piece 2. In this case, the image displaying process is performed to display the screen similar to FIG. 8.

Next, a game process (the flying game of FIG. 10 and FIG. 11) performed on the basis of the sliding time of the sliding operation piece 2 will be explained.

Figure 39:
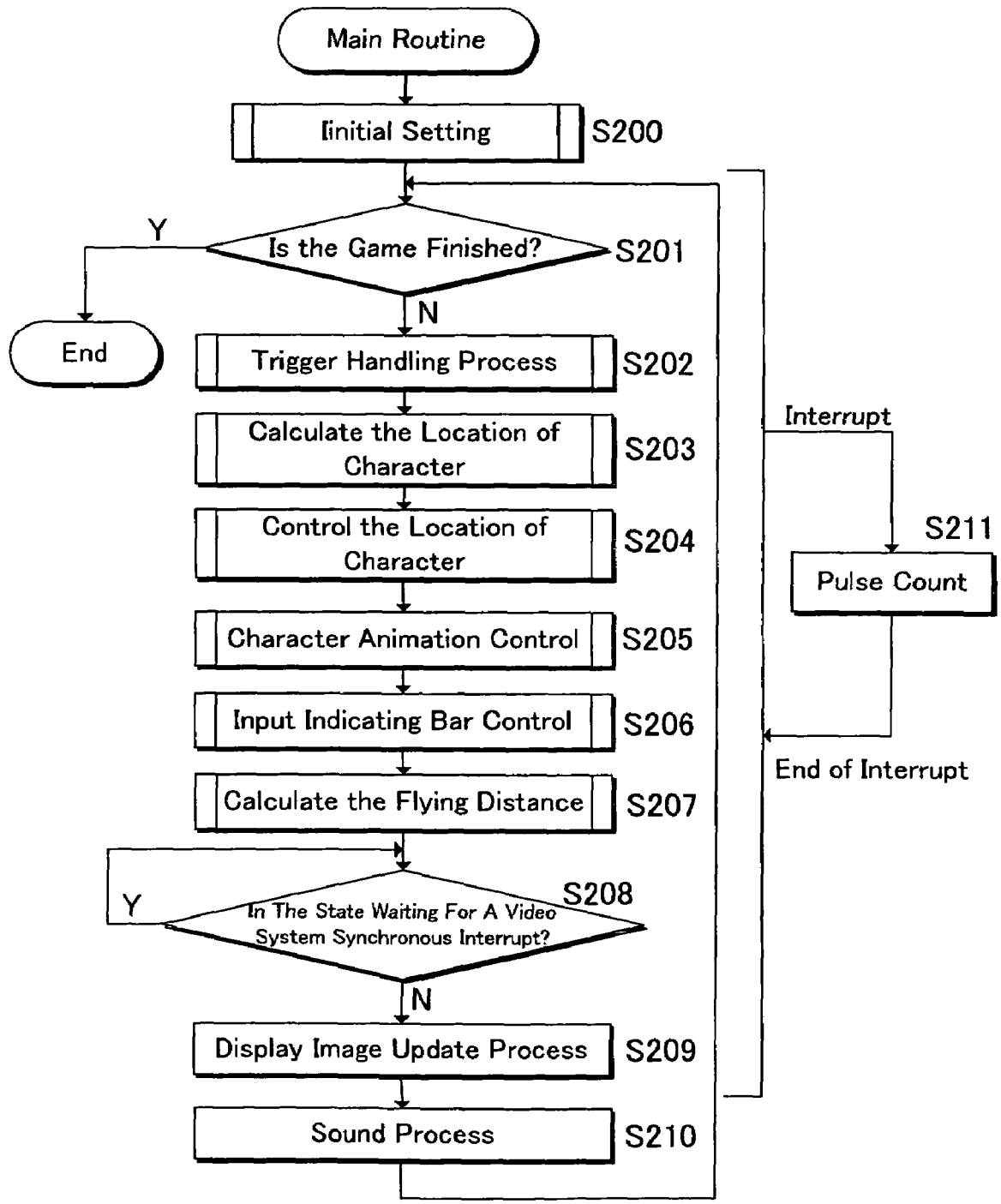
FIG. 39 is a flowchart showing the process flow of the flying game process performed by the automatic musical instrument of FIG. 1.

FIG. 39 is a flowchart showing the process flow of the flying game process performed by the automatic musical instrument of FIG. 1. As illustrated in FIG. 39, the CPU 201 initializes the system in step S200. This process is similar to the initial setting process in step S1 of FIG. 26, and therefore redundant explanation is not repeated. In step S201, the CPU 201 checks whether or not the game is over. If the game is over (the character 73 lands and a prescribed time is elapsed), the CPU 201 finished processing, otherwise the CPU 201 proceeds to step S202.

In step S202, the CPU 201 checks whether or not the sliding operation performed by the operator satisfies the trigger generating requirement. This process is similar to the trigger process in step S3 of FIG. 26, and therefore redundant explanation is not repeated. In step S203, the CPU 201 calculates position of the character 73 on the basis of the sliding time of the sliding operation piece 2. In step S204, the CPU 201 controls the location of the character 73 on the basis of the result of calculation of step S203. In step S205, the CPU 201 controls animation of the character 73. In step S206, the CPU 201 controls the color of the input indicating bar 75 on the basis of the operation of the sliding operation piece 2. In step S207, the CPU 201 calculates fright distance of the character 73.

In step S208, the CPU 201 determines whether or not the CPU 201 waits for the video system synchronous interrupt. If the CPU 201 waits for the video system synchronous interrupt (there is no interrupt responsive to the video system synchronous signal), the CPU 201 repeats the same step S208. Conversely, if the CPU 201 gets out of the state of waiting for the video system synchronous interrupt (the CPU 201 is given the video system synchronous interrupt), the process proceeds to step S209. In step S209, the graphic processor 202 updates the display image of the television monitor 80 as instructed by the CPU 201. This is similar to the process in step S9 of FIG. 26.

In step S210, the CPU 201 sets necessary information to the inner memory 207 for the sound processor 203 to generate audio signals "AL" and "AR". In the flying game, the CPU 201 does not output sound in response to the triggers as it does in the running game. Therefore, in step S210, the CPU 201 sets, to the inner memory 207, waveform pitch control information, initial addresses of the attack portion and the loop portion of waveform data, envelope pitch control information and an initial address of envelope data in accordance with musical note information pointed by a musical score data pointer which does not depend on the trigger. The sound processor 203 reads waveform data and envelope data from the external ROM 300 or the external ROM 91 on the basis of the set information, and generates the audio signals "AL" and "AR" for BGM. As described above, the display image update process in step S209 and the sound process in step S210 are performed in synchronization with the video system synchronous interrupt.

The CPU 201 performs a pulse count process of step S211 when the CPU 201 is given the video system synchronous interrupt by the timer circuit 210. The pulse count process is similar to the process in step S11 of FIG. 26, and therefore redundant explanation is not repeated.

Figure 40:
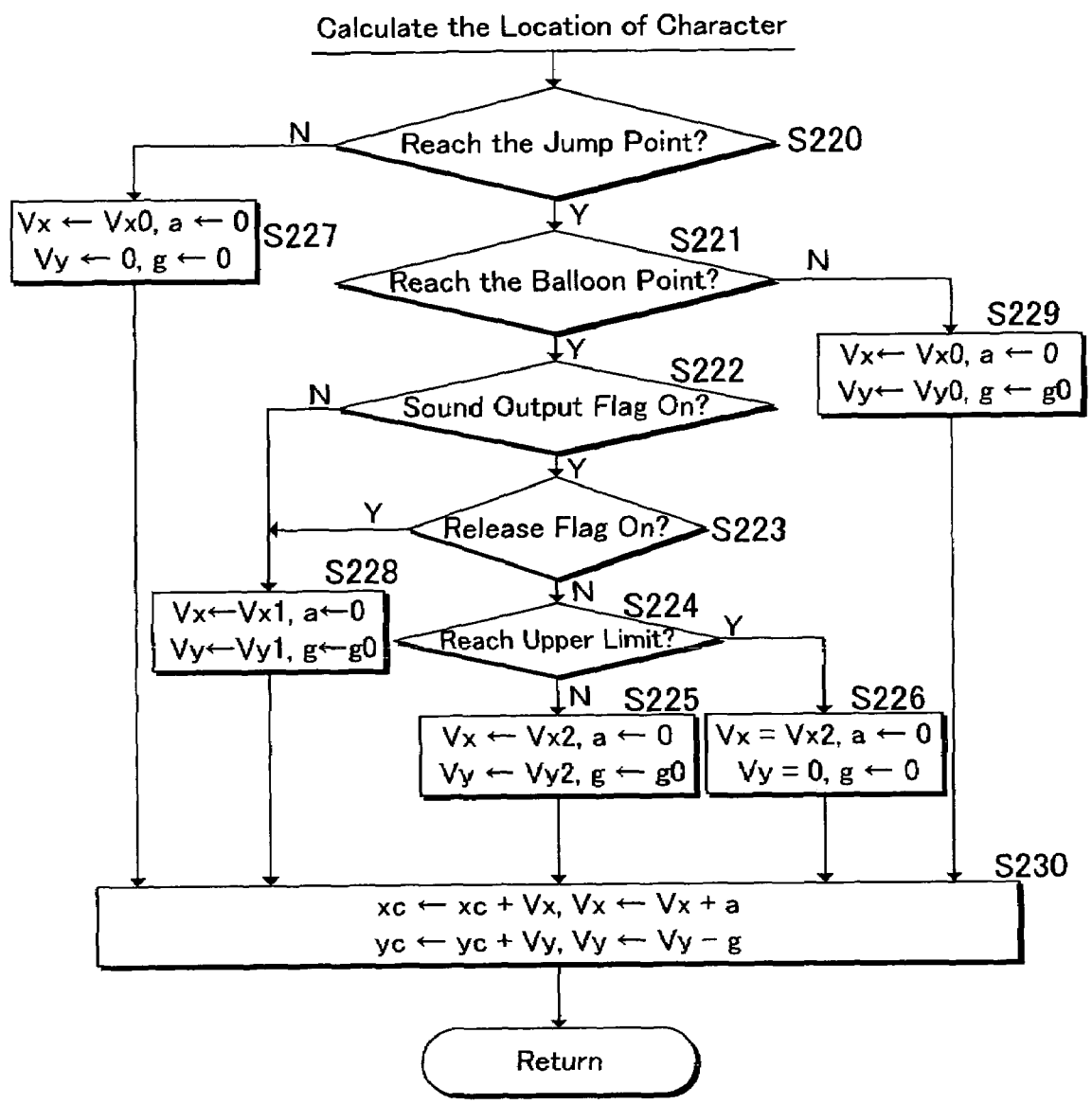
FIG. 40 is a flowchart showing the process flow of the character location calculation process in step S203 of FIG. 39.

FIG. 40 is a flowchart showing the process flow of the character location calculation process in step S203 of FIG. 39. As illustrate in FIG. 40, in step S220, the CPU 201 judges whether or not the character 73 on the fictive coordinate (refer to FIG. 30) reaches the jump point. If the character 73 reaches the jump point, the CPU 201 proceeds to step S221, otherwise proceeds to step S227. In step S227, the CPU 201 assigns a prescribed value "Vx0" to a variable "Vx", "0" to a variable "a", "0" to a variable "Vy", and "0" to a variable "g". Then, in step S221, the CPU 201 judges whether or not the character 73 on the fictive coordinate reaches the point of the balloon object 76. If the character 73 reaches the point, the CPU 201 proceeds to step S222, otherwise proceeds to S229. In step S229, the CPU 201 assigns the prescribed value "Vx0" to the variable "Vx", "0" to the variable "a", a prescribed value "Vy0" to the variable "Vy", and a prescribed value "g0" to the variable "g".

In step S222, the CPU 201 determines whether or not the sound output flag is turned on. If the sound output flag is turned off, the CPU 201 proceeds to step S228, otherwise proceeds to step S223. In step S223, the CPU 201 determines whether or not the hardware release flag is turned on. If the hardware release flag is turned on, the CPU 201 proceeds to step S228, otherwise proceeds to step S224. In step S228, the CPU 201 assigns a prescribed value "Vx1" to the variable "Vx", "0" to the variable "a", a prescribed value "Vy1" to the variable "Vy", and the prescribed value "g0" to the variable "g".

In step S224, the CPU 201 determines whether or not the character 73 reaches the upper limit. If the character 73 reaches the upper limit, the CPU 201 proceeds to step S226, otherwise proceeds to step S225. In step S225, the CPU 201 assigns a prescribed value "Vx2" to the variable "Vx", "0" to the variable "a", a prescribed value "Vy2" to the variable "Vy", and the prescribed value "g0" to the variable "g". On the other hand, in step S226, the CPU 201 assigns the prescribed value "Vx2" to the variable "Vx", "0" to the variable "a", "0" to the variable "Vy", and "0" to the variable "g".

In step S230, the CPU 201 calculates following formulas on the basis of the variable "Vx", "Vy", "a" and "g" assigned in step S227, S228, S229, S225 or S226. Incidentally, an initial value "xc0" is assigned to a variable "xc", and an initial value "yc0" is assigned to a variable "yc".

$$xc \leftarrow xc+Vx \quad (1)$$

$$Vx \leftarrow Vx+a \quad (2)$$

$$yc \leftarrow yc+Vx \quad (3)$$

$$Vy \leftarrow Vy-g \quad (4)$$

The process in step S227 is for calculating the position of the character 73 between the start and the jump point. The process in step S229 is for calculating the position of the character 73 between the jump point and the balloon. The processes in step S228, S225 and S226 are for calculating the position of the character 73 after the character 73 grabs the balloon. In this case, the process in step S228 is a setting process for calculating the position of the character 73 when either a trigger is not generated or the sliding operation is finished (the input operation is finished). The process in step S226 is a setting process for calculating the position of the character 73 after the character 73 reaches the prescribed upper limit. The process in step S225 is a setting process for calculating the position of the character 73 when the character 73 descends under the prescribed upper limit.

Figure 41:
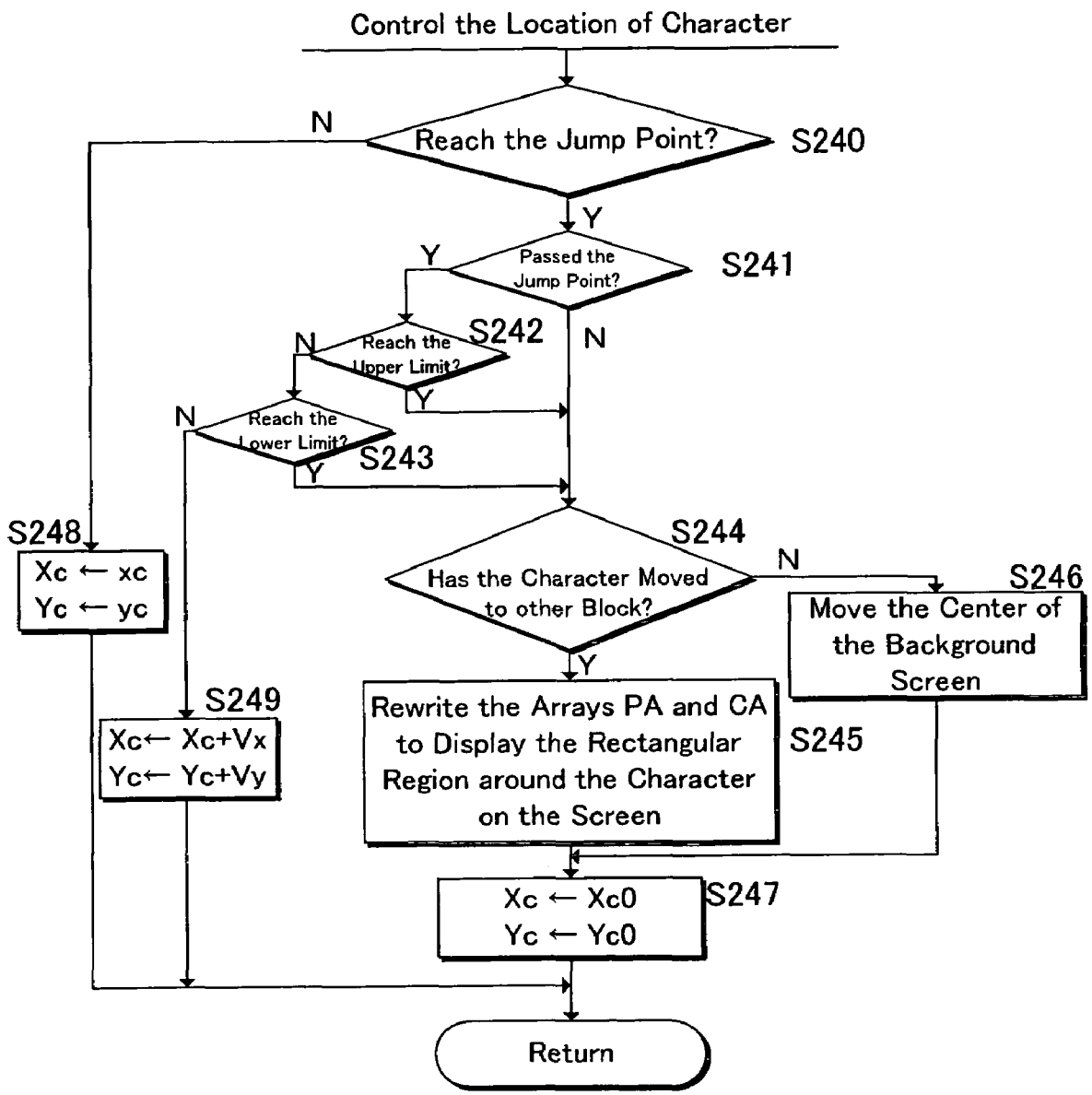
FIG. 41 is a flowchart showing the process flow of the character location control process in step S204 of FIG. 39.

FIG. 41 is a flowchart showing the process flow of the character location control process in step S204 of FIG. 39. As illustrated in FIG. 41, in step S240, the CPU 201 determines whether or not the character 73 reaches the jump point on the fictive coordinate. If the character 73 has not reach the jump point yet, the CPU 201 proceeds to step S248, and then assigns the coordinate (xc, yc) on the fictive coordinate as calculated in step S230 of FIG. 40 to the coordinate (Xc,Yc) of the character 73 on the screen 82. If the character 73 has reached the jump point, the CPU 201 proceeds to step S241. In step S241, the CPU 201 determines whether or not the character 73 passes the jump point on the fictive coordinate. If the character 73 passes the jump point, the CPU 201 proceeds to step S242, otherwise (i.e. if the character 73 is right at the jump point) proceeds to step S244. In step S242, the CPU 201 determines whether or not the character 73 reaches a prescribed upper limit. If the character 73 reaches the upper limit, the CPU 201 proceeds to step S244, otherwise proceeds to step S243. In step S243, the CPU 201 determines whether or not the character 73 reaches a prescribed lower limit. If the character reaches the prescribed lower limit, the CPU 201 proceeds to step S244, otherwise proceeds to step S249.

In step S249, the CPU 201 makes use of the coordinate (Xc, Yc) of the character 73 on the screen as a coordinate (a previous Xc+Vx, a previous Yc+Vy). In this way, in case where the character 73 is moving between the prescribed upper limit and the prescribed lower limit on the fictive coordinate, the CPU 201 does not move the background 74 but the character 73 itself on the screen 82.

In step S244, the CPU 201 determines whether or not the character 73 moves to other block. If the character 73 moves to other block, the CPU 201 proceeds to step S245, otherwise proceeds to step S246. In step S246, the CPU 201 defines the coordinate (Xf, Yf) of the center of the background screen 302 on the screen 82 as a coordinate (Xf−Vx, Yf−Vy). In step S245, the CPU 201 rewrites the arrays PA and CA constituting the background screen 302 in order to display the rectangular area (reference to FIG. 31) around the character 73 on the fictive coordinate on the screen 82. In step S247, the CPU 201 makes use of the coordinate (Xc, Yc) of the character 73 on the screen 82 as a coordinate (Xc0, Yc0). The coordinate (Xc0, Yc0) is at the center of the screen 82 and it is a constant value. As explained above, in case where the character 73 exists on the prescribed upper limit or under the prescribed lower limit, the CPU 201 does not move the character but change the background 74 to express movement of the character 73.

Figure 42:
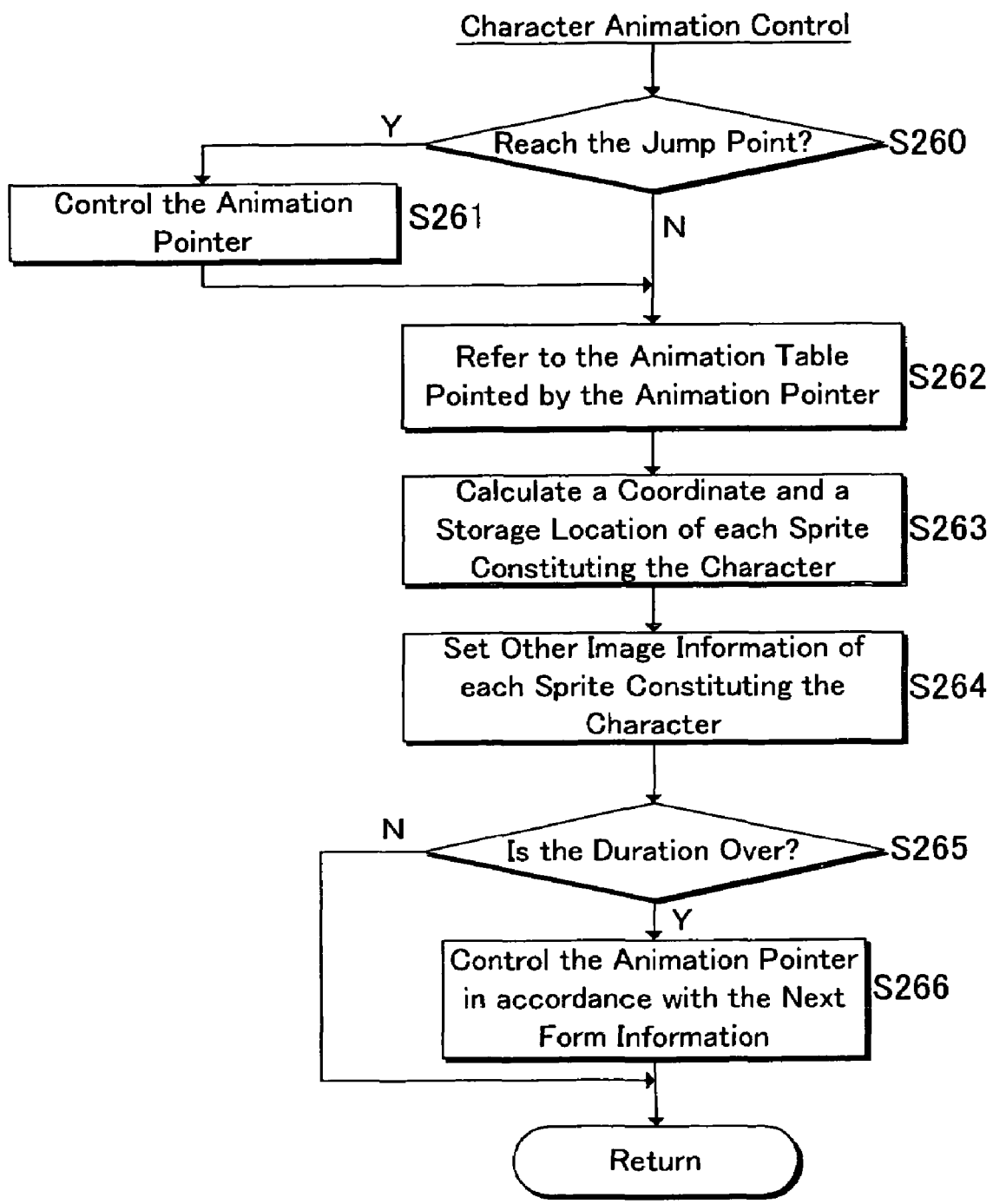
FIG. 42 is a flowchart showing the process flow of the character animation control in step S205 of FIG. 39.

FIG. 42 is a flowchart showing the process flow of the character animation control in step S205 of FIG. 39. As illustrated in FIG. 42, in step S260, the CPU 201 determines whether or not the character 73 reaches the jump point on the fictive coordinate. If the character 73 has not reached the jump point, the CPU 201 proceeds to step S262, otherwise proceeds to step S261. In step S261, the CPU 201 increments the animation pointer to an appropriate position to display a static image of the character 73. In other words, animation does not performed after the character 73 reaches the jump point.

In step S262, the CPU 201 refers an animation table pointed by the animation pointer. The format of the animation table is similar to the one of the animation table of FIG. 34. However, in this case, the sliding speed range is not provided to this animation table, and the animation process does not depend on the sliding speed |Va|. In step S263, the CPU 201 calculates display coordinates and storage location information of pixel pattern data of each sprite constituting the character 73 on the basis of the information from the animation table, and stores them in the predetermined area of the inner memory 207. In step S264, the CPU 201 obtains other image information of each sprite constituting the character 73 (such as size, color palette information and depth value) from the animation table, and stores them in the inner memory 207.

In step S265, the CPU 201 determines whether or not the duration designated by the duration information of the animation table is over. If the duration is not over yet, the CPU 201 returns to the main routine, otherwise proceeds to step S266. In step S266, the CPU 201 increments the animation pointer to the appropriate point in accordance with the next form information with reference to the animation table.

Figure 43:
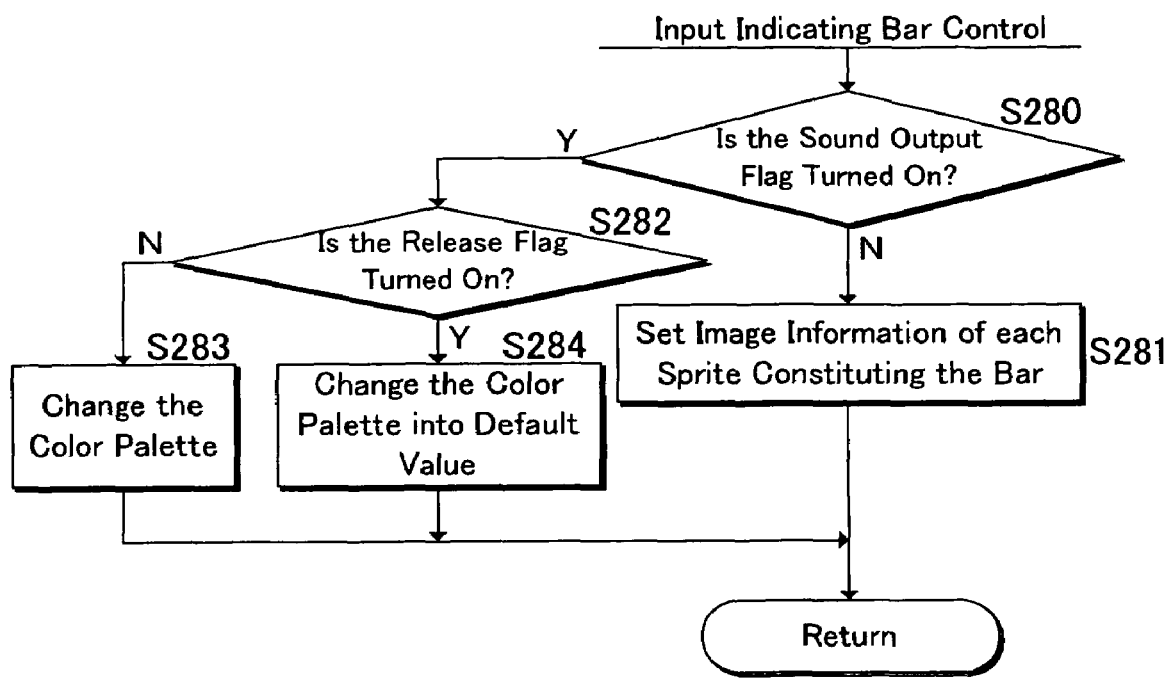
FIG. 43 is a flowchart showing the process flow of the input indicating bar control process in step S206 of FIG. 39.

FIG. 43 is a flowchart showing the process flow of the input indicating bar control process in step S206 of FIG. 39. As illustrated in FIG. 43, instep S280, the CPU 201 determines whether or not the sound output flag is turned on. If the sound output flag is turned on, the CPU 201 proceeds to step S282, otherwise proceeds to step S281. In step S281, the CPU 201 sets, in the inner memory 207, image information of each sprite constituting the input indicating bar 75 (such as storage location information of pixel pattern data, display coordinate, size, color palette information and depth value). Then, in step S282, the CPU 201 determines whether or not the hardware release flag is turned on. If the hardware release flag is turned on, the CPU 201 proceeds to step S284, otherwise proceeds to step S283. In step S283, the CPU 201 changes the color palette information of each sprite constituting the input indicating bar 75 in order to inform that the operator is currently inputting (sliding), and then returns to the main routine. In step S284, the CPU 201 changes the color palette information of each sprite constituting the input indicating bar 75 into a default value in order to inform the operator the end of input (the end of sliding).

Figure 44:
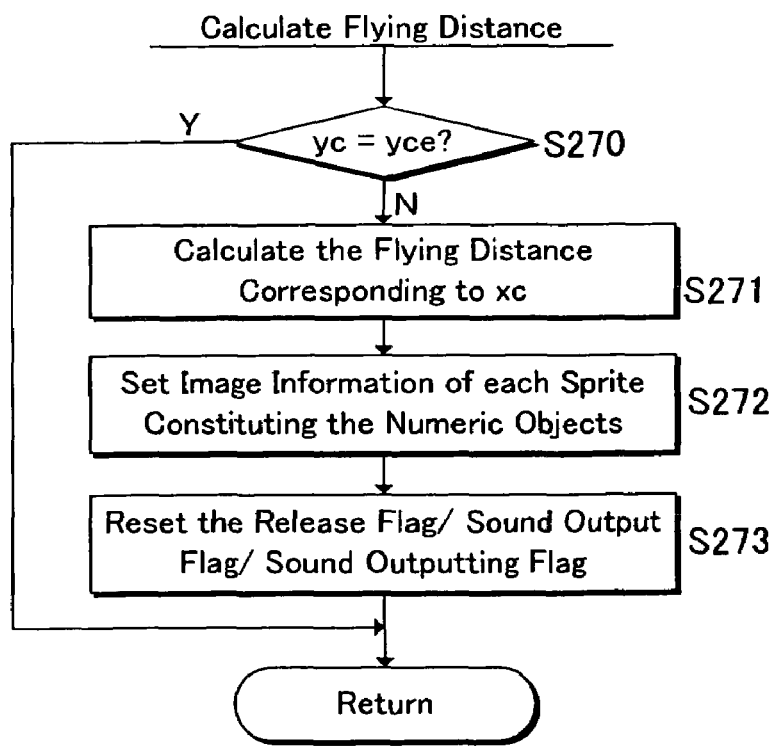
FIG. 44 is a flowchart showing the process flow of the flying distance calculation process in step S207 of FIG. 39.

FIG. 44 is a flowchart showing the process flow of the flying distance calculation process in step S207 of FIG. 39.

As illustrated in FIG. 44, in step S270, the CPU 201 determines whether or not a y-coordinate "yc" on the fictive coordinate of the character 73 reaches a prescribed value "yce" (y-coordinate of the goal point). In other words, the CPU 201 determines whether or not the character 73 reaches the goal point. If the character 73 has not reaches the goal point yet, the CPU 201 returns to the main routine, otherwise proceeds to step S271. In step S271, the CPU 201 calculates the flying distance commensurate with the x-coordinate "xc" on the fictive coordinate of the character 73. In step S272, the CPU 201 calculates image information of sprites constituting each numeric object (such as storage location information of pixel pattern data, display coordinate, size, color palette information and depth value), and stores them in the inner memory 207. In step S273, the CPU 201 resets the hardware release flag, the sound output flag and the sound outputting flag.

Next, a game process (the catch game process of FIG. 12) performed on the basis of the sliding direction of the sliding operation piece 2.

Figure 45:
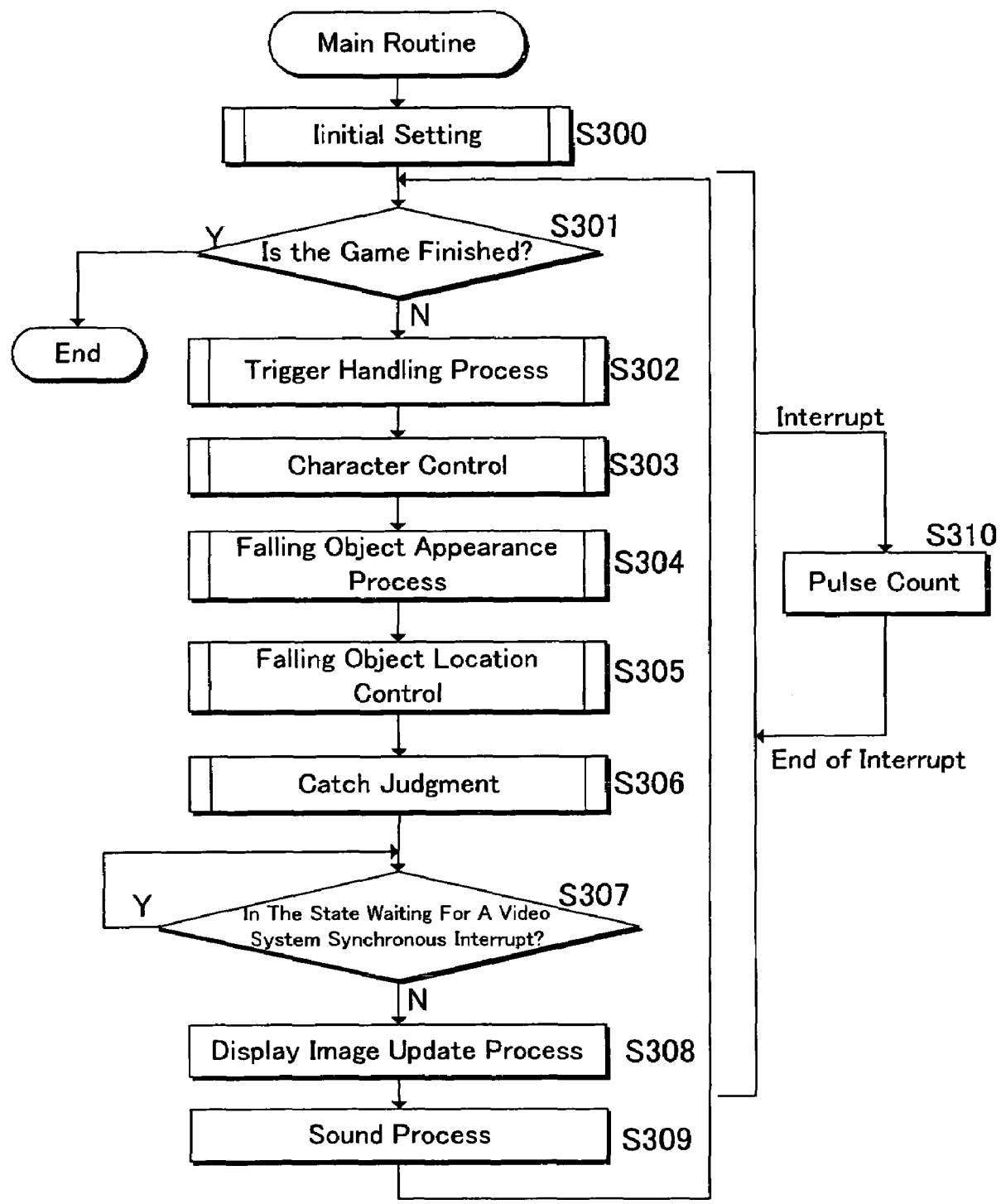
FIG. 45 is a flowchart showing the process flow of the catch game process performed by the automatic musical instrument of FIG. 1.

FIG. 45 is a flowchart showing the process flow of the catch game process performed by the automatic musical instrument of FIG. 1. As illustrated in FIG. 45, the CPU 201 initializes the system in step S300. This process is similar to the initial setting process in step S1 of FIG. 26, therefore redundant explanation is not repeated. In step S301, the CPU 201 determines whether or not a game is over. If the game is over (all life objects 78 are disappeared or a prescribed time is elapsed after the last falling object 79 appears), the CPU 201 finishes processing, otherwise proceeds to step S302.

In step S302, whether or not the sliding operation performed by the operator satisfies the trigger generating requirement. This process is similar to the trigger process in step S3 of FIG. 26, and therefore redundant explanation is not repeated. In step S303, the CPU 201 controls location of the character 73 on the basis of the sliding direction of the sliding operation piece 2. In step S304, the CPU 201 performs the appearance process of the falling object 79 with reference to a time table. In step S305, the CPU 201 controls position of the falling object 79 during falling. In step S306, the CPU 201 determines whether or not the character 73 catches the falling object 79.

In step S307, the CPU 201 determines whether or not the CPU 201 waits for the video system synchronous interrupt. If the CPU 201 waits for the video system synchronous interrupt (there is no interrupt responsive to the video system synchronous signal), the CPU 201 repeats the same step S307. On the other hand, if the CPU 201 gets out of the state of waiting for the video system synchronous interrupt (the CPU 201 is given the video system synchronous interrupt), the process proceeds to step S308. In step S308, the graphic processor 202 updates a display image of the television monitor 80 as instructed by the CPU 201. This is similar to the process in step S9 of FIG. 26.

In step S309, the CPU 201 sets necessary information for the sound processor to generate audio signals AL and AR to the inner memory 207. In the catch game process, the processor 200 does not perform sound output in response to triggers as it does in the running game process. Therefore, the CPU 201 sets waveform pitch control information, initial addresses of the attack portion and the loop portion of waveform data, envelope pitch control information and an initial address of envelope data to the inner memory 207 in accordance with musical note information pointed by a musical score data pointer which does not depend on the trigger. The sound processor 203 reads waveform data and envelope data from the external ROM 300 or the external ROM 91, and generates audio signals "AL" and "AR" for BGM. As has been discussed above, the display image update process in step S308 and the sound process in step S309 are performed in synchronization with the video system synchronous signal.

The pulse count process in step S310 is performed by the CPU 201 when the CPU 201 is given the interrupt by the timer circuit 210. The pulse count process is similar to the one in step S11 of FIG. 26, and therefore redundant explanation is not repeated.

Figure 46:
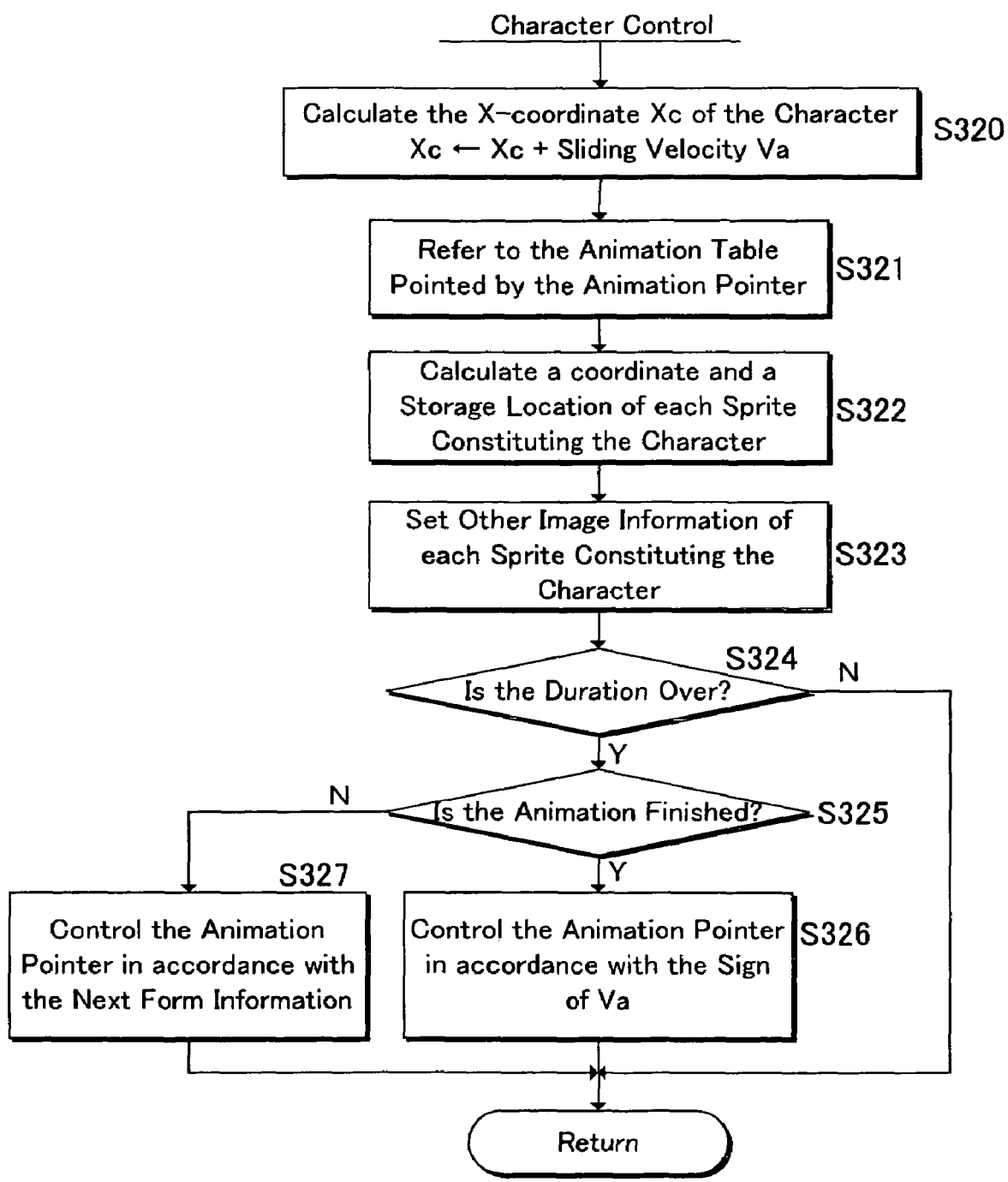
FIG. 46 is a flowchart showing the process flow of the character control process in step S303 of FIG. 45.

FIG. 46 is a flowchart showing the process flow of the character control process in step S303 of FIG. 45. As illustrated in FIG. 46, the CPU 201 calculates the X-coordinate "Xc" of the character 73 on the screen 82 in step S320. More specifically, Xc←Xc+the sliding velocity "Va".

In step S321, the CPU 201 refers to an animation table pointed by the animation pointer. The format of the animation table is similar to the one of FIG. 34 in this case. However, the sliding speed range is not provided. Therefore, the animation process does not depend on the sliding speed |Va| of the sliding operation piece 2. In step S322, the CPU 201 calculates a display coordinate and storage location information of pixel pattern data of each sprite constituting the character on the basis of the information from the animation table, and stores them in the predetermined area of the inner memory 207. In step S323, the CPU 201 obtains other image information (such as size, color palette information and depth value) of each sprite constituting the character 73 from the animation table, and stores them in a prescribed area of the inner memory 207.

In step S324, the CPU 201 determines whether or not duration designated by the duration information of the animation table is finished. If it is not finished, the CPU 201 returns to the main routine, otherwise proceeds to step S325. In step S325, the CPU 201 determines whether or not animation is finished. If it is not finished, the CPU 201 proceeds to step S327, otherwise proceeds to step S326. Meanwhile, the end of animation means that display of the character 73 corresponding to all character number is finished.

In step S327, the CPU 201 increments the animation pointer to an appropriate position in accordance with the next form information of the animation table. In step S326, the CPU 201 controls the animation pointer in accordance with a sign of the sliding velocity "Va". The animation tables of the character 73 for (+) direction and (−) direction of FIG. 12 are provided. Therefore, when the sliding direction of the sliding operation piece 2 is changed (i.e. the sign of the sliding velocity "Va" is changed), the animation pointer is controlled to point the animation table corresponding to the sliding direction by the CPU 201.

Figures 47, 48:
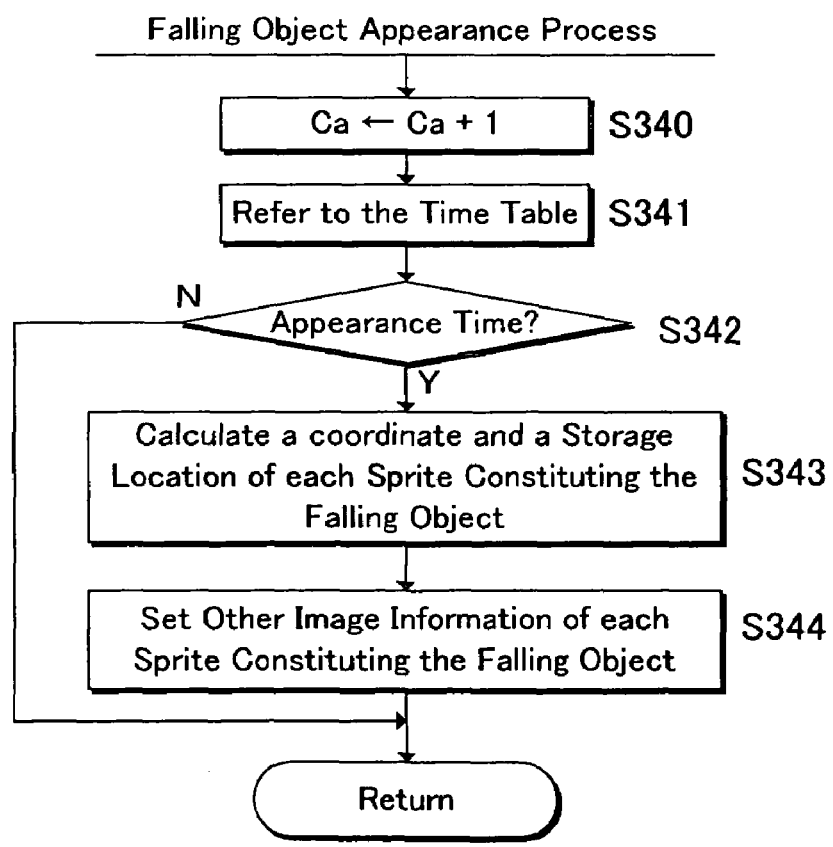
FIG. 47 is a view showing an example of the time table to display the falling objects 79.
FIG. 48 is a flowchart showing the process flow of the falling object appearance process in step S304 of FIG. 45.

Next, the time table will be explained before explaining the falling object appearance process in step S304 of FIG. 45. FIG. 47 is a view showing an example of the time table to display the falling objects 79. As illustrated in FIG. 47, the time table is a table in which an appearance time of the falling object 82 and an appearance location of the falling object on the screen 82 are associated each other.

FIG. 48 is a flowchart showing the process flow of the falling object appearance process in step S304 of FIG. 45. As illustrated in FIG. 48, the CPU 201 increments the counter "Ca" in step S340. In step S341, the CPU 201 refers to the time table of FIG. 47. Then, in step S342, the CPU 201 determines whether or not a current count value of the counter "Ca" coincides with an appearance time on the time table. If the current count value does not coincide with the appearance time, it is not the time for the falling object 79 to appear. Therefore, the CPU 201 returns to the main routine, otherwise proceeds to step S343.

In step S343, the CPU 201 calculates a coordinate of each sprite constituting the falling object 79 to be displayed with reference to the appearance location in the time table. In addition, the CPU 201 calculates storage location information of pixel pattern data of each sprite. In step S344, the CPU 201 sets, in a prescribed area of the inner memory 207, other image information (such as size, color palette information and depth value) of each sprite constituting the falling object 79 to be displayed.

Figure 49:
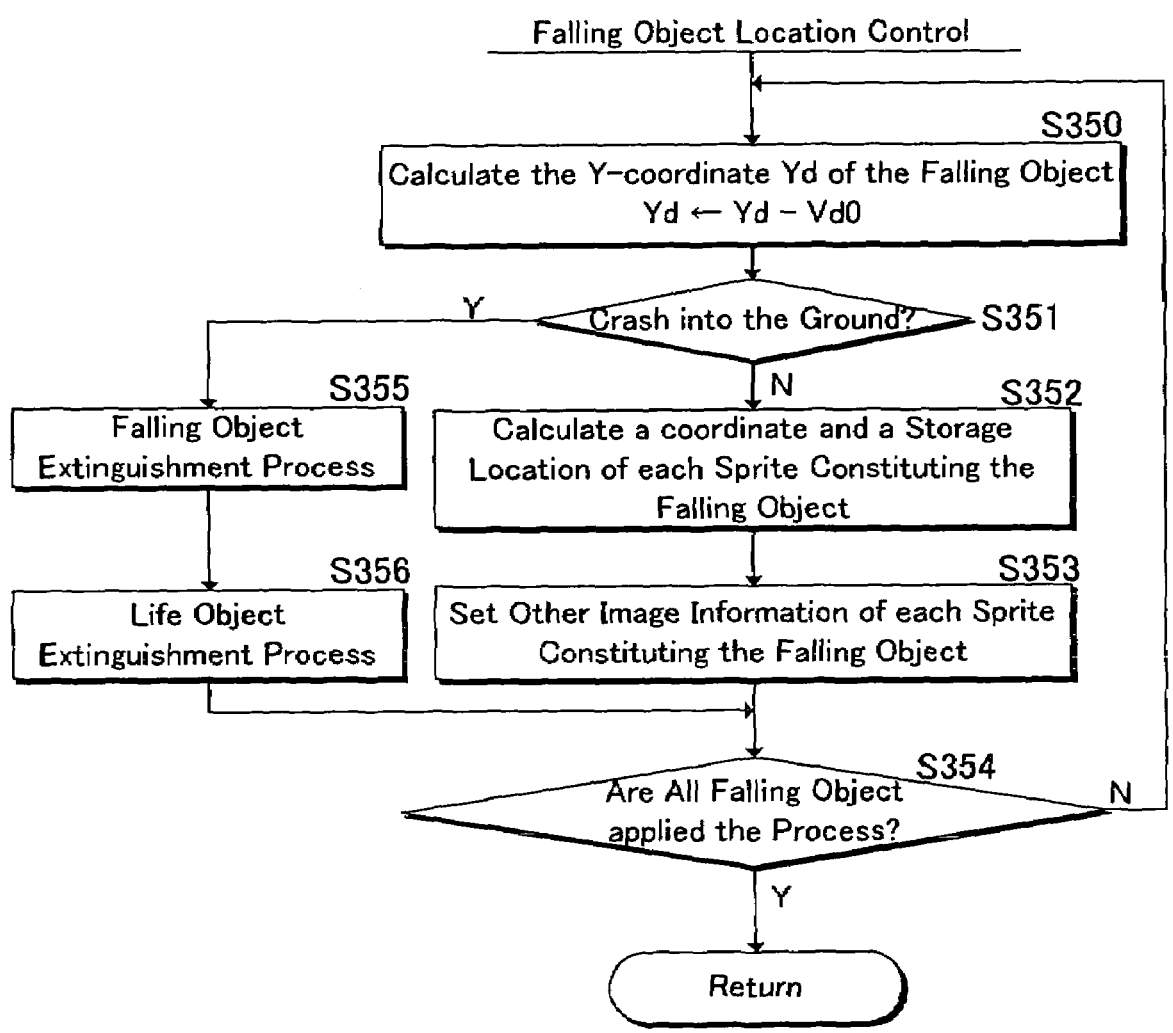
FIG. 49 is a flowchart showing the process flow of the falling object position control process in step S305 of FIG. 45.

FIG. 49 is a flowchart showing the process flow of the falling object position control process in step S305 of FIG. 45. As illustrated in FIG. 49, the CPU 201 calculates a Y-coordinate "Yd" of the falling object 79 being currently displayed on the screen 82 in step S350. More specifically, Yd←Yd−Vd0. In this way, the falling object 79 descends at a constant speed "Vd0". In step S351, the CPU 201 determines whether or not the falling object 79 has clashed into the ground image. If it has clashed, the CPU 201 proceeds to step S355, otherwise proceeds to step S352. It is possible to determine whether the falling object has clashed or not by determining whether or not the Y-coordinate "Yd" of the falling object 79 exists in a prescribed area including a Y-coordinate of the ground image at the center.

In step S355, the CPU 201 performs an extinguishment process of the falling object 79. More specifically, the display coordinate of the falling object 79 is considered to be at outside of the area of the screen 82. In step S356, the CPU 201 performs an extinguishment process of the life object 78. More specifically, the display coordinate of the life object 78 is considered to be at outside of the area of the screen 82.

In step S352, the CPU 201 calculates the coordinate of each sprite constituting the falling object 79 on the basis of the Y-coordinate "Yd" of the falling object 79. In addition, the CPU 201 calculates storage location information of pixel pattern data of each sprite constituting the falling object 79. In step S353, the CPU 201 sets, in a prescribed area of the inner memory 207, other image information (such as size, color palette information and depth value) of each sprite constituting the falling object 79. In step S354, the CPU 201 determines whether or not all falling objects 79 being displayed have been applied the process from step S350 to step S356. If all of them are already applied the process, the CPU 201 returns to the main routine, otherwise proceeds to step S350.

Figure 50:
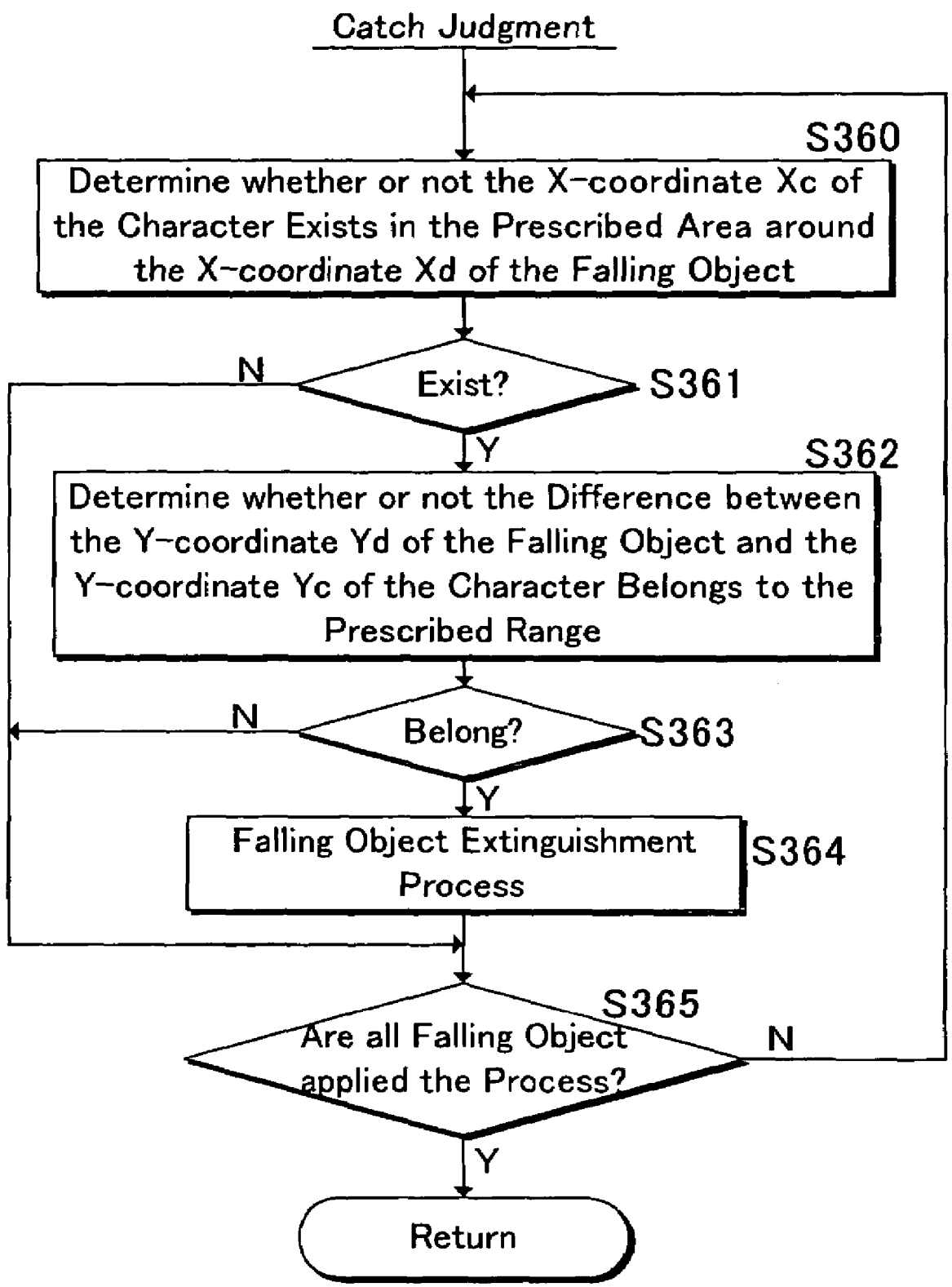
FIG. 50 is a flowchart showing the process flow of the catch judgment process in step S306 of FIG. 45.

FIG. 50 is a flowchart showing the process flow of the catch judgment process in step S306 of FIG. 45. As illustrated in FIG. 50, in step S360, the CPU 201 determines whether or not the X-coordinate "Xc" of the character 73 exists in a prescribed area including the X-coordinate "Xd" of the falling object 79 as its center. In step S361, if the X-coordinate "Xc" of the character 73 exists in the prescribed area including the X-coordinate "Xd" of the falling object 79, the CPU 201 proceeds to step S362, otherwise proceeds to step S365. In step S362, the CPU 201 determines whether or not the difference between the Y-coordinate "Yd" of the falling object 79 and the Y-coordinate "Yc" of the character 73 is in a prescribed range. In step S363, if the difference between the Y-coordinate "Yd" of the falling object 79 and the Y-coordinate "Yc" of the character 73 is not in the prescribed range, the CPU 201 proceeds to step S365, otherwise proceeds to step S364. In step S364, the CPU 201 performs an extinguishment process of the falling object 73. More specifically, the display coordinate of the falling object 79 is considered to be at outside of the range of the screen 82. In step S365, the CPU 201 determines whether or not all falling objects 79 being displayed have been applied the process from step S360 to step S364. If all of them are already applied the process, the CPU 201 returns to the main routine, otherwise proceeds to step S360.

Meanwhile, as described above, in accordance with the present embodiment, the high processor 200 generates an image signal "VD" corresponding to the sliding speed IVaI of the sliding operation piece 2. In this way, the operator can give changes to a displayed image by changing the sliding speed of the sliding operation piece 2. In accordance with the example shown in FIG. 9, the high speed processor 200 controls movement speed of the character 73 on the screen 82 in response to the sliding speed IVaI of the sliding operation piece 2. In this way, it is possible to control the movement speed of the displayed character 73 by changing the sliding speed IVaI of the sliding operation piece 2.

In addition, in accordance with the present embodiment, the high speed processor 200 generates an image signal "VD" corresponding to the sliding time of the sliding operation piece 2. In this way, the operator can give changes to a displayed image by changing the sliding time of the sliding operation piece 2. In accordance with the example shown in FIG. 10 and FIG. 11, the high speed processor 200 controls movement distance of the character 73 in response to the sliding time without changing the sliding direction of the sliding operation piece 2. In this way, it is possible to control the movement distance of the displayed character 73 by changing the sliding time of the sliding operation piece 2.

Furthermore, in accordance with the present embodiment, the high speed processor 200 generates an image signal "VD" corresponding to the sliding direction of the sliding operation piece 2. In this way, the operator can give changes to a displayed image by changing the sliding direction of the sliding operation piece 2. In accordance with the example shown in FIG. 12, the high speed processor 200 controls movement direction of the character 73 in response to the sliding direction of the sliding operation piece 2. In this way, it is possible to control the movement direction of the displayed character 73 by changing the sliding direction of the sliding operation piece 2.

Furthermore, in accordance with the present embodiment, a linear encoder is provided with the infrared emitting diode 36, the phototransistors 34 and 35, and the sliding operation piece 2 having the reflecting pattern 43. Therefore, it is possible to measure the sliding speed, the sliding direction and the sliding time with ease.

Still further, in accordance with the present embodiment, the high speed processor 200 can execute the program 301 stored in the external ROM 91 of the memory cartridge 29. Then, the high speed processor can generate an image signal "VD" and audio signals "AL" and "AR" on the basis of the image data 304 and the music data 307 stored in the external ROM 91. Therefore, the user can enjoy various applications by changing the cartridge 29.

Still further, in accordance with the present embodiment, the high speed processor 200 generates audio signals "AL" and "AR" in response to triggers generated by operation of the sliding operation piece 2. Therefore, the operator can control sound output as well as image display by operating the sliding operation piece 2.

Incidentally, the present invention is not limited to the above embodiments, and a variety of variations and modifications may be effected without departing from the spirit and scope thereof, as described in the following exemplary modifications.

(1) In the above description, the state transition of the pulse signals A and B output by the optical sensor unit 90 is detected by the software counter. Alternatively, it is possible to detect by a hardware counter of the input/output control circuit 209.

(2) In the above description, the sliding operation piece 2 is provided with the reflecting pattern 43 consisting of the light reflecting regions 45 and the light absorbing regions 44, and reflected light is detected by the reflection type optical sensor 90. However, the sensor is not limited thereto, and it is possible to use a transmission type instead. More specifically, the sliding operation piece 2 is formed with a pattern comprising light transmissive regions and light blocking regions which are alternately arranged. Then, a transmission type optical sensor detects transmitted light.

Figure 51:
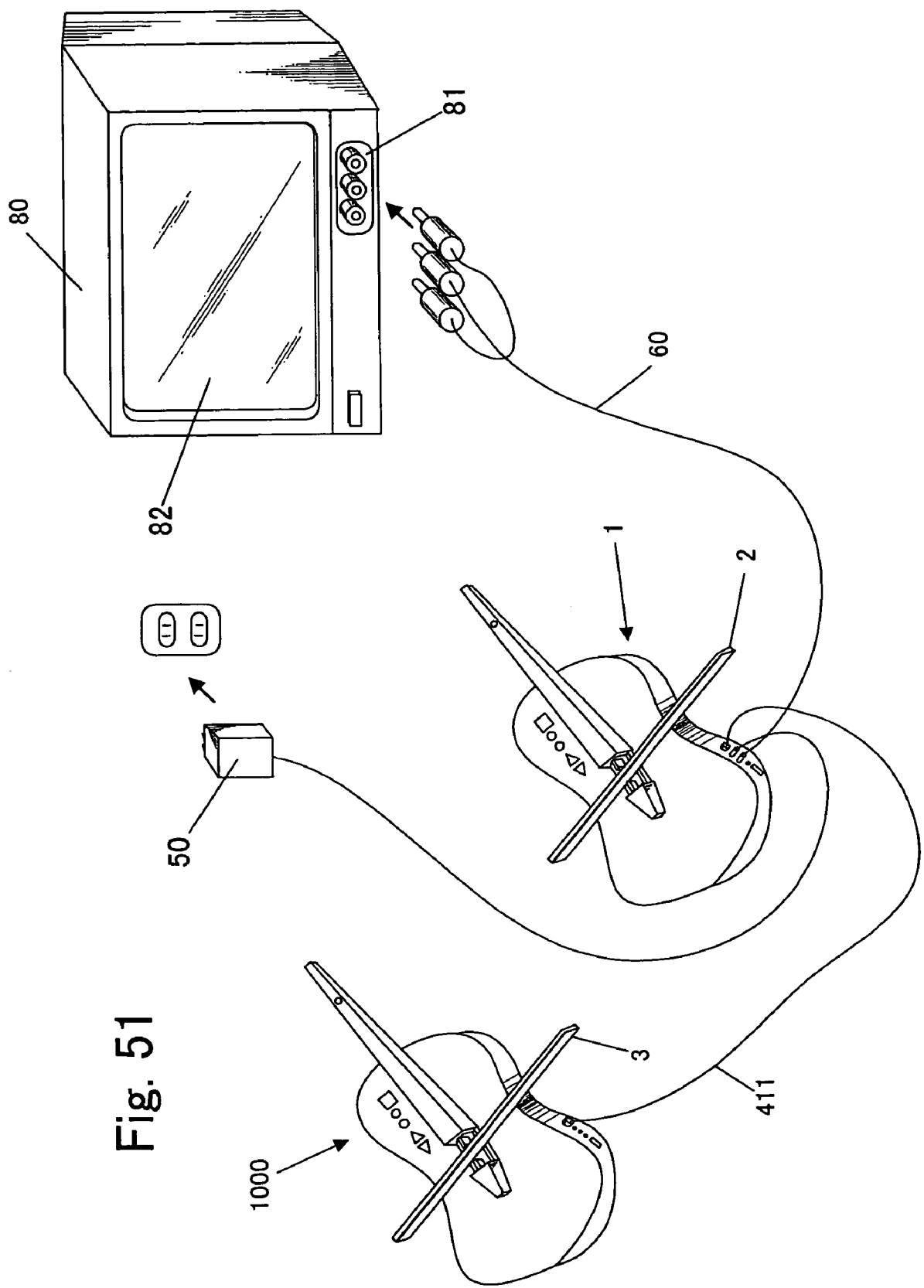
FIG. 51 is a view showing other example of use of the automatic musical instrument as an image signal generation apparatus in the present embodiment.

(3) FIG. 51 is a view showing other example of use of the automatic musical instrument as an image signal generation apparatus. As illustrated in FIG. 51, the automatic musical instrument main body 1 serving as a master is connected with the automatic musical instrument main body 1000 by the cable 411. Therefore, two operators can perform together. Meanwhile, the automatic musical instrument main body 1000 and the sliding operation piece 3 have same functionality as the automatic musical instrument main body 1 and the sliding operation piece 2.

The cable 411 is connected to the connecter 22 of the automatic musical instrument main body 1 (refer to FIG. 2B) and the connecter (not shown) of the automatic musical instrument main body 1000. The cable 411 comprises two lines for transmitting pulse signals (corresponding to pulse signals A and B) output from an optical sensor unit (corresponding to the optical sensor unit 90) in the automatic musical instrument main body 1000 to the automatic musical instrument main body 1, two power supply lines (Vcc and GND) for supplying power supply voltage "Vcc" and ground voltage "GND" from the main body 1 to the main body 1000, a line for transmitting a signal to turn the main body 1000 off output from the main body 1, and a line for transmitting a signal for turning vibrato of the main body 1000 off and on to the main body 1.

Figure 52:
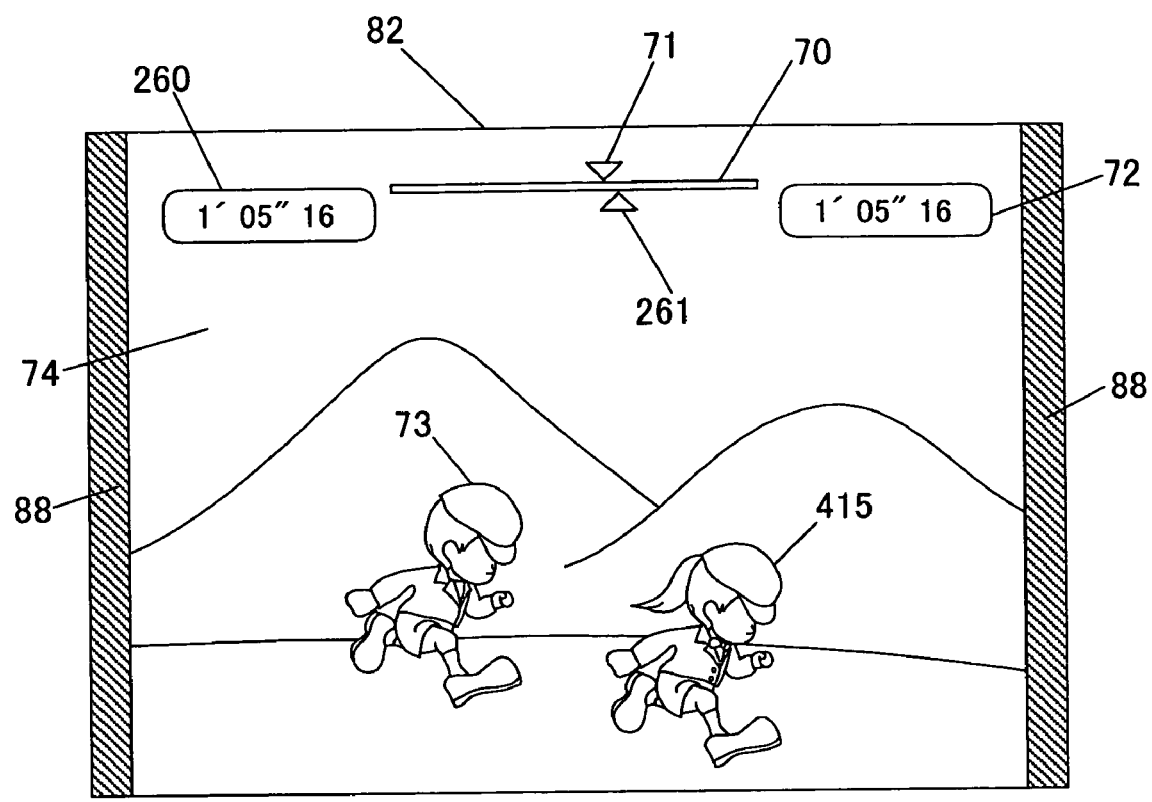
FIG. 52 is a view showing other example of running game screen of FIG. 9.

As explained above, two operators can enjoy playing an automatic performance and a game together by connecting the main bodies 1 and 1000 of the automatic musical instruments. For example, as illustrated in FIG. 52, it is possible to display two characters 73 and 415 which are operated by respective operators of the main body 1 and 1000 in an applicable example of the running game of FIG. 9. The operators can make their characters compete against each other. In addition to the images in FIG. 9, a time indicating portion 260 and a current location indicating object 261 for the character 415 are displayed on the screen of FIG. 52.

(4) Since the optical fiber 91 is located L/4 apart from the optical fiber 92, the differential phase between the pulse signal A output and the pulse signal B is (90 degrees) or (−90 degrees). However, the distance between the two optical fibers is not limited thereto.

(5) In this embodiment, the trigger is generated when the sliding speed of the sliding operation piece 2 exceeds the prescribed threshold value and the sliding direction is changed at the same time. However, the trigger generating requirement is not limited thereto. For example, it is possible to generate the trigger only when the sliding speed of the sliding operation piece 2 exceeds the prescribed threshold value. Alternatively, it is possible to generate the trigger only when the sliding direction is changed.

(6) While any appropriate processor can be used as the high speed processor 200 of FIG. 14, it is preferred to use the high speed processor in relation to which the applicant has been filed patent applications.

The details of this high speed processor are disclosed, for example, in Jpn. unexamined patent publication No. 10-307790 and U.S. Pat. No. 6,070,205 corresponding thereto.

The foregoing description of the embodiments has been presented for purposes of illustration and description. It is not intended to be exhaustive or to limit the invention to the precise form described, and obviously many modifications and variations are possible in light of the above teaching. The embodiment was chosen in order to explain most clearly the principles of the invention and its practical application thereby to enable others in the art to utilize most effectively the invention in various embodiments and with various modifications as are suited to the particular use contemplated.

What is claimed is:

1. An image signal generation apparatus, comprising:
a main body provided with a part to be slid;
a sliding operation piece that is operated to slidably move in contact with the part to be slid of said main body; and
a processor operable to control movement velocity of an image displayed on a display device based on sliding speed of said sliding operation piece,
wherein said main body includes a measuring unit operable to measure the sliding speed of said sliding operation piece,
wherein said measuring unit includes a optical sensor having a light emitting element and light receiving element,
wherein said sliding operation piece is formed with first light receiving areas and second light receiving areas which are alternately arranged in longitudinal direction and have different optical characteristic,
wherein said light receiving element operable to receive light from said light emitting element via said first light receiving areas of said sliding operation piece and convert it into an electrical signal, and
wherein said processor generate the image signal corresponding to the electrical signal output from said light receiving element.

2. An image signal generation apparatus, comprising:
a main body provided with a part to be slid;
a sliding operation piece that is operated to slidably move in contact with the part to be slid of said main body; and
a processor operable to control movement distance of an image displayed on a display device based on sliding time of said sliding operation piece being slid without a change in direction,
wherein said main body includes a measuring unit operable to measure the sliding time of said sliding operation piece,
wherein said measuring unit includes a optical sensor having a light emitting element and light receiving element,
wherein said sliding operation piece is formed with first light receiving areas and second light receiving areas which are alternately arranged in longitudinal direction and have different optical characteristic,
wherein said light receiving element operable to receive light from said light emitting element via said first light receiving areas of said sliding operation piece and convert it into an electrical signal, and wherein said processor generate the image signal corresponding to the electrical signal output from said light receiving element.

3. An image signal generation apparatus, comprising:

a main body provided with a part to be slid;

a sliding operation piece that is operated to slidably move in contact with the part to be slid of said main body; and a processor operable to control movement velocity of an image displayed on a display device based on sliding speed of said sliding operation piece, wherein said main body includes a measuring unit operable to measure the sliding speed of said sliding operation piece, wherein said measuring unit comprises a optical sensor having a light emitting element, a first light receiving element and a second light receiving element, wherein said sliding operation piece is formed with first light receiving areas and second light receiving areas which are alternately arranged in longitudinal direction and have different optical characteristic, wherein said first light receiving element operable to receive light from said light emitting element via said first light receiving areas of said sliding operation piece and convert it into a first electrical signal, wherein said second light receiving element operable to receive light from said light emitting element via said first light receiving areas of said sliding operation piece and convert it into a second electrical signal, wherein said first light receiving element and said second light receiving element are arranged at a predetermined distance in the sliding direction, and the predetermined distance is selected in order to create a certain phase difference between the first electrical signal and the second electrical signal, and wherein said processor generates the image signal on the basis of the first electrical signal and the second electrical signal.

4. An image signal generation apparatus, comprising:

a main body provided with a part to be slid;

a sliding operation piece that is operated to slidably move in contact with the part to be slid of said main body; and a processor operable to control movement distance of an image displayed on a display device based on sliding time of said sliding operation piece being slid without a change in direction, wherein said main body includes a measuring unit operable to measure the sliding time of said sliding operation piece, wherein said measuring unit comprises a optical sensor having a light emitting element, a first light receiving element and a second light receiving element, wherein said sliding operation piece is formed with first light receiving areas and second light receiving areas which are alternately arranged in longitudinal direction and have different optical characteristic, wherein said first light receiving element operable to receive light from said light emitting element via said first light receiving areas of said sliding operation piece and convert it into a first electrical signal, wherein said second light receiving element operable to receive light from said light emitting element via said first light receiving areas of said sliding operation piece and convert it into a second electrical signal, wherein said first light receiving element and said second light receiving element are arranged at a predetermined distance in the sliding direction, and the predetermined distance is selected in order to create a certain phase difference between the first electrical signal and the second electrical signal, and wherein said processor generates the image signal on the basis of the first electrical signal and the second electrical signal.

5. An image signal generation apparatus, comprising:

a main body provided with a part to be slid;

a sliding operation piece that is operated to slidably move in contact with the part to be slid of said main body; and a processor operable to control movement direction of an image displayed on a display device based on sliding direction of said sliding operation piece, wherein said main body includes a measuring unit operable to measure the sliding direction of said sliding operation piece, wherein said measuring unit comprises a optical sensor having a light emitting element, a first light receiving element and a second light receiving element, wherein said sliding operation piece is formed with first light receiving areas and second light receiving areas which are alternately arranged in longitudinal direction and have different optical characteristic, wherein said first light receiving element operable to receive light from said light emitting element via said first light receiving areas of said sliding operation piece and convert it into a first electrical signal, wherein said second light receiving element operable to receive light from said light emitting element via said first light receiving areas of said sliding operation piece and convert it into a second electrical signal, wherein said first light receiving element and said second light receiving element are arranged at a predetermined distance in the sliding direction, and the predetermined distance is selected in order to create a certain phase difference between the first electrical signal and the second electrical signal, and wherein said processor generates the image signal on the basis of the first electrical signal and the second electrical signal.

6. An image signal generation program stored on computer-readable medium which, when executed, causes a computer to perform processing, said processing comprising:

a step of measuring sliding speed of a bow-shaped sliding operation piece that is slidably moved in contact with a part to be slid of a main body; and a step of controlling movement velocity of an image displayed on a display device based on the sliding speed of said sliding operation piece.

7. An image signal generation program stored on computer-readable medium which, when executed, causes a computer to perform processing, said processing comprising:

a step of measuring sliding time of a bow-shaped sliding operation piece that is slidably moved in contact with a part to be slid of a main body; and a step of controlling movement distance of an image displayed on a display device based on the sliding time of said sliding operation piece being slid without change in direction.

8. An image signal generation program stored on computer-readable medium which, when executed, causes a computer to perform processing, said processing comprising:

a step of measuring sliding direction of a bow-shaped sliding operation piece that is slidably moved in contact with a part to be slid of a main body; and a step of controlling movement direction of an image displayed on a display device based on the sliding direction of said sliding operation piece.

9. An image signal generation method comprising:

a step of measuring sliding speed of a bow-shaped sliding operation piece that is slidably moved in contact with a part to be slid of a main body; and a step of controlling movement velocity of an image displayed on a display device based on the sliding speed of said sliding operation piece.

10. An image signal generation method comprising:

a step of measuring sliding time of a bow-shaped sliding operation piece that is slidably moved in contact with a part to be slid of a main body; and a step of controlling movement distance of an image displayed on a display device based on the sliding time of said sliding operation piece being slid without change in direction.

11. An image signal generation method comprising:

a step of measuring sliding direction of a bow-shaped sliding operation piece that is slidably moved in contact with a part to be slid of a main body; and a step of controlling movement direction of an image displayed on a display device based on the sliding direction of said sliding operation piece.

12. An image signal generation apparatus, comprising:

a main body provided with a part to be slid;

a sliding operation piece that is operated to slidably move in contact with the part to be slid of said main body; and a processor operable to control movement velocity of an image displayed on a display device based on sliding speed of said sliding operation piece, wherein said main body includes a measuring unit operable to measure the sliding speed of said sliding operation piece, and wherein the sliding operation piece is a bow-shaped piece.

13. An image signal generation apparatus, comprising:

a main body provided with a part to be slid;

a sliding operation piece that is operated to slidably move in contact with the part to be slid of said main body; and a processor operable to control movement distance of an image displayed on a display device based on sliding time of said sliding operation piece being slid without a change in direction, wherein said main body includes a measuring unit operable to measure the sliding time of said sliding operation piece, and wherein the sliding operation piece is a bow-shaped piece.

14. An image signal generation apparatus, comprising:

a main body provided with a part to be slid;

a sliding operation piece that is operated to slidably move in contact with the part to be slid of said main body; and a processor operable to control movement direction of an image displayed on a display device based on sliding direction of said sliding operation piece, wherein said main body includes a measuring unit operable to measure the sliding direction of said sliding operation piece, and wherein the sliding operation piece is a bow-shaped piece.

15. The image signal generation apparatus as claimed in claim 13, wherein said processor executes a program stored in a removable storage medium, and generates the image based on image information stored in the removable storage medium.

16. The image signal generation apparatus as claimed in claim 14, wherein said processor executes a program stored in a removable storage medium, and generates the image based on image information stored in the removable storage medium.

17. The image signal generation apparatus as claimed in claim 13, wherein said processor generates an audio signal in response to a trigger issued based on sliding operation of said sliding operation piece.

18. The image signal generation apparatus as claimed in claim 14, wherein said processor generates an audio signal in response to a trigger issued based on sliding operation of said sliding operation piece.

19. The image signal generation apparatus as claimed in claim 12, wherein said processor executes a program stored in a removable storage medium, and generates the image on the basis of image information stored in the removable storage medium.

20. The image signal generation apparatus as claimed in claim 12, wherein said processor generates an audio signal in response to a trigger issued on the basis of sliding operation of said sliding operation piece.

* * * * *